(12) United States Patent
Tashiro et al.

(10) Patent No.: US 7,044,179 B2
(45) Date of Patent: May 16, 2006

(54) ELASTIC WHEEL

(75) Inventors: Katsumi Tashiro, Fuchu (JP); Hirohumi Kikuchi, Kawasaki (JP)

(73) Assignees: Bridgestone Corporation, Tokyo (JP); Topy Industries, Limited, Tokyo (JP)

( * ) Notice: Subject to any disclaimer, the term of this patent is extended or adjusted under 35 U.S.C. 154(b) by 127 days.

(21) Appl. No.: 10/221,488

(22) PCT Filed: Mar. 13, 2001

(86) PCT No.: PCT/JP01/01950

§ 371 (c)(1),
(2), (4) Date: Sep. 13, 2002

(87) PCT Pub. No.: WO01/68386

PCT Pub. Date: Sep. 20, 2001

(65) Prior Publication Data

US 2003/0038527 A1 Feb. 27, 2003

(30) Foreign Application Priority Data

| Mar. 13, 2000 | (JP) | ............................ 2000-069502 |
| Jun. 26, 2000 | (JP) | ............................ 2000-191784 |
| Jun. 26, 2000 | (JP) | ............................ 2000-191785 |
| Jun. 29, 2000 | (JP) | ............................ 2000-196940 |
| Jun. 29, 2000 | (JP) | ............................ 2000-196941 |
| Jun. 29, 2000 | (JP) | ............................ 2000-196942 |
| Jun. 29, 2000 | (JP) | ............................ 2000-196943 |
| Jun. 29, 2000 | (JP) | ............................ 2000-196944 |

(51) Int. Cl.
*B60B 9/10* (2006.01)
*B60B 25/00* (2006.01)

(52) U.S. Cl. ........................ 152/48; 152/17; 301/11.3; 301/95.101

(58) Field of Classification Search ............... 301/10.1, 301/11.1, 11.3, 29.2, 35.1, 35.51, 63.101, 301/64.101, 95.101, 79; 295/7, 11–12; 152/40, 152/42, 47–48, 246, 50–52, 17
See application file for complete search history.

(56) References Cited

U.S. PATENT DOCUMENTS

| 1,261,896 | A | * | 4/1918 | Bennett | .................. | 152/51 |
| 1,330,222 | A | * | 2/1920 | Tibbetts | .................. | 152/52 |
| 1,416,373 | A | * | 5/1922 | Morand | .................. | 152/52 |
| 1,447,365 | A | * | 3/1923 | Walther | .................. | 152/47 |
| 1,669,731 | A | * | 5/1928 | Ash | .................. | 301/55 |
| 1,840,898 | A | * | 1/1932 | Gunn | .................. | 295/11 |
| 2,609,856 | A | * | 9/1952 | Paton | .................. | 152/50 |
| 2,923,570 | A | * | 2/1960 | Jorn et al. | .................. | 295/11 |
| 3,107,115 | A | * | 10/1963 | Kastner | .................. | 295/31.1 |
| 3,127,211 | A | * | 3/1964 | Kordes et al. | .................. | 295/11 |
| 3,771,833 | A | * | 11/1973 | Smith | .................. | 301/11.1 |
| 4,458,966 | A | * | 7/1984 | Stensson et al. | .................. | 295/11 |
| 4,549,590 | A | | 10/1985 | Sahagian | | |
| 4,765,382 | A | * | 8/1988 | Sahagian | .................. | 152/48 |
| 5,183,306 | A | * | 2/1993 | Emilsson | .................. | 295/11 |
| 6,488,324 | B1 | * | 12/2002 | Ioannides et al. | .................. | 295/7 |
| 6,732,775 | B1 | * | 5/2004 | Kikuchi et al. | .................. | 152/47 |
| 6,739,678 | B1 | * | 5/2004 | Moebs et al. | .................. | 305/136 |

FOREIGN PATENT DOCUMENTS

| JP | 57-073203 A | 5/1982 |
| JP | 59-188701 A | 12/1984 |
| JP | 05-338401 A | 12/1993 |
| JP | 7-237044 A | 9/1995 |
| JP | 2001-55003 A | 2/2001 |
| WO | WO 98/33666 A1 | 8/1998 |
| WO | 2001-58501 A | 3/2001 |

OTHER PUBLICATIONS

Microfilm of the specification and drawings annexed to the request of Japanese Utility Model Application No. 152380/1980 (Laid-open No. 73203/1982), May 6, 1982, Sumitomo Rubber Industries, Ltd.

Microfilm of the specification and drawings annexed to the request of Japanese Utility Model Application No. 83881/1983 (Laid-open No. 188701/1984), Dec. 14, 1984, Toyota Motor Corp.

CD-ROM of the specification and drawings annexed to the request of Japanese Utility Model Application No. 27179/1991 (Laid-open O. 43760/1995), Sep. 12, 1995, Enkei Automotive K.K.

\* cited by examiner

*Primary Examiner*—Jason R. Bellinger
(74) *Attorney, Agent, or Firm*—Sughrue Mion, PLLC

(57) ABSTRACT

An elastic wheel includes a disk (1) secured to an axle hub, a rim (12) for mounting a tire, and an elastic member (10) arranged between the inner peripheral surface of the rim (12) and the outer peripheral surface of the disk (1). The elastic wheel is separable either between an outer peripheral surface portion (2) and a radial disk portion (3) of the disk (1), or between the inner peripheral surface of the rim (12) and the elastic member (10), or at both locations. This construction ensures long-lasting passenger comfort, anti-vibration performance and noise-suppression performance of the elastic wheel and allows optimization of these characteristics depending on applications of the wheel even during its use. The elastic wheel facilitates rim assembly as well as core mounting. Also, in cases where rubber is used to serve as the elastic member in the elastic wheel, vulcanization can be carried out without using an integrated rim unit, thereby making it possible to reduce the size of vulcanization apparatus.

5 Claims, 36 Drawing Sheets

(b)

(a)

(b)

(a)

(b)

ELASTIC WHEEL

TECHNICAL FIELD

The present invention relates to elastic wheels for use in automobile wheels. More particularly, the present invention relates to elastic wheels that can ensure long-lasting passenger comfort, anti-vibration performance and noise-suppression performance particular to the elastic wheel and allow optimization of these performances depending on their applications.

BACKGROUND ART

A typical elastic wheel includes a disk secured to an axle hub, a rim for mounting a tire and a vibration-suppressing body arranged between the disk and the rim for the purpose of improving anti-vibration performance and passenger comfort. Various types of such an elastic wheel have been proposed thus far. For example, Japanese Utility Model Laid-Open Publication No. Sho 59-188701 discloses a wheel for mounting a tire that employs a spring as the vibration-suppressing body in order to improve passenger comfort.

Some elastic wheels use a rubber-made vibration-suppressing body between the rim and the disk. For example, an elastic wheel disclosed in Japanese Utility Model Laid-Open Publication No. Sho 57-73203 employs a rubber-like elastic body to connect a rim to a disk. Also, Japanese Patent Laid-Open Publication No. 5-338401 discloses an elastic wheel in which a vibration-suppressing rubber body is provided in a gap formed between a rim and the elastic wheel. Further, International Patent Publication WO 9833666 discloses a wheel barrier assembly in which an annular rubber strip is arranged between a rim and an inner rim that has the same profile as the rim.

When a spring or rubber is used to serve as the vibration-suppressing body in the elastic wheels, however, performances of the wheels resulting from the vibration-suppressing body are not expected to last long because the vibration-suppressing body eventually deteriorates and a wheel in general must withstand longer use than a tire.

Also, conventional elastic wheels do not allow adjustment of their performances. For example, it has not been possible thus far to change the construction of the elastic wheel that puts emphasis on passenger comfort on a paved road to the one that puts emphasis on durability for part of the period of its use, so that the wheel can withstand a large input load on a rough road. Nor has it been possible to construct an elastic wheel that can be adjusted to adapt to various types of automobiles and different environmental conditions ranging from cold to tropical weather. Further, conventional elastic wheels require a vulcanizing apparatus to be designed to accommodate the entire wheel, which leads to the difficulty in making the wheel.

Accordingly, it is an objective of the present invention to provide an elastic wheel that can ensure long-lasting passenger comfort, anti-vibration performance and noise-suppression performance particular to the elastic wheel and allow optimization of these performances depending on their applications even during its use.

DISCLOSURE OF THE INVENTION

In an effort to provide a solution to the above-described problems while taking advantage of characteristics of elastic wheels, the present inventors have found that the above-described objective can be achieved by providing an elastic wheel having the following constructions and thereby devised the present invention.

Accordingly, the present invention provides an elastic wheel that includes a disk secured to an axle hub and a rim for mounting a tire and is characterized in that the wheel is separable between an outer peripheral surface portion and a radial disk portion of the disk. This construction allows replacement of the outer peripheral surface portion of the disk with the elastic member arranged thereon as well as replacement of the rim, thereby ensuring long-lasting passenger comfort, anti-vibration performance and noise-suppression performance of the elastic wheel.

The present invention also provides an elastic wheel that includes a disk secured to an axle hub, a rim for mounting a tire, and an elastic member arranged between an inner peripheral surface of the rim and an outer peripheral surface of the disk, and is characterized in that the wheel is separable between the inner peripheral surface of the rim and the elastic member. This construction allows replacement of the disk portion along with the elastic member arranged thereon and thus allows optimization of the aforementioned characteristics depending on its applications. It also achieves the same effects as are achieved through the aforementioned invention.

The present invention also provides an elastic wheel that includes a disk secured to an axle hub, a rim for mounting a tire, and an elastic member arranged between an inner peripheral surface of the rim and an outer peripheral surface of the disk, and is characterized in that the wheel is separable both between an outer peripheral surface portion and a radial disk portion of the disk and between the inner peripheral surface of the rim and the elastic member. This construction can achieve the same effects as are obtained through the above-described invention by replacing only the outer peripheral surface portion of the disk along with the elastic member arranged thereon.

It is preferred that in any of the above-described wheels, the disk include an annular projection projecting radially outward from the outer peripheral surface thereof. The elastic member is secured to, and extends axially at least on either side of, the projection. A pair of annular wall members are secured to either end of the axially extending elastic member to extend radially outward beyond the projection and are spaced apart from the outer peripheral surface of the disk. A pair of annular stoppers, one being removable and the other being fixed, are provided on the inner peripheral surface of the rim and hold the pair of wall members from either side thereof in the axial direction. This construction makes it possible to separate the wheel between the inner peripheral surface of the rim and the elastic member in an easy and reliable manner. In this regard, rotation-prevention means may be provided between the wall member and the fixed stopper to prevent rotation between the rim and the disk. It is preferred that in any of the above-described elastic wheels, the disk includes a pair of wall members projecting radially outward from the outer peripheral surface thereof, and the elastic member extends at least axially inward and is secured to the wall members. An annular projection is secured to ends of the elastic member that extends axially inward, is properly spaced apart from the outer peripheral surface of the disk and extends radially outward beyond the wall members. A pair of annular stoppers, one being removable and the other being fixed, are provided on the inner peripheral surface of the rim and hold the projection from either side thereof in the axial direction. This construction makes it possible to separate the wheel between the inner peripheral surface of the rim and the elastic member in an easy and reliable manner. In this regard, rotation-preventing means may be provided between the projection and the fixed stopper to prevent rotation between the rim and the disk. In the above-described elastic wheel, the rim may be separated into two rims, and the removable stopper may be formed by an annular separation surface of one of the two rims. One of the rims that forms the stopper may include a drop portion. This construction helps mount a tire on the rim.

The present invention further provides an elastic wheel that includes a disk secured to an axle hub, a rim for mounting a tire, and an elastic member arranged between an inner peripheral surface of the rim and an outer peripheral surface of the disk and is characterized in that the disk includes on its outer peripheral surface an annular projection projecting radially outward therefrom, the elastic member being secured to, and extending axially at least on either side of, the projection, wherein a pair of annular wall members are secured to either end of the axially extending elastic member to extend radially outward beyond the projection and are spaced apart from the outer peripheral surface of the disk, wherein an annular stopper, which is provided on the inner peripheral surface of the rim, and a retainer plate, which is removably held in place by engaging with projections/recesses formed circumferentially on the inner peripheral surface of the rim, together hold the pair of wall members from either side thereof in the axial direction. This construction allows replacement of the outer peripheral surface portion of the disk along with the elastic member arranged thereon, as well as the rim, thereby ensuring long-lasting passenger comfort, anti-vibration performance and noise-suppression performance of the elastic wheel. In this regard, rotation-preventing means may be provided between the wall member(s) and the annular stopper and/or the retainer plate. In this manner, not only are the same effects achieved as are achieved through the above-described invention, but also rotation between the rim and the disk is effectively prevented.

The present invention also provides an elastic wheel that includes a disk secured to an axle hub, a rim for mounting a tire, and an elastic member arranged between an inner peripheral surface of the rim and an outer peripheral surface of the disk and is characterized in that the disk includes a pair of wall members projecting radially outward from the outer peripheral surface thereof, and the elastic member extends at least axially inward and is secured to the wall members, wherein an annular body is secured to ends of the elastic member that extends axially inward, is properly spaced apart from the outer peripheral surface of the disk and extends radially outward beyond the wall members, wherein an annular stopper, which is provided on the inner peripheral surface of the rim, and a retainer plate, which is removably held in place by engaging with projections/recesses formed circumferentially on the inner peripheral surface of the rim, together hold the pair of wall members from either side thereof in the axial direction. This construction allows replacement of the outer peripheral surface portion of the disk with the elastic member arranged thereon, as well as the rim, thereby ensuring long-lasting passenger comfort, anti-vibration performance and noise-suppression performance of the elastic wheel. In this regard, rotation-preventing means may be provided between the annular body and the annular stopper and/or the retainer plate. Not only does this construction serve to provide the above-described effects but also serves to effectively prevent rotation between the rim and the disk. In any of the above-described wheels, the rim may include a drop portion, and the annular stopper may be formed by the inner peripheral surface of the drop portion of the rim. Not only does this construction provide the aforementioned effects but also helps mount a tire on the rim. Also, in any of the above-described wheels, the wheel may be configured to be separable between the outer peripheral surface portion and the radial disk portion of the disk. In this manner, long-lasting passenger comfort, anti-vibration performance and noise-suppression performance of the elastic wheel can be achieved by replacing only the outer peripheral surface portion of the disk with the elastic member arranged thereon.

The present invention further provides an elastic wheel that includes a disk secured to an axle hub, a rim for mounting a tire, and an elastic member arranged between an inner peripheral surface of the rim and an outer peripheral surface of the disk, and is characterized in that the disk includes on its outer peripheral surface an annular projection projecting radially outward therefrom, the elastic member being secured to, and extending axially at least on either side of, the projection, wherein a pair of annular wall members are secured to either end of the axially extending elastic member to extend radially outward beyond the projection and are spaced apart from the outer peripheral surface of the disk, wherein an annular stopper, which is provided on the inner peripheral surface of the rim, and a C-ring, which is removably held in place in an annular groove provided on the inner peripheral surface of the rim, together hold the pair of wall members from either side thereof in the axial direction. This construction allows replacement of the outer peripheral surface portion of the disk along with the elastic member arranged thereon as well as replacement of the rim, thereby ensuring long-lasting passenger comfort, anti-vibration performance and noise-suppression performance of the disk. The C-ring is advantageous in that it is easily removable since it can be secured at one position only. In this regard, rotation-preventing means may be provided between the wall member and the annular stopper and/or the C-ring. Not only does this construction serve to provide the above-described effects but also serves to effectively prevent rotation between the rim and the disk.

The present invention further provides an elastic wheel that includes a disk secured to an axle hub, a rim for mounting a tire, and an elastic member arranged between an inner peripheral surface of the rim and an outer peripheral surface of the disk, and is characterized in that the disk includes a pair of wall members projecting radially outward from the outer peripheral surface thereof, and the elastic member extends at least axially inward and is secured to the wall members, wherein an annular body is secured to ends of the elastic member extending axially inward, is properly spaced apart from the outer peripheral surface of the disk, and extends radially outward beyond the wall members, wherein an annular stopper, which is provided on the inner peripheral surface of the rim, and a C-ring, which is removably held in place in an annular groove provided on the inner peripheral surface of the rim, together hold the pair of wall members from either side thereof in the axial direction. This construction allows replacement of the outer peripheral surface portion of the disk along with the elastic member arranged thereon as well as replacement of the rim, thereby ensuring long-lasting passenger comfort, anti-vibration performance and noise-suppression performance of the disk. The C-ring is advantageous in that it is easily removable since it can be secured at one position only. In this regard, rotation-preventing means may be provided between the annular body and the annular stopper and/or the C-ring. In this manner, not only can the above-described effects be achieved but also rotation between the rim and the disk is effectively prevented.

In any of the above-described wheels, it is preferred that the C-ring be held in place by means of a head plugged into a gap formed in the C-ring. Through this construction, the above-described effects are better achieved due to the firmly secured C-ring. In this respect, the contact surface between the C-ring and the wall member that the C-ring is held in contact with may be sloped with respect to the radial direction of the wheel and the head plugged into the gap of the ring may be secured to the wall member by means of an axially inserted fastener. In this manner, when, for example, a bolt is used to serve as the fastener, the tapered structure causes the pair of wall members to be tightened from either side thereof in the axial direction as the bolt is screwed thereinto. Accordingly, the wall members are firmly secured to the inner peripheral surface of the rim. Furthermore, the rim may include a drop portion, and the annular stopper may be formed by the inner peripheral surface of the drop portion of the rim. Not only does this construction provide the aforementioned effects but also helps mount a tire on the rim. In any of the above-described elastic wheels, the wheel may be configured to be separable between the outer peripheral surface portion and the radial disk portion of the disk. In this manner, long-lasting passenger comfort, anti-vibration performance and noise-suppression performance are achieved by replacing only the outer peripheral surface portion of the disk with the elastic member arranged thereon.

The present invention further provides an elastic wheel that includes a disk secured to an axle hub, a rim for mounting a tire, and an elastic member arranged between an inner peripheral surface of the rim and an outer peripheral surface of the disk, and is characterized in that the disk includes on its outer peripheral surface an annular projection projecting radially outward therefrom, the elastic member being arranged between the projection and the inner peripheral surface of the rim, wherein the disk is cut along the radius into several pieces, wherein a circumferential groove is provided on the inner peripheral surface of the projection and at least one raised portion is provided on an outer peripheral surface of each piece of the disk so that the raised portion removably engages with the circumferential groove, wherein the pieces of the disk are held together by means of a hold ring. In this manner, long-lasting passenger comfort, anti-vibration performance and noise-suppression performance are achieved by replacing the projection with the elastic member secured thereto and the rim.

The present invention further provides an elastic wheel that includes a disk secured to an axle hub, a rim for mounting a tire, and an elastic member arranged between an inner peripheral surface of the rim and an outer peripheral surface of the disk, and is characterized in that the disk includes on its outer peripheral surface an annular projection projecting radially outward therefrom, the elastic member being arranged between the projection and the inner peripheral surface of the rim, wherein the disk is cut along the radius into several pieces, wherein at least one raised portion is provided on the inner peripheral surface of the projection and a circumferential groove is provided on an outer peripheral surface of each piece of the disk so that the raised portion removably engages with the circumferential groove, wherein the pieces of the disk are held together by means of a hold ring. In this manner, long-lasting passenger comfort, anti-vibration performance and noise-suppression performance are achieved by replacing the projection with the elastic member secured thereto and the rim. In any of the above-described elastic wheels, long-lasting passenger comfort, anti-vibration performance and noise-suppression performance are achieved by replacing only the projection with the elastic member arranged thereon when the wheel is configured to be separable between the inner peripheral surface of the rim and the elastic member. These effects are better achieved when the elastic wheel is configured such that the elastic member is secured to, and extends axially at least on either side of, the projection, and an annular wall member is secured to one end of the axially extending elastic member and a C-ring is secured to the other end of the elastic member so that a proper distance is maintained with respect to the outer peripheral surface of the disk, wherein the wall member and the C-ring extend radially outward beyond an outer peripheral surface of the projection, the C-ring being removably held in place in an annular groove provided on the inner peripheral surface of the rim, the wall member being held in contact with an annular stopper provided on the inner peripheral surface of the rim to be kept from moving in the axial direction. In this respect, the C-ring is preferably secured by means of a head plugged into a gap formed in the C-ring. In this manner, the C-ring is secured firmly and the above-described effects are better achieved. Also, in any of the above-described elastic wheels, rotation-preventing means may be provided between the wall member and the annular stopper and/or between the inner peripheral surface of the rim and the C-ring. In this manner, not only can the above-described effects be achieved but also rotation between the rim and the disk is effectively prevented. Furthermore, the rim may include a drop portion, and the annular stopper may be formed by the inner peripheral surface of the drop portion of the rim. Not only does this construction provide the aforementioned effects but also helps mount a tire on the rim.

The present invention further provides an elastic wheel that includes a disk secured to an axle hub, a rim for mounting a tire, and an elastic member arranged between an inner peripheral surface of the rim and an outer peripheral surface of the disk, and is characterized in that the disk includes on its outer peripheral surface an annular projection projecting radially outward therefrom, the elastic member being arranged between the projection and the inner peripheral surface of the rim, wherein an annular groove and an annular raised portion are provided on the inner peripheral surface of the projection and an annular ridge is formed on the outer peripheral surface of the disk, so that the annular raised portion and a C-ring held in place in the annular groove together hold the ridge from either side thereof in the axial direction. The elastic wheel constructed in this manner makes it possible to achieve long-lasting passenger comfort, anti-vibration performance, and noise-suppression performance of the elastic wheel by replacing the projection with the elastic member secured thereto and the rim. In this respect, the C-ring is preferably secured by means of a head plugged into a gap formed in the C-ring. In this manner, the C-ring is firmly secured and the above-described effects are better achieved. Also, rotation-prevention means may be provided between the inner peripheral surface of the projection and the outer peripheral surface of the disk. Not only does this construction serve to provide the above-described effects but also serves to effectively prevent rotation between the inner peripheral surface of the projection and the outer peripheral surface of the disk. Long-lasting passenger comfort, anti-vibration performance and noise-suppression performance are achieved by configuring the wheel to be separable between the inner peripheral surface of the rim and the elastic member. These effects are better achieved when the elastic wheel is configured such that the elastic member is secured to, and extends axially at least on either side of, the projection, wherein a pair of annular wall members are secured to either end of the axially extending elastic member so that a proper distance is maintained between the outer peripheral surface of the disk and the wall members, the pair of wall members extending radially outward beyond the projection, wherein an annular stopper, which is provided on the inner peripheral surface of the rim, and a C-ring, which is removably held in place in an annular groove provided on the inner peripheral surface of the rim, together hold the pair of wall members from either side thereof in the axial direction. In this regard, the C-ring is preferably secured by means of a head plugged into a gap formed in the C-ring. In this manner, the C-ring is firmly secured and the above-described effects are better achieved. Also, rotation-prevention means may be provided between the wall member and the annular stopper and/or between the wall member and the C-ring. Not only does this construction serve to provide the above-described effects but also serves to effectively prevent rotation between the rim and the disk. In addition, the rim may include a drop portion and the annular stopper may be formed by the inner peripheral surface of the drop portion of the rim. This construction serves to provide the above-described effects and helps mount a tire on the rim.

Also, the present invention provides an elastic wheel that includes a disk secured to an axle hub, a rim for mounting a tire, and an elastic member arranged between an inner peripheral surface of the rim and an outer peripheral surface portion of the disk, and is characterized in that the disk includes on its outer peripheral surface portion an annular projection projecting radially therefrom, wherein the elastic member is secured to, and extends axially at least on either side of, the projection, wherein an annular wall member is secured to one end of the axially extending elastic member and a split ring is secured to the other end of the elastic member so that a proper distance is maintained with respect to the outer peripheral surface of the disk, wherein the wall member and the split ring each extend radially outward beyond an outer peripheral surface of the projection, the split ring being removably held in place in an annular groove provided on the inner peripheral surface of the rim, the wall member being held in contact with an annular stopper provided on the inner peripheral surface of the rim and being kept from moving in the axial direction. In this manner, long-lasting passenger comfort, anti-vibration performance, and noise-suppression performance can be achieved by replacing the projection with the elastic member secured thereto and the rim. This construction also has an advantage that the manufacturing process can be simplified due to the reduced number of parts used. Preferably, the split ring is a C-ring so that it can readily be taken off and put back onto and the above-described effects are better achieved. Preferably, the split ring is secured by means of heads plugged in gaps formed in the split ring. In this manner, the split ring is firmly secured and the above-described effects are better achieved. Further, rotation-preventing means may be provided between the wall member and the annular stopper and/or between the inner peripheral surface of the rim and the split ring. Not only does this construction serve to provide the above-described effects but also serves to effectively prevent rotation between the rim and the disk. Also, the rim may include a drop portion and the annular stopper may be formed by the inner peripheral surface of the drop portion of the rim. This construction provides the above-described effects and helps mount a tire on the rim. In addition, the wheel may be configured to be separable between the outer peripheral surface portion and a radial disk portion of the disk so that long-lasting passenger comfort, anti-vibration performance, as well as noise-suppression performance can be achieved by replacing only the outer peripheral surface portion of the disk with the elastic member arranged thereon.

The present invention further provides a wheel for use with a vehicle that includes a disk secured to an axle hub and a rim for mounting a tire, and is characterized in that the disk is equally cut along the radius of the wheel into several pieces, and each piece of the disk includes on its outer peripheral surface at least one raised portion, wherein a circumferential groove is provided on the inner peripheral surface of the rim so that the raised portion is removably engaged with the circumferential groove, wherein the pieces of the disk are held together by means of a hold ring. This construction allows the wheel to be readily separated between the rim and the disk without compromising on the durability of the wheel. In this respect, the circumferential groove on the inner peripheral surface of the rim may be formed within the raised portion integrally formed with the rim, or it may be formed on an inner peripheral surface of an annular body joined to the inner peripheral surface of the rim. In this manner, the circumferential groove is advantageously formed and the wheel can be readily separated between the rim and the disk without compromising on the durability of the wheel.

The present invention also provides a wheel for use with a vehicle that includes a disk secured to an axle hub and a rim for mounting a tire, and is characterized in that the disk is equally cut along the radius of the wheel into several pieces, and each piece of the disk includes on its outer peripheral surface at least one circumferential groove, wherein a raised portion is provided on the inner peripheral surface of the rim to project radially inward so that the raised portion is removably engaged with the circumferential groove, wherein the pieces of the disk are held together by means of a hold ring. This construction allows the wheel to be readily separated between the rim and the disk without compromising on the durability of the wheel. In any of the above-described wheels for use with a vehicle, it is preferred that the disk is equally cut into along the radius of the wheel be from 3 to 12. In this manner, the above-described effects are better achieved because of the suitable number of division. In the wheel for use with a vehicle in the aforementioned invention, it is preferred that a circular plate be arranged on a surface of the disk that comes into contact with the axle hub to hold the pieces of the disk together. In this manner, the pieces of the disk are firmly connected with each other and the above-describe effects are better achieved. Further, in any of the above-described wheels for use with a vehicle, the rim preferably includes a drop portion. This construction serves to provide the above-described effects and helps mount a tire on the rim.

The present invention also provides an wheel for use with a vehicle that includes a disk secured to an axle hub and a rim for mounting a tire, and is characterized in that the disk includes on its outer peripheral surface an annular projection projecting radially outward therefrom, wherein an annular stopper is provided on the inner peripheral surface of the rim and a C-ring is removably held in place in an annular groove provided on the inner peripheral surface of the rim, such that the annular stopper and the C-ring together hold the projection on both of its radial side surfaces from either side thereof in the axial direction. This construction allows the wheel to be readily separated between the rim and the disk without compromising on the durability of the wheel. In this regard, rotation-preventing means may be provided between the side surface(s) of the projection and the annular stopper and/or the C-ring. Not only does this construction serve to provide the above-described effects but also serves to effectively prevent rotation between the rim and the disk. Preferably, the C-ring is secured by means of a head plugged into a gap formed in the C-ring. In this manner, the C-ring is firmly secured and the above-described effects are better achieved. In this respect, the elastic wheel may be constructed such that the contact surface between the C-ring and the side surface of the projection that the C-ring is held in contact with is sloped with respect to the radial direction of the wheel, and the head plugged into the gap of the ring is secured to the side surface of the projection by means of an axially inserted fastener. In this manner, the tapered structure causes the projection to be tightened from either side thereof in the axial direction, as the bolt is screwed therein to. Accordingly, the projection is firmly secured to the inner peripheral surface of the rim.

The present invention further provides an elastic wheel for use with a vehicle that includes a disk secured to an axle hub and a rim for mounting a tire, and is characterized in that an annular projection is arranged on the inner peripheral surface of the rim to project radially inward therefrom, wherein an annular groove and an annular raised portion are provided on the inner peripheral surface of the projection and an annular ridge is provided on the outer peripheral surface of the disk, such that the annular raised portion and a C-ring, which is held in place in the annular groove, together hold the ridge from either side thereof in the axial direction. This construction allows the wheel to be readily separated between the rim and the disk without sacrificing the durability of the wheel.

In any of the above-described wheels for use with a vehicle, the rim may include a drop portion and the annular stopper may be formed by the inner peripheral surface of the drop portion of the rim. This construction serves to provide the above-described effects and helps mount a tire on the rim.

It is preferred that the elastic member be an elastic rubber body in any of the above-described elastic wheels so that the desired effects are achieved by taking advantage of characteristics of rubber.

BEST MODES FOR CARRYING OUT THE INVENTION

The present invention will now be described with reference to preferred embodiments.

Figure 1:
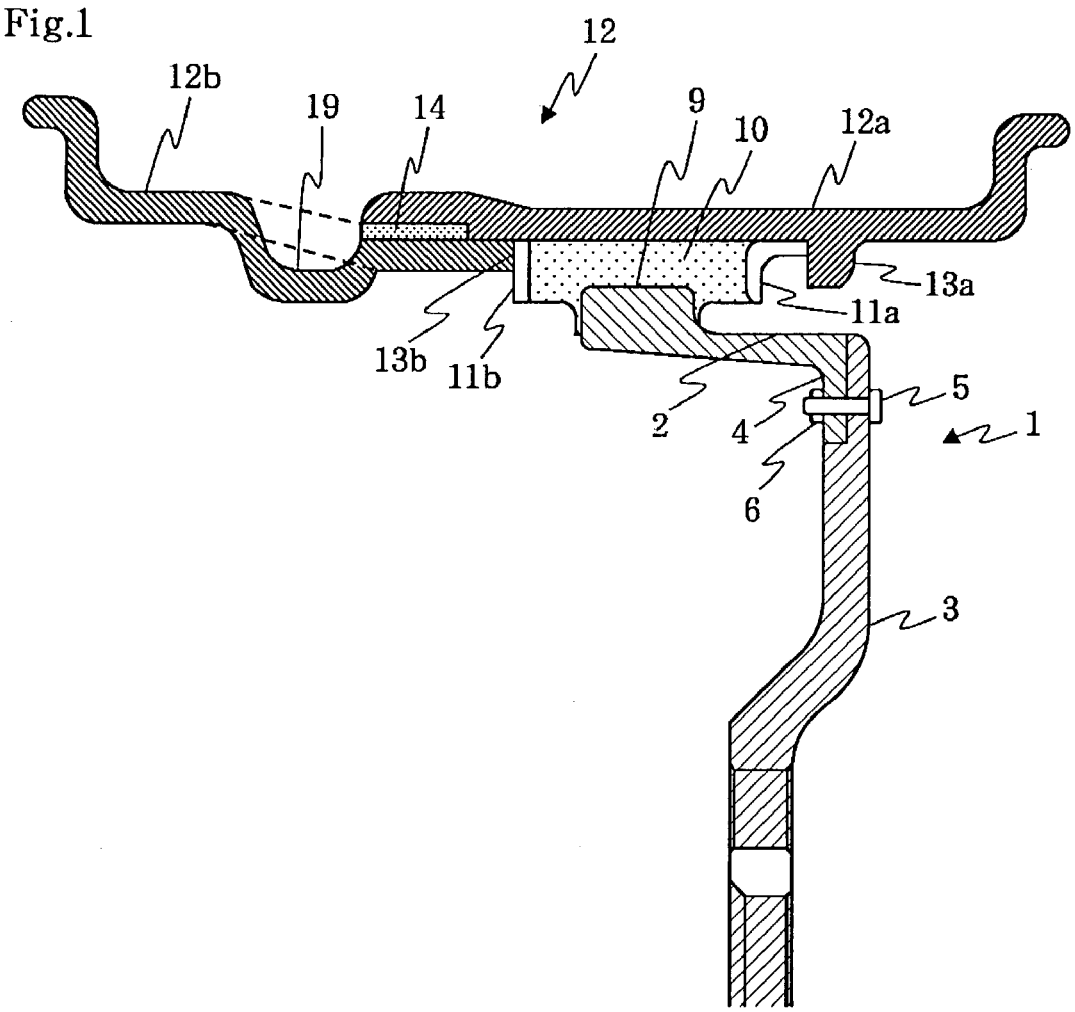
FIG. 1 is an enlarged partial cross-section of one embodiment of an elastic wheel in accordance with the present invention.

One preferred embodiment of an elastic wheel of the present invention shown in FIG. 1 includes a disk 1 secured to an axle hub (not shown) and a rim 12 for mounting a tire. An elastic member 10 is arranged between an inner peripheral surface of the rim 12 and an outer peripheral surface of the disk 1. The disk 1 of the elastic wheel includes an outer peripheral surface portion 2 and a disk portion 3 that are separable from one another.

Figure 2:
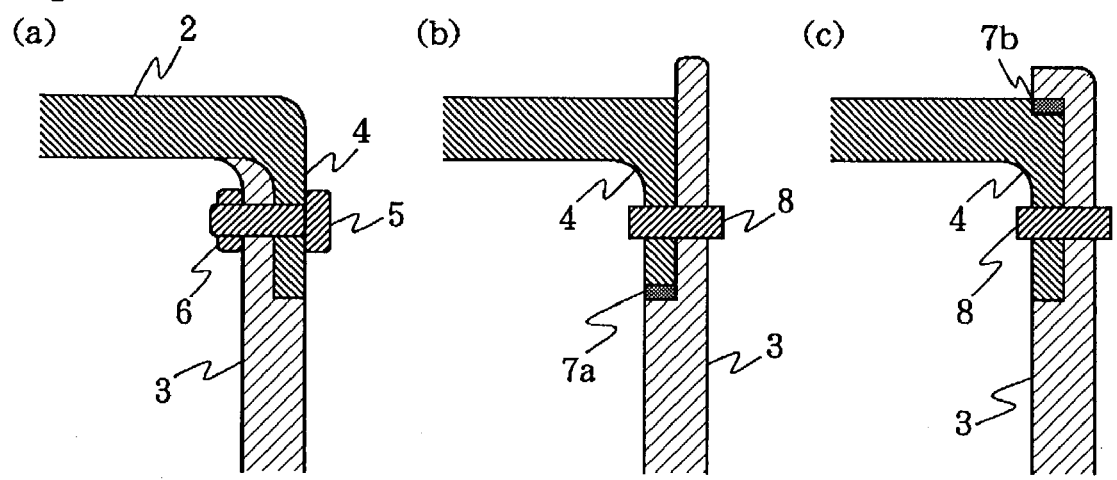
FIG. 2 shows enlarged partial cross-sections each showing a connection between an outer peripheral surface portion and a radial disk portion of a disk.

In the preferred embodiment shown in FIG. 1, the outer peripheral surface portion 2 of the disk 1 includes on its edge a radial joint portion 4. The radial disk portion 3 and the outer peripheral surface portion 2 are secured to one another by placing a peripheral edge of the radial disk portion 3 over the joint portion 4 from outside and then fastening a plurality of bolts 5 and nuts 6. Aside from the connection shown in FIG. 1, the removable attachment of the outer peripheral surface portion 2 to the disk portion 3 may be achieved through connections as depicted in FIG. 2. In a connection shown in FIG. 2(a), the outer peripheral surface portion 2 of the disk 1 includes on its edge a radial joint portion 4. The disk portion 3 and the outer peripheral surface portion 2 are secured to one another by placing a peripheral edge of the disk portion 3 over the joint portion 4 from inside and then fastening the bolts 5 and the nuts 6. In a connection shown in FIG. 2(b), the disk portion 3 and the outer peripheral surface portion 2 are connected with each other by bringing the disk portion 3 and the joint portion 4 into screw engagement via an axial joint surface 7a and then inserting rotation-preventing means 8 such as pins and bolts therethrough. In a connection shown in FIG. 2(c), the disk portion 3 and the outer peripheral surface portion 2 are first brought into screw engagement via an axial joint surface 7b and then rotation-preventing means 8 are placed as in the connection in FIG. 2(b). The rotation-preventing means 8 are most effective when provided at several different locations.

The disk 1 may also be a spoke wheel or a mesh wheel having supporting members such as spokes, mesh, or the like, provided that the outer peripheral surface portion 2 and the radial disk portion 3 are removable from one another. While any material can be used to form the disk 1, including steel, aluminum, magnesium, titanium, plastics or the like, aluminum, titanium or plastics are preferred when it is desired to construct a lightweight wheel.

In the preferred embodiment shown in FIG. 1, the rim 12 and the elastic member 10 are also separable from one another. In this embodiment, an annular projection 9 protrudes radially outward from the outer peripheral surface portion 2 of the disk 1. The annular elastic member 10, such as an elastic rubber body, extends axially on either side of the projection 9 and is secured to the projection 9. The projection 9 may be provided as an annular member that has an inverted U-shaped cross-section in the axial direction (not shown) and is secured to, and extends radially outward from, a base rim (not shown) arranged on the outer peripheral surface 2 of the disk 1. This construction helps reduce the weight of the wheel.

Although the sheering strain of the elastic member 10 can provide intended functions of the elastic wheel if the elastic member extends axially at least on either side of the projection 9, the wheel can be configured to withstand a large input load by forming the elastic member 10 to also extend between the inner peripheral surface of the rim 12 and the projection 9 as illustrated. In addition to the elastic rubber body, the elastic member 10 may be configured as a plurality of spring members that are circumferentially spaced apart from one another and each axially extends on either side of the projection 9. In this regard, the spring members may be arranged to extend between the projection 9 and the inner peripheral surface of the rim and are circumferentially spaced apart from one another. The type and the location of the elastic member 10 are properly selected depending on their applications. Also, more than one elastic member 10 may be used for a single elastic wheel.

A pair of annular wall members 11a and 11b are secured to the axially extending elastic member 10 on either end thereof and are spaced apart from the outer peripheral surface 2 of the disk by a proper distance. The pair of wall members 11a and 11b extend radially outward beyond the projection 9 such that there is a proper distance between the projection 9 and the inner peripheral surface of the rim 12. The pair of wall members 11a and 11b are held between a pair of annular stoppers 13a and 13b that are arranged on the inner peripheral surface of the rim 12. In this manner, not only can the elastic member 10 function as intended but also the inner peripheral surface of the rim 12 is removably joined to the elastic member 10.

The pair of annular stoppers 13a and 13b on the inner peripheral surface of the rim 12, one of which is removable and the other of which is fixed, together hold the pair of wall members 11a and 11b from either side. In the preferred embodiment shown, the annular stopper 13a is secured while the annular stopper 13b is removable. The stopper 13b is formed by an annular separation surface of a rim 12b, which, together with a rim 12a, forms the rim 12 and is separable from the rim 12a along the circumference. The rims 12a and 12b are removably held together via screw engagement between a separation edge on the inner peripheral surface of the rim 12a and a joint surface 14 on the outer peripheral surface of the rim 12b. This construction allows attachment/detachment of the stopper 13b.

Figure 3:
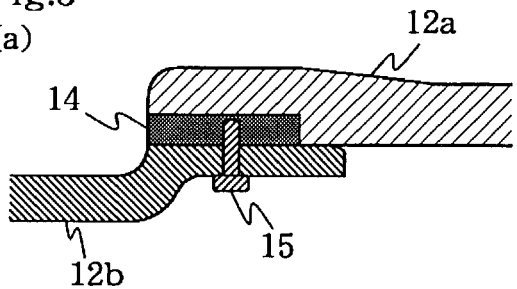
FIG. 3 shows enlarged partial cross-sections each showing a connection in a split rim.

As shown in FIG. 3(a), a pin or a bolt 15 is provided through the screw joint surface 14 to keep the rims from coming loose from one another. Alternatively, the rims 12a and 12b may be joined to one another simply by means of the pin or the bolt 15 without employing screw engagement as shown in FIG. 3(b). The means for removably joining the rims is not limited to particular ones. For example, an adhesive may be used to prevent the rims from coming loose from one another and a bolt and a nut may be used to serve as the means for joining the rims.

While in the preferred embodiment shown in FIG. 1, relative rotation between the disk 1 and the rim 12 is prevented by constructing the joint surface 14 between the rims 12a and 12b as a screw engagement surface to form the stopper 13b, so that the pair of wall members 11a and 11b are held between the annular stoppers 13a and 13b, it is preferred to provide additional means to prevent rotation between the disk 1 and the rim 12.

Figure 4:
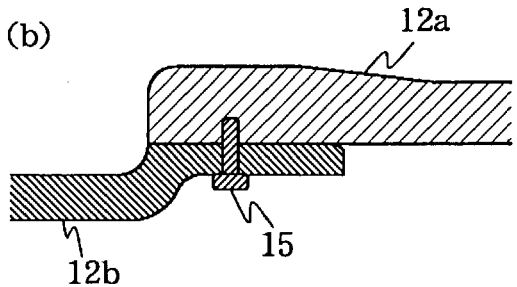
FIG. 4 is an enlarged partial cross-section showing rotation-preventing means provided between a rim and a disk.
Figure 4:
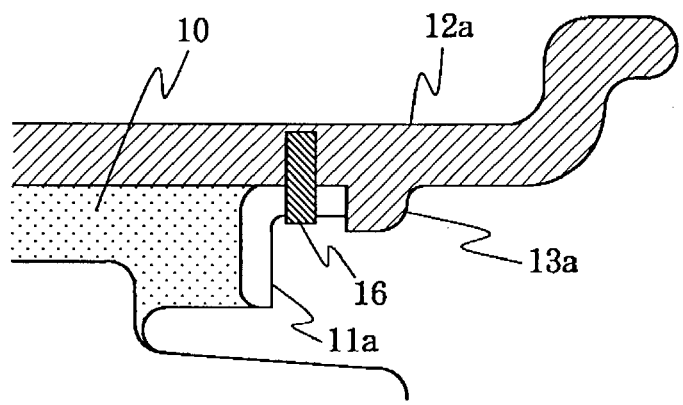
Figure 5:
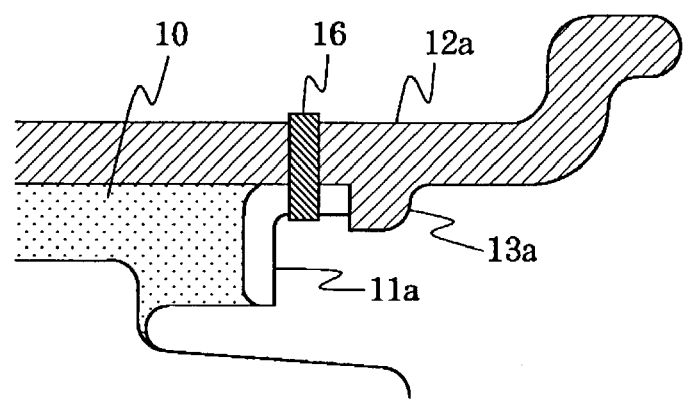
FIG. 5 is an enlarged partial cross-section showing another rotation-preventing means provided between the rim and the disk.
Figure 6:
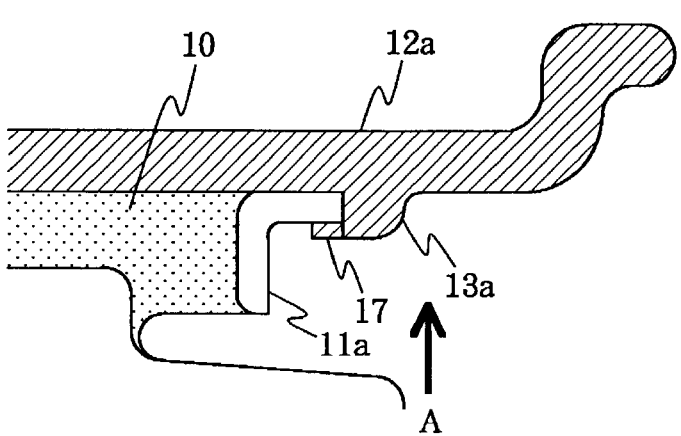
FIG. 6 is an enlarged partial cross-section showing still another rotation-preventing means provided between the rim and the disk.
Figure 7:
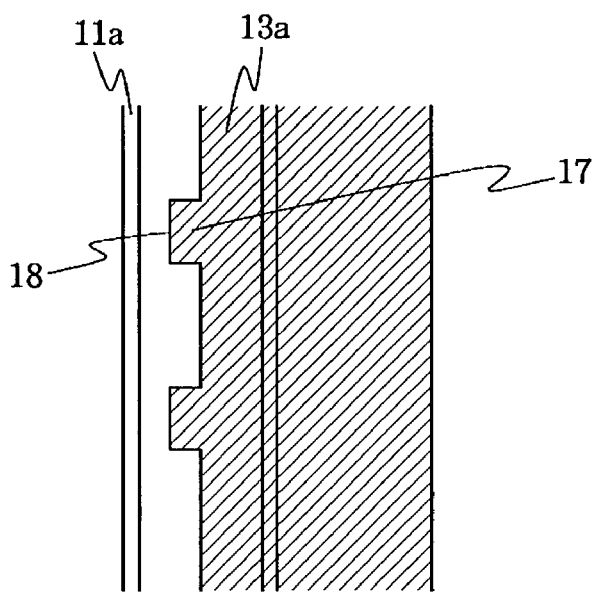
FIG. 7 is an enlarged plan view as viewed from the direction A indicated by an arrow in FIG. 1.

For example, a curved portion may be formed on the wall member 11a, which is the one that abuts the stopper 13a, to extend along the inner peripheral surface of the rim, and pins or bolts 16 may be provided through the curved portion and the rim at several locations along the circumference, as shown in FIGS. 4 and 5. Alternatively, as shown in FIG. 6 and FIG. 7, which is viewed from the direction A indicated by an arrow in FIG. 6, projections 17 and corresponding recesses 18 may be provided on the stopper 13a and on the curved portion of the wall members 11a, respectively, at several locations along the circumference, so that the projections 17 engage with the respective recesses 18 to prevent the rotation between the disk 1 and the rim 12.

In the elastic wheel of the present invention, the construction of the rim is not limited to particular ones: for example, as shown in FIG. 1, a drop portion 19 may be provided on the split rim 12b, which forms one of the stoppers, to facilitate rim assembly.

Figure 8:
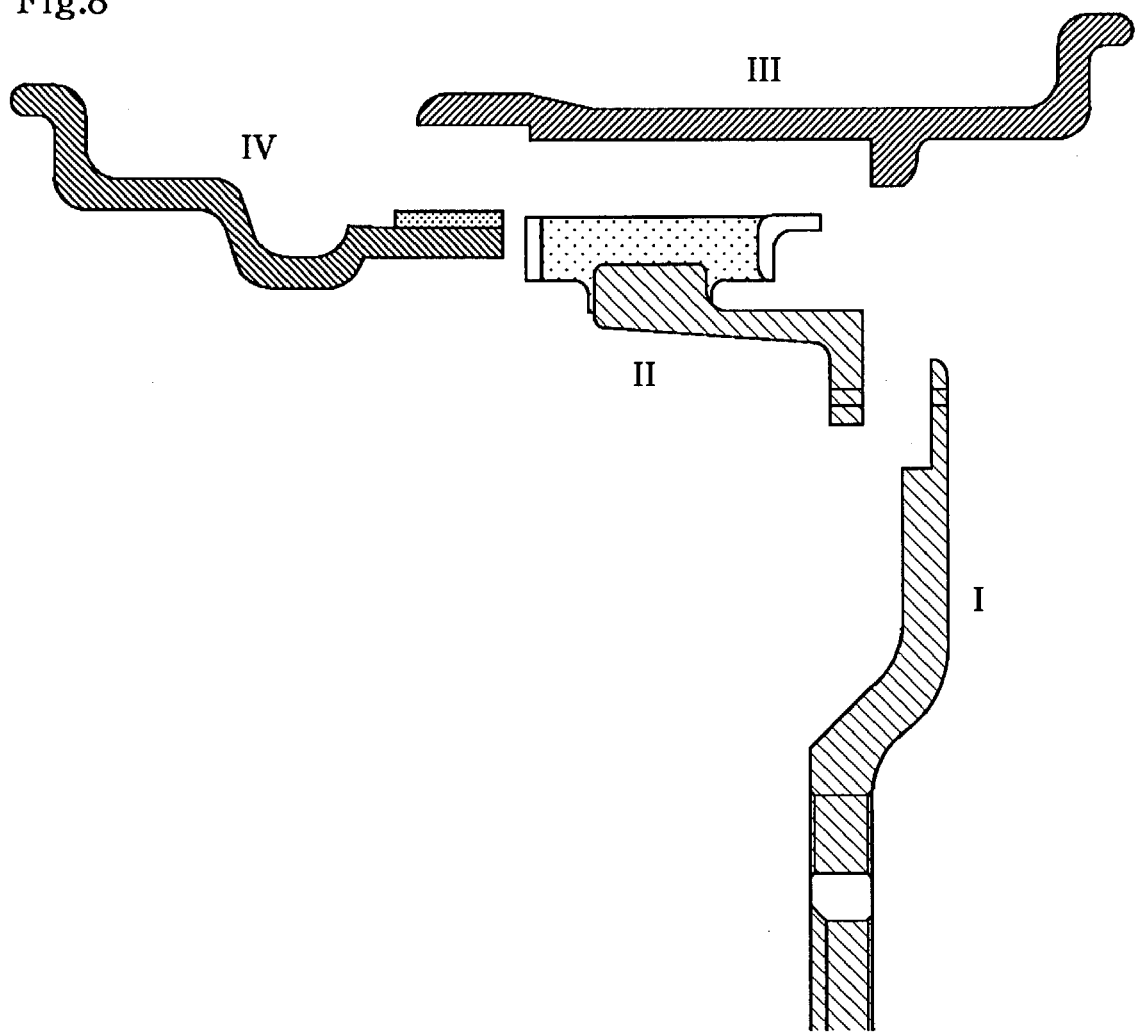
FIG. 8 is an exploded view showing a manner in which the elastic wheel of FIG. 1 is separated.

The elastic wheel according to the preferred embodiment of the present invention as shown in FIG. 1 are divided into four separate units I through IV as shown in an exploded view in FIG. 8. This construction allows replacement of the separate unit II with the attached elastic member 10 in a cartridge-like manner, so that the wheel can have the performance of the elastic member 10 as long as necessary. This construction also allows optimization of characteristics of the wheel to adapt it to a particular application during its use by preparing different separate units II that have different types of elastic members 10 in different arrangements. The construction is also advantageous in that it facilitates rim assembly and core mounting and, when rubber is used to serve as the elastic member 10, vulcanization can be carried out using only the separate unit II but not the integrated rim unit. Accordingly, the size of vulcanizing apparatus can be reduced.

While one exemplary construction of the elastic wheel in which the wheel is divided into four units has been described, the present invention also contemplates other constructions: for example, the separate units II, III and IV may be formed integrally so that the wheel is only separable between the outer peripheral surface portion 2 of the disk 1 and the radial disk portion 3, or the separate units I and II may be formed integrally so that the wheel is only separable between the inner peripheral surface of the rim 12 and the elastic member 10.

Figure 9:
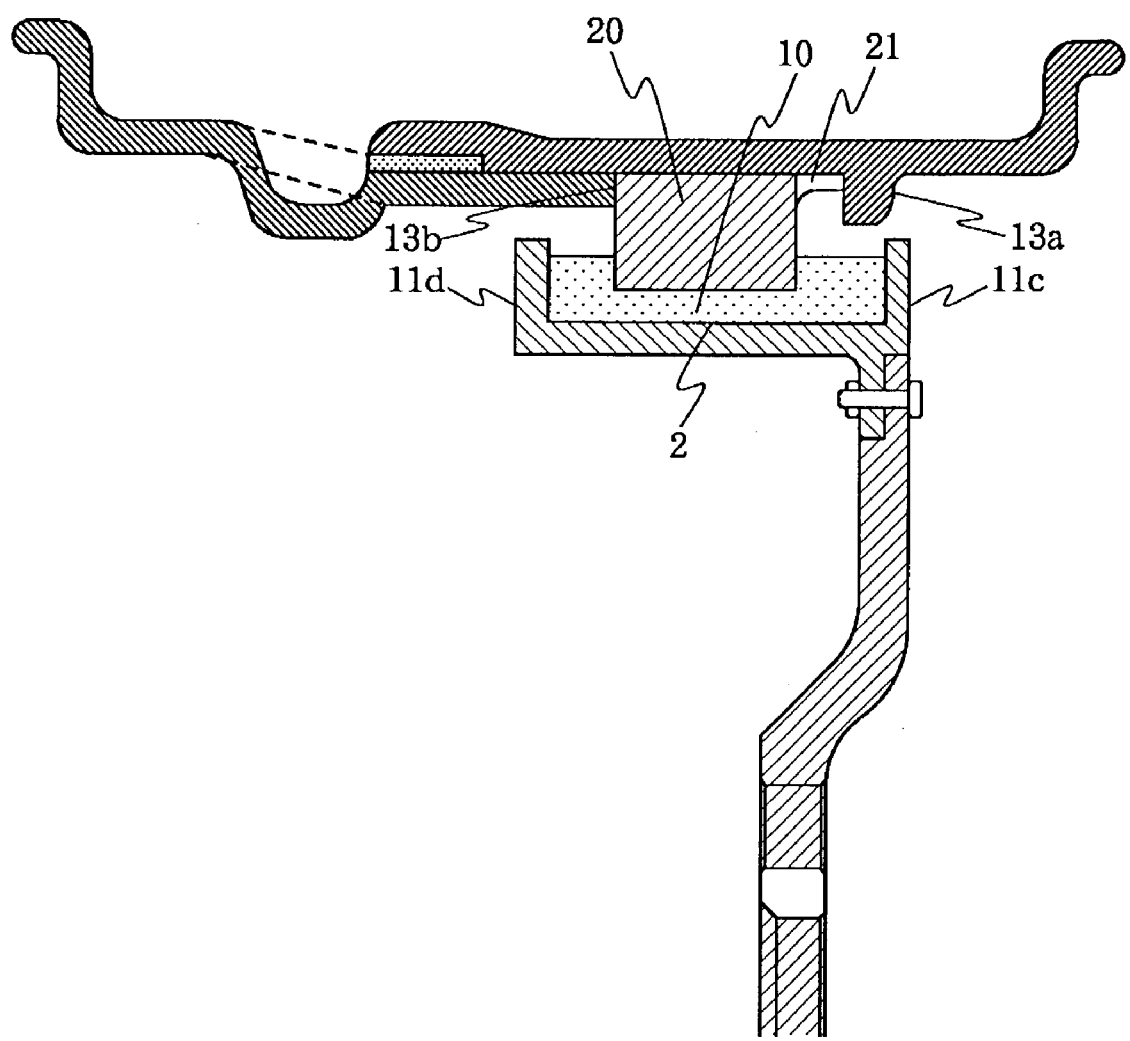
FIG. 9 is an enlarged partial cross-section of another embodiment of the elastic wheel in accordance with the present invention.

Referring to FIG. 9, another embodiment of the elastic wheel of the present invention is shown in which changes have been made to the separate unit II of the above-described embodiment. In this preferred embodiment shown in FIG. 9, the outer peripheral surface portion 2 of the disk 1 includes a pair of annular wall members 11c and 11d, each extending radially outward. An elastic member, for example, an elastic rubber body 10, extends at least axially inward and is secured to the wall members 11c and 11d. An annular projection 20 is secured to the elastic member 10 between ends of the elastic member 10 that extends axially inward and is spaced apart from the outer peripheral surface 2 of the disk by a proper distance. The projection 20 extends radially outward beyond the wall members 11c and 11d so that a proper distance is maintained between outer peripheral ends of the wall members 11c and 11d and the inner peripheral surface of the rim 12. The projection 20 is also held between a pair of annular stoppers 13a and 13b as in the above-described embodiment. In this manner, not only can the elastic member 10 function as intended, but also the inner peripheral surface of the rim 12 is removably joined to the outer peripheral surface of the projection 20.

Various selections are possible as to the type and the arrangement of the elastic member 10 as are in the above-described embodiment. While in the embodiment shown, the projection 20 has a substantially square cross-section in axial direction, it may be formed as a hollow structure or I-shaped structure in order to construct a lightweight wheel. In the embodiment shown, the projection 20 includes on a part that abuts the stopper 13a a flange 21 that extends along the inner peripheral surface of the rim, so that rotation between the disk 1 and the rim 12 is prevented in the above-described manner such as providing the pins or bolts 16 through the flange 21 and the rim 12 at several locations along the circumference.

Figure 10:
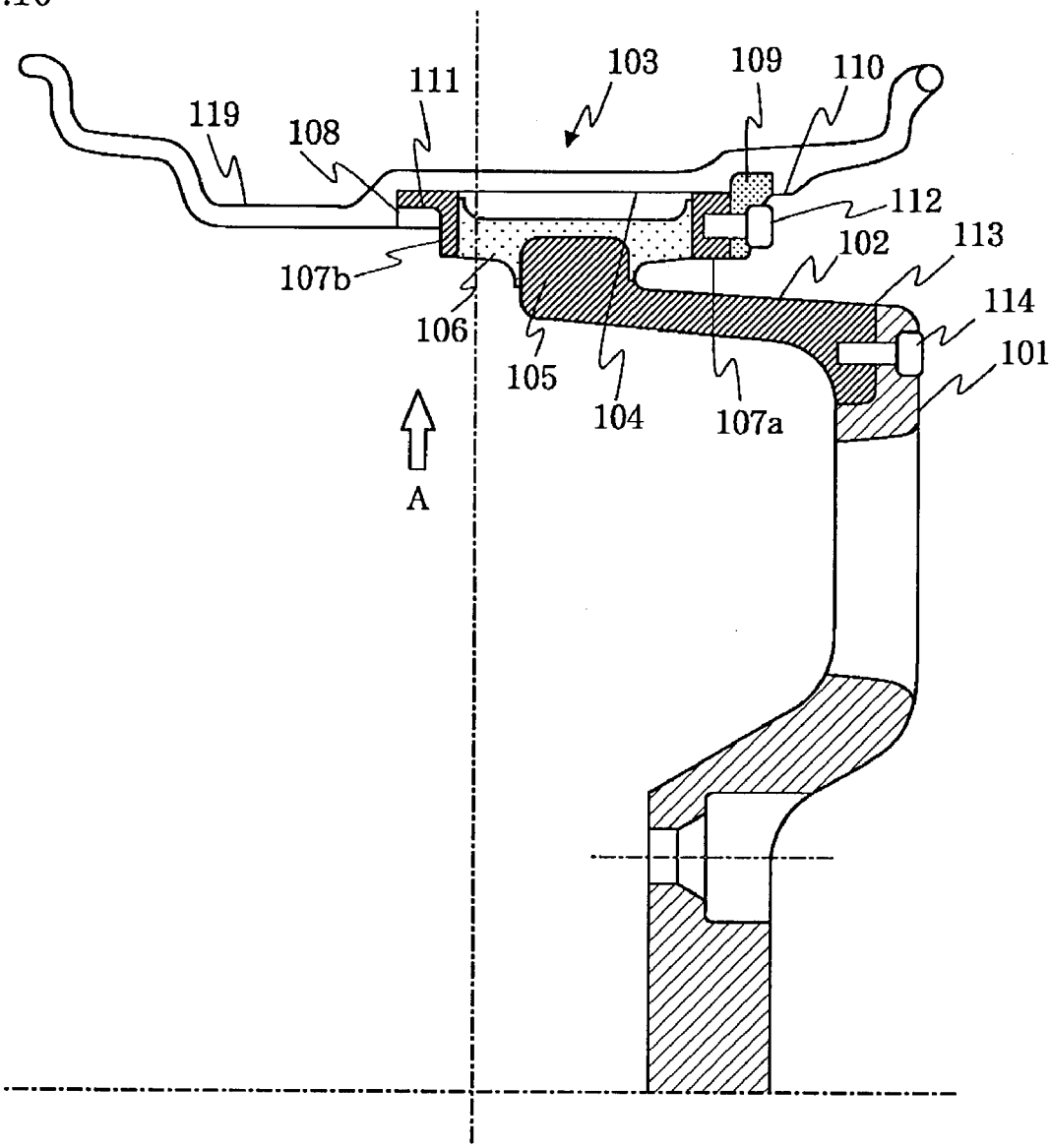
FIG. 10 is an enlarged partial cross-section of still another embodiment of the elastic wheel in accordance with the present invention.

Referring to FIG. 10, another embodiment of the elastic wheel of the present invention is shown. The elastic wheel includes a disk and a rim 103 for mounting a tire. The disk is secured to an axle hub (not shown) and has a radial disk portion 101 and its associated outer peripheral surface portion 102. An elastic rubber body 106 is arranged between an inner peripheral surface of the rim 103 and the outer peripheral surface portion 102 of the disk to serve as the elastic member.

The disk may also be a spoke wheel or a mesh wheel having supporting members such as spokes, mesh, or the like. While any material can be used to form the disk, including steel, aluminum, magnesium, titanium, plastics or the like, aluminum, titanium or plastics are preferred when it is desired to construct a lightweight wheel.

In the preferred embodiment shown in FIG. 10, an annular projection 105 protrudes radially outward from the outer peripheral surface portion 102 of the disk. An annular elastic member, such as an elastic rubber body 106, extends axially on either side of the projection 105 and is attached to the projection 105 through, for example, vulcanization.

A pair of annular wall members 107a and 107b are attached through, for example, vulcanization to the respective ends of the elastic rubber body 106, which extends axially on either side of the projection 105. The pair of wall members 107a and 107b are each spaced apart from the outer peripheral surface of the disk by a proper distance and each extend radially outward beyond the projection 105 such that a proper distance is maintained between the projection 105 and the inner peripheral surface 104 of the rim 103. An annular stopper 108 and a retainer plate 109, each provided on the inner peripheral surface 104 of the rim, together hold the pair of wall members 107a and 107b from either side thereof in the axial direction. In this manner, not only can the elastic rubber body 106 function as an elastic member but also the inner peripheral surface of the rim 103 is removably joined to the elastic member.

Although the sheering strain of the elastic rubber body 106 can provide intended functions of the elastic wheel provided that the rubber body axially extends at least on either side of the projection 105, the wheel can be configured to withstand a large input load by forming the elastic rubber body 106 to also extend between the inner peripheral surface 104 of the rim 103 and the projection 105 as illustrated. That is, a portion of the elastic rubber body 106 that extends radially outward from, and continually over the outer surface of, the projection 105 serves as a stopper to prevent collision between the projection 105 and the inner peripheral surface 104 of the rim 103 upon application of a large input load. Aside from the elastic rubber body 106, the elastic member may be configured as a plurality of spring members that are circumferentially spaced apart from one another and each axially extends on either side of the projection 105. In this regard, the spring members may be arranged to extend between the projection 105 and the inner peripheral surface 104 of the rim and are circumferentially spaced apart from one another. The type and the location of the elastic member are properly selected depending on their applications. Also, more than one elastic member may be prepared for a single elastic wheel.

The projection 105 may be formed as an annular member that has an inverted U-shaped cross-section in the axial direction (not shown) and is secured to, and extends radially outward from, a base rim (not shown) arranged on the outer peripheral surface portion 102 of the disk. Alternatively, the projection 105 may be formed to have an annular space extending therethrough. Each of these constructions helps reduce the weight of the wheel.

Figure 11:
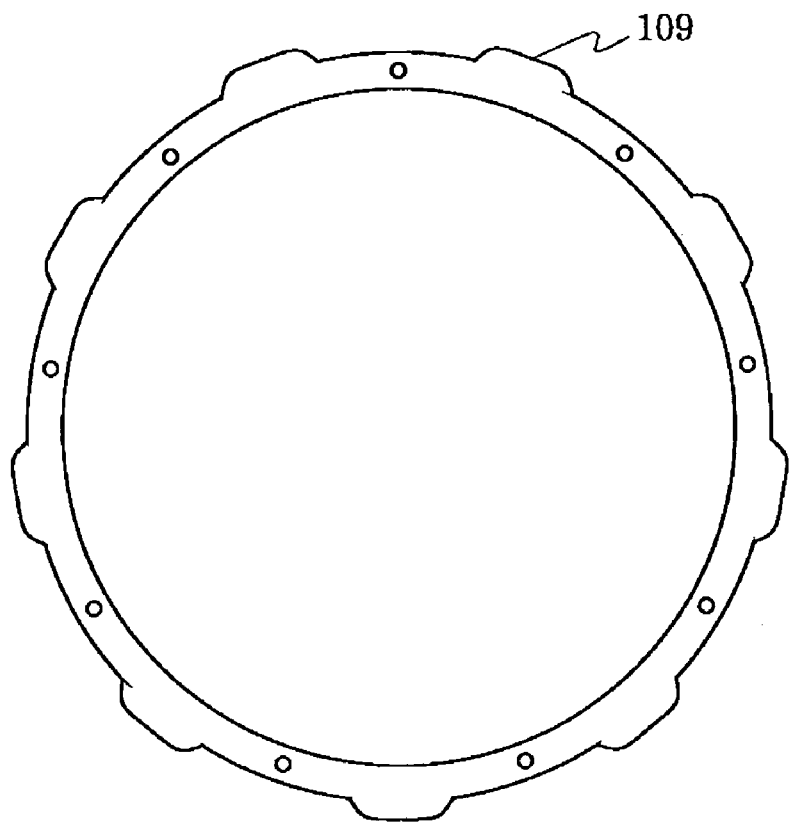
FIG. 11 is a plan view showing a retainer plate.
Figure 12:
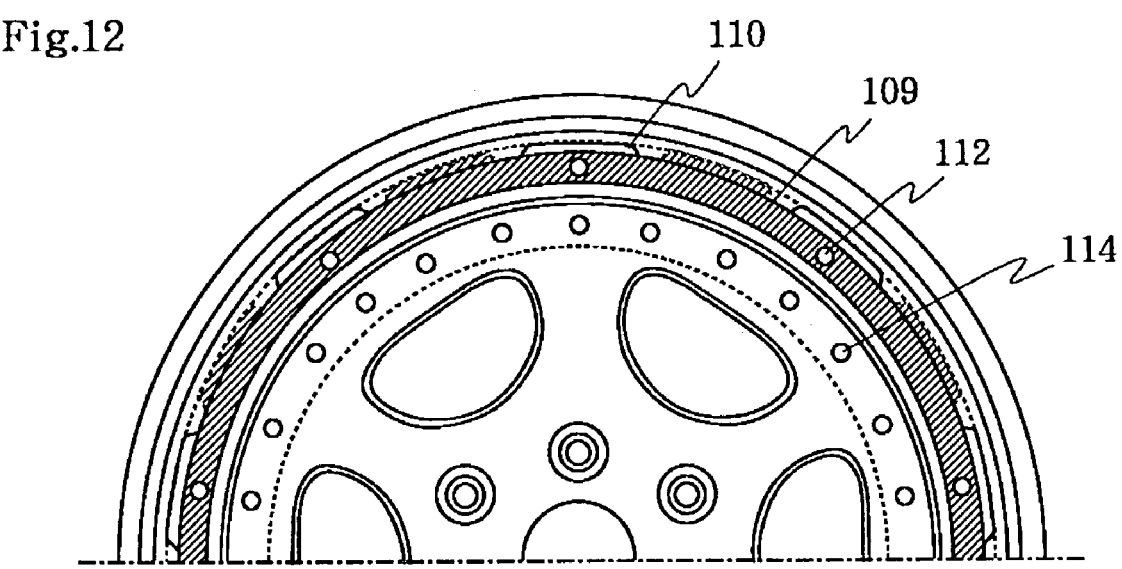
FIG. 12 is an explanatory view showing a manner in which the retainer plate is fitted into the wheel.

Referring to FIG. 11, the retainer plate 109 has on its outer periphery a series of projections/recesses to correspond to a series of projections/recesses 100 formed circumferentially along the inner peripheral surface 104 of the rim. Upon assembly, the projections of the retainer plate 109 are engaged with the recesses of the projections/recesses 110 on the inner peripheral surface 104 of the rim. The retainer plate 109 is then rotated until the projections on the outer periphery of the retainer plate 109 overlap the respective projections of the projections/recesses 110 as shown in FIG. 12 (the retainer plate 109 is shown shaded in FIG. 12). Bolts 112 are then screwed into bolt holes, which are spaced apart from one another and are formed through the retainer plate 109 and the wall member 107a, to secure the retainer plate 109 to the wall member 107a. Other fastener means such as pins and rivets may be used in place of the bolts.

Figure 13:
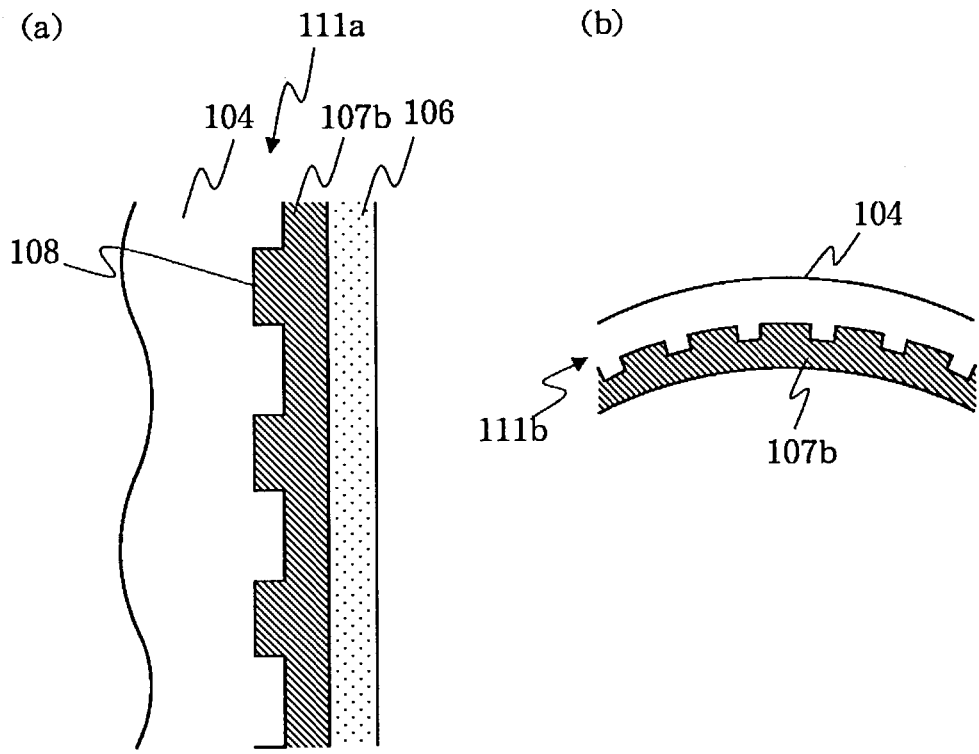
FIG. 13 shows enlarged views showing rotation-preventing means between the rim and the disk.

In the preferred embodiment shown in FIG. 10, the annular stopper 108, which is arranged along the inner peripheral surface of the rim 103 and serves as the fixed stopper, and the retainer plate 109, which serves as the removable stopper, together hold the pair of wall members 107a and 107b from either side thereof in the axial direction. Preferably, means 111 for preventing rotation between the annular stopper 108 and the retainer plate 109 is provided to help the annular stopper 108 and the retainer plate 109 hold the pair of wall members 107a and 107b. For example, as shown in FIG. 13(a), which is viewed from the direction A as indicated by an arrow in FIG. 10, axially projecting projections and corresponding recesses may be provided on the annular stopper 108 and on the wall members 107b, respectively, at several locations along the circumference, so that the projections engage with the respective recesses to serve as rotation-preventing means 111a. Alternatively, as shown in a circumferential cross-section in FIG. 13(b), a plurality of radially projecting projections and corresponding radial recesses may be provided on the inner peripheral surface 104 of the rim adjacent to the annular stopper 108 and on the wall members 107b, respectively, so that the projections engage with the respective recesses to serve as rotation-preventing means 111b. Alternatively, the rotation-preventing means 111 may be provided between the retainer plate 109 and the wall member 107a, or it may be provided in both locations.

In the elastic wheel of the present invention, the construction of the rim is not limited to particular ones: for example, a drop portion 119 may be provided to facilitate rim assembly as shown in FIG. 10. In this regard, it is preferred that the annular stopper be formed by the inner peripheral surface of the drop portion of the rim.

Figure 14:
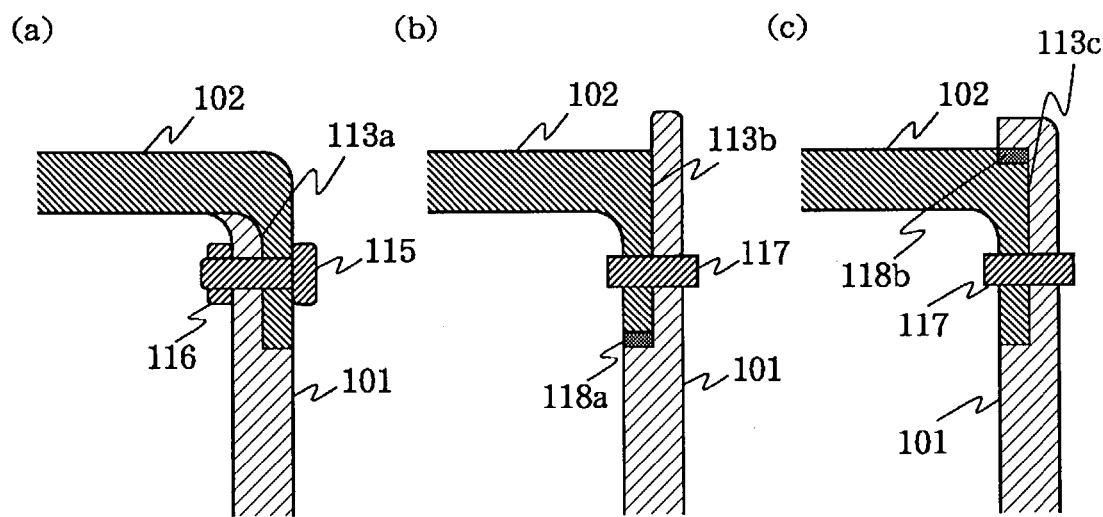
FIG. 14 shows enlarged partial cross-sections each showing a manner in which an outer peripheral surface portion and a radial disk portion of a disk are joined to one another.

In the preferred embodiment shown in FIG. 10, the outer peripheral surface portion 102 of the disk includes on its edge a radial joint portion 113. A radial disk portion 101 and the outer peripheral surface portion 102 are secured to one another by placing a peripheral edge of the radial disk portion 101 over the joint portion 113 from outside and then fastening a plurality of bolts 114. In addition to the connection shown in FIG. 10, the removable attachment of the outer peripheral surface portion 102 to the disk portion 101 may be achieved through connections as depicted in FIG. 14. In the connection shown in FIG. 14(a), the outer peripheral surface portion 102 of the disk includes on its edge a radial joint portion 113a. The disk portion 101 and the outer peripheral surface portion 102 are secured to one another by placing a peripheral edge of the disk portion 101 over the joint portion 113a from inside and then fastening the bolts 115 and the nuts 116. In the connection shown in FIG. 14(b), the disk portion 101 and the outer peripheral surface portion 102 are connected with each other by bringing the disk portion 101 and a joint portion 113b into screw engagement via an axial joint surface 118a and then inserting rotation-preventing means 117 such as pins and bolts. In the connection shown in FIG. 14(c), the disk portion 101 and the outer peripheral surface portion 102 are first brought into screw engagement via an axial joint surface 118b and then rotation-preventing means 117 are placed through a joint portion 113c as in the connection in FIG. 14(b). The rotation-preventing means 117 are most effective when provided at several different locations.

Figure 15:
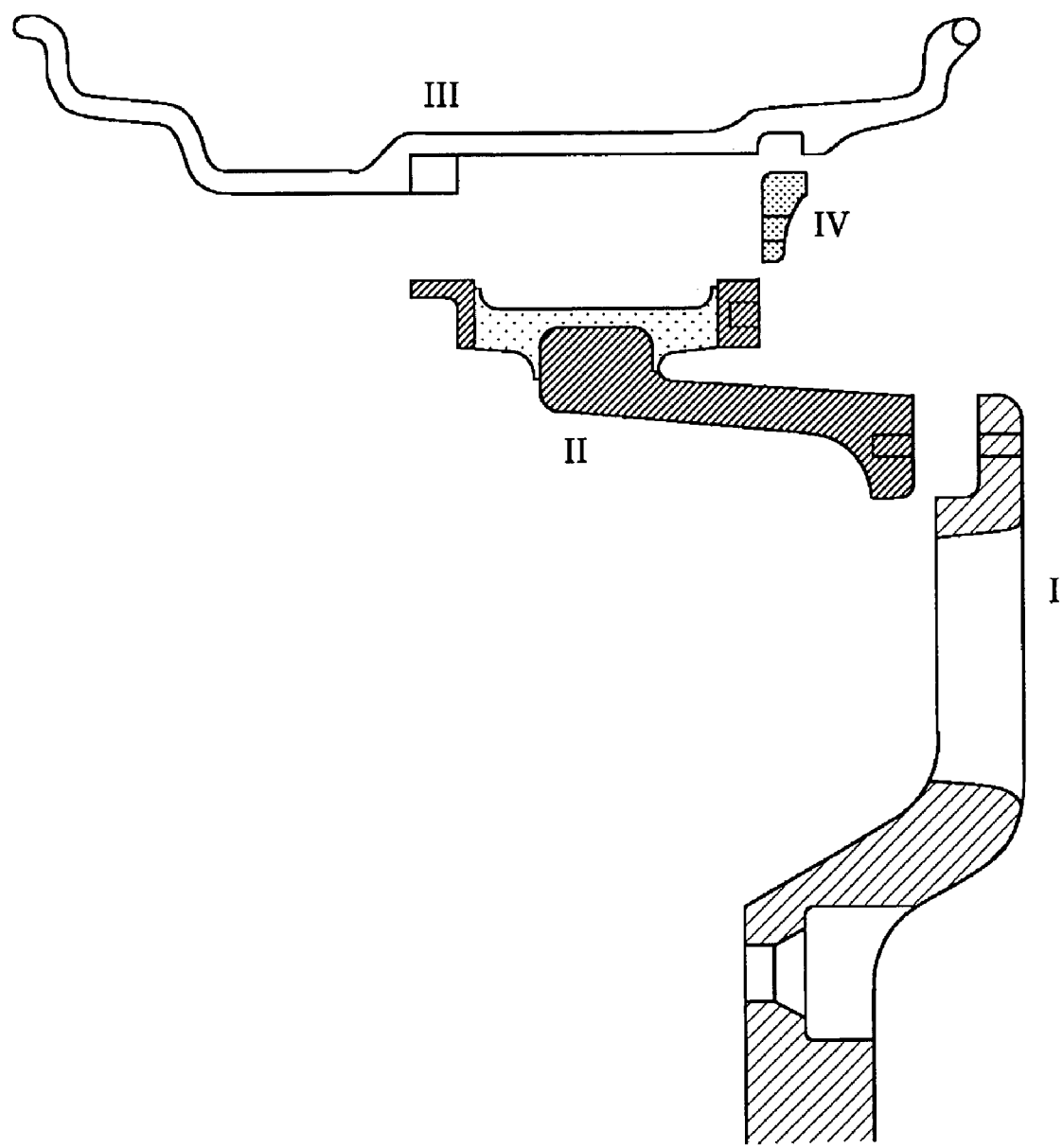
FIG. 15 is an exploded view showing a manner in which the elastic wheel of FIG. 10 is separated.

The elastic wheel according to the preferred embodiment of the present invention as shown in FIG. 10 are divided into four separate units I through IV as shown in an exploded view in FIG. 15. This construction allows replacement of the separate unit II with the attached elastic rubber body 106 in a cartridge-like manner, so that the wheel can have the performance of the elastic rubber body 106 as long as necessary. This construction also allows optimization of characteristics of the wheel to adapt it to a particular application during its use by preparing different separate units II that have different types of elastic members to serve as the elastic rubber body 106 in different arrangements. The construction is also advantageous in that it facilitates rim assembly and core mounting and, when the elastic rubber body 106 is used to serve as the elastic member, vulcanization can be carried out using only the separate unit II but not the integrated rim unit, making it possible to reduce the size of vulcanizing apparatus.

While one exemplary construction of the elastic wheel in which the wheel is divided into four separate units has been described, the present invention contemplates other constructions: for example, the separate units I and II may be formed integrally so that the wheel is only separable between the inner peripheral surface 104 of the rim and the elastic body 106.

Figure 16:
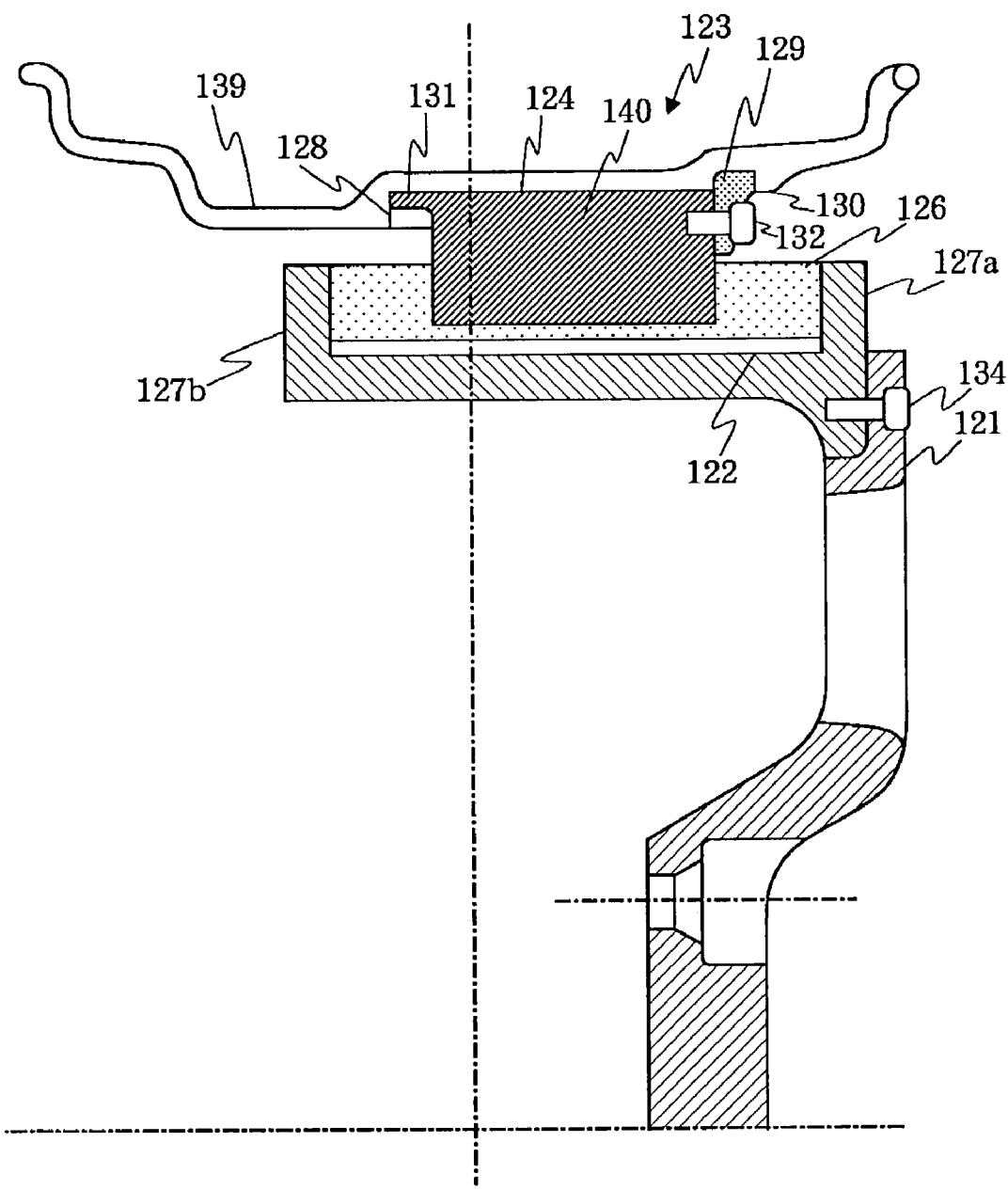
FIG. 16 is an enlarged partial cross-section of another embodiment of the elastic wheel in accordance with the present invention.

Referring to FIG. 16, another embodiment of the elastic wheel of the present invention is shown in which changes have been made to the separate unit II in the above-described preferred embodiment. In this preferred embodiment, an outer peripheral surface portion 122 of the disk includes a pair of annular wall members 127a and 127b, each extending radially outward. An elastic member, for example, an elastic rubber body 126, extends at least axially inward and is attached through, for example, vulcanization to the wall members 127a and 127b. An annular body 140 is secured to the elastic rubber body 126 between ends of the elastic rubber body 126 and is properly spaced apart from the outer peripheral surface portion 122 of the disk. The annular body 140 extends radially outward beyond the wall members 127a and 127b so that a proper distance is maintained between outer peripheral ends of the wall members 127a and 127b and the inner peripheral surface of the rim 123. The annular body 140 is then held between an annular stopper 128 and a retainer plate 129 as in the above-described embodiment. In this manner, not only can the elastic rubber body 126 function as an elastic member, but also the inner peripheral surface of the rim 123 is removably joined to the outer peripheral surface of the annular body 140.

Various selections are possible as to the type and the arrangement of the elastic rubber body 126 as are in the above-described embodiment. While in the embodiment shown, the annular body 140 has a substantially square cross-section in the axial direction, it may be constructed as a hollow structure or I-shaped structure in order to construct a lightweight wheel. Further, as shown, rotation-preventing means 131 is preferably arranged either between the annular body 140 and the annular stopper 128 or between the annular body and the retainer plate (not shown). The location and the arrangement of the rotation-preventing means 131 are properly selected as in the above-described embodiment.

Figure 17:
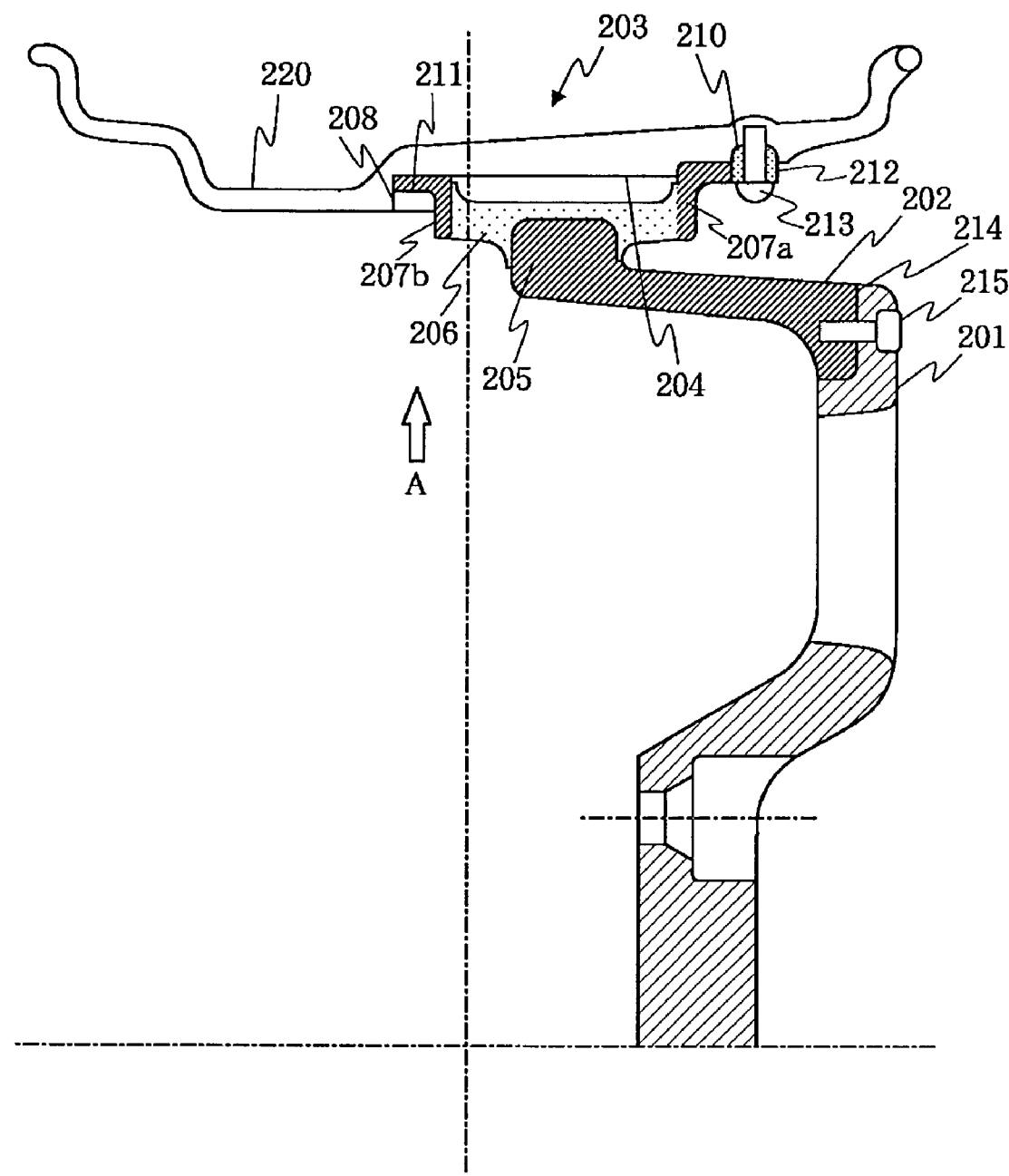
FIG. 17 is an enlarged partial cross-section of still another embodiment of the elastic wheel in accordance with the present invention.

Referring to FIG. 17, another embodiment of the elastic wheel of the present invention is shown. The elastic wheel includes a disk and a rim 203 for mounting a tire. The disk is secured to an axle hub (not shown) and has a radial disk portion 201 and its associated outer peripheral surface portion 202. An elastic rubber body 206 is arranged between an inner peripheral surface 204 of the rim 203 and the outer peripheral surface portion 202 of the disk to serve as the elastic member.

The disk may also be a spoke wheel or a mesh wheel having supporting members such as spokes, mesh, or the like. While any material can be used to form the disk, including steel, aluminum, magnesium, titanium, plastics or the like, aluminum, titanium or plastics are preferred when it is desired to construct a lightweight wheel.

In the preferred embodiment shown in FIG. 17, an annular projection 205 protrudes radially outward from the outer peripheral surface portion 202 of the disk. An annular elastic member, such as an elastic rubber body 206, extends axially on either side of the projection 205 and is secured to the projection 205 through, for example, vulcanization.

A pair of annular wall members 207a and 207b are attached through, for example, vulcanization to the respective ends of the elastic rubber body 206, which extends axially on either side of the projection 205. The pair of wall members 207a and 207b are each spaced apart from the outer peripheral surface portion 202 of the disk by a proper distance and each extend radially outward beyond the projection 205 such that a proper distance is maintained between the projection 205 and the inner peripheral surface 204 of the rim 203. An annular stopper 208 and a C-ring 209, each provided on the inner peripheral surface 204 of the rim, together hold the pair of wall members 207a and 207b from either side thereof in the axial direction. In this manner, not only can the elastic rubber body 206 function as an elastic member but also the inner peripheral surface of the rim 203 is removably joined to the elastic member.

Although the sheering strain of the elastic rubber body 206 can provide intended functions of the elastic wheel provided that the rubber body axially extends at least on either side of the projection 205, the wheel can be configured to withstand a large input load by forming the elastic rubber body 206 to also extend between the inner peripheral surface 204 of the rim 203 and the projection 205 as illustrated. That is, a portion of the elastic rubber body 206 that extends radially outward from, and continually over the outer surface of, the projection 205 serves as a stopper to prevent collision between the projection 205 and the inner peripheral surface 204 of the rim 203 upon application of a large input load. Aside from the elastic rubber body 206, the elastic member may be configured as a plurality of spring members that are circumferentially spaced apart from one another and each axially extends on either side of the projection 205. In this regard, the spring members may be arranged to extend between the projection 205 and the inner peripheral surface 204 of the rim and are circumferentially spaced apart from one another. The type and the location of the elastic member are properly selected depending on their applications. Also, more than one elastic member may be prepared for a single elastic wheel.

The projection 205 may be formed as an annular member that has an inverted U-shaped cross-section in the axial direction (not shown) and is secured to, and extends radially outward from, a base rim (not shown) arranged on the outer peripheral surface portion 202 of the disk. Alternatively, the projection 205 may be formed to have an annular space extending therethrough. Each of these constructions helps reduce the weight of the wheel.

The C-ring 209 is fitted in an annular groove 210 formed on the inner peripheral surface 204 of the rim. Specifically, the C-ring 209 is elastically deformed by making use of holes 221 shown in FIG. 18 and is placed in the annular groove 210, where it is allowed to resume unstrained shape to be held in place. A head 212 is then plugged into a gap formed in the C-ring 209 and is secured to the rim 203 by means of a fastener such as a bolt 213 (the C-ring 209 is shown shaded in FIG. 19). Other fastener means such as pins and rivets may be used in place of the bolts as fasteners.

Figure 18:
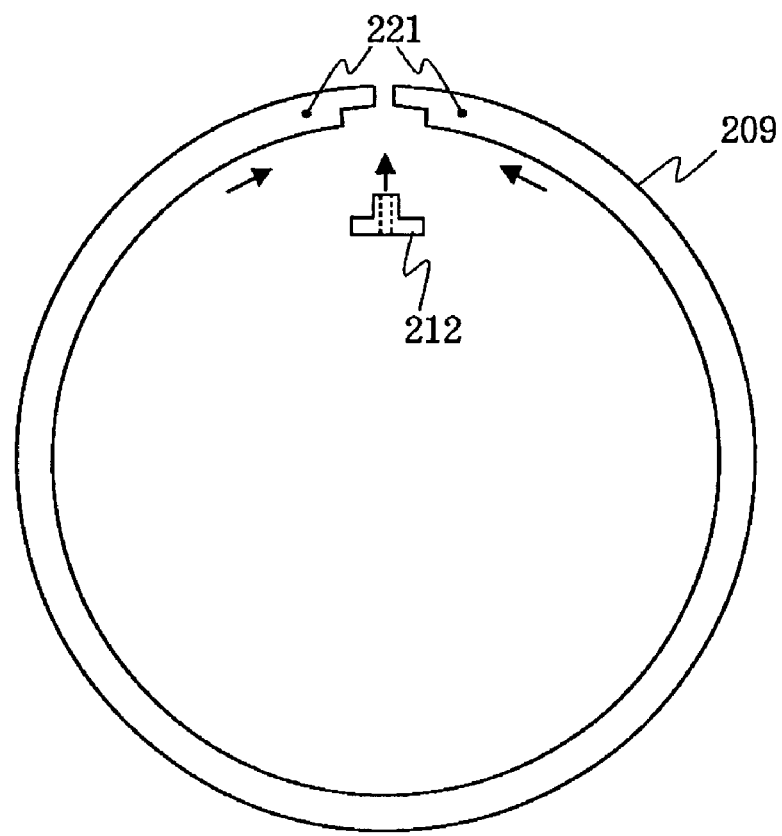
FIG. 18 is a plan view showing a C-ring.
Figure 19:
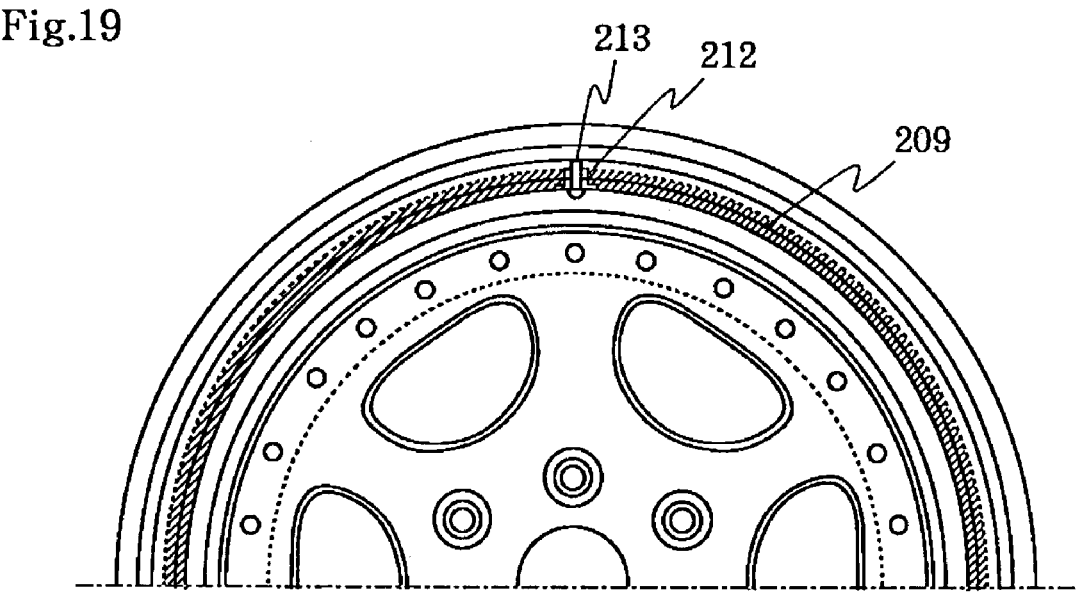
FIG. 19 is an explanatory showing a manner in which the C-ring is fitted into the wheel.
Figure 20:
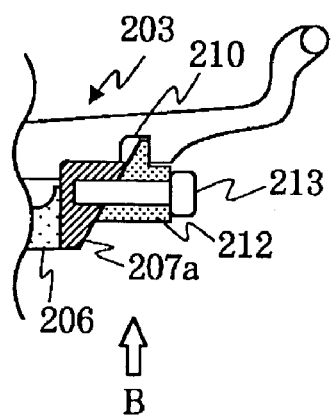
FIG. 20 is a partial enlarged view showing a connection between a wall member and a head.
Figure 21:
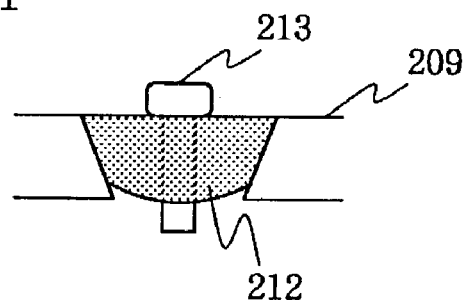
FIG. 21 is a partial enlarged view showing a manner in which a head is plugged into a C-ring.

While one exemplary construction of the C-ring has been described with reference to FIGS. 17 through 19, other construction of the C-ring may also be conceived of, such as that shown in FIG. 20, wherein the contact surface between the C-ring 209 and the wall member 207a that the C-ring 209 is held in contact with is sloped with respect to the radial direction of the wheel. In such a case, as described above, the C-ring 209 is elastically deformed and placed in the annular groove 210, where it is allowed to resume unstrained shape to be held in place. The head 212 is then plugged into the gap formed in the C-ring 209 and is secured to the wall member 207a by means of the bolt 213 inserted in the axial direction of the wheel. In the C-ring and the head constructed in this manner, the tapered structure causes the wall members 207a and 207b to be fastened in the axial direction from either side as the bolt 213 is screwed thereinto, so that the wall members 207a and 207b are more firmly secured to the inner peripheral surface of the rim. Also, by constructing the head 212 and the gap of the C-ring 209 for receiving the head 212 in the manner shown in FIG. 21, which is viewed from the direction B indicated by an arrow in FIG. 20, the tapered construction of the head 212 causes the C-ring 209 to expand as the bolt 213 is screwed thereinto. As a result, the C-ring 209 is secured within the annular groove 210 more firmly. Aside from the bolt 213, fasteners such as a screw may also be used. Alternatively, the bolt may be arranged to project from the wall member 207a and secured with a nut.

Figure 22:
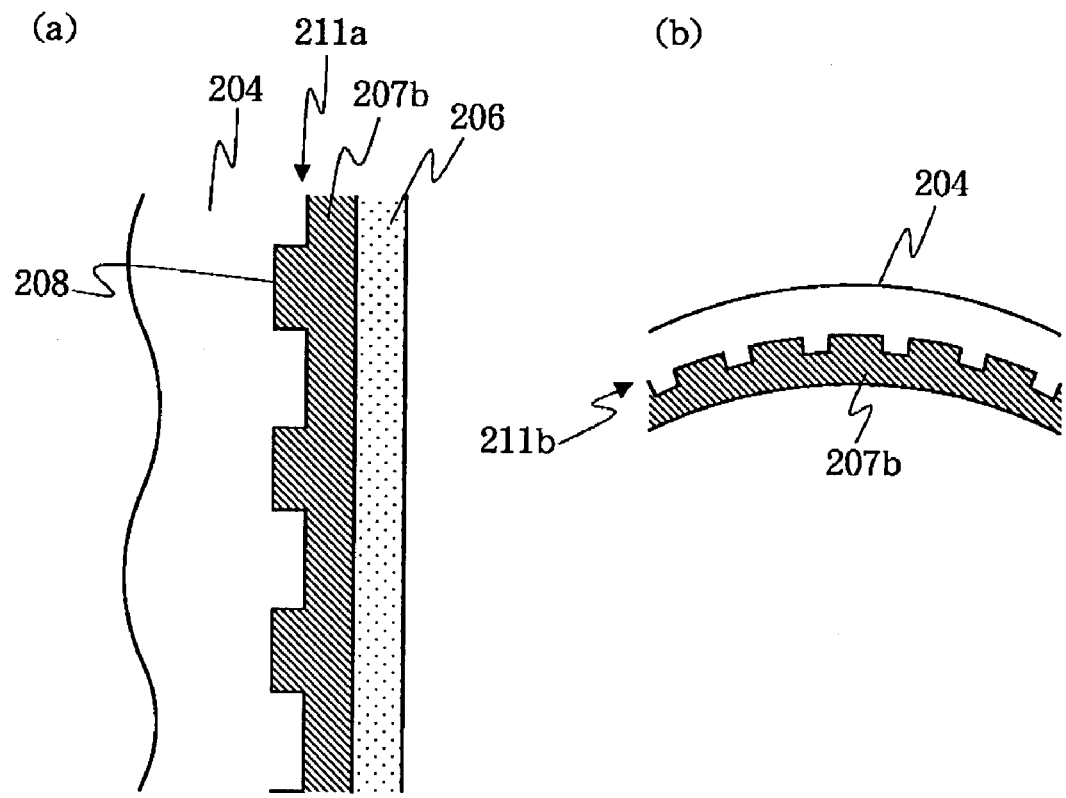
FIG. 22 is an enlarged view showing rotation-preventing means provided between a rim and a disk.

In the preferred embodiment above, the annular stopper 208, which is formed along the inner peripheral surface of the rim 203 and serves as the fixed stopper, and the C-ring 209, which serves as the removable stopper, together hold the pair of wall members 207a and 207b from either side thereof in the axial direction. Preferably, means 211 for preventing rotation between the annular stopper 208 and the C-ring 209 is provided to help the annular stopper 208 and the C-ring 209 hold the pair of wall members 207a and 207b. For example, as shown in FIG. 22(a), which is viewed from the direction A as indicated by an arrow in FIG. 17, axially projecting projections and corresponding recesses may be provided on the annular stopper 208 and on the wall members 207b, respectively, at several locations along the circumference, so that the projections engage with the respective recesses to serve as rotation-preventing means 211a. Alternatively, as shown in a circumferential cross-section in FIG. 22(b), a plurality of radially projecting. projections and corresponding radial recesses may be provided on the inner peripheral surface 204 of the rim adjacent to the annular stopper 208 and on the wall members 207b, respectively, so that the projections engage with the respective recesses to serve as rotation-preventing means 211b. Alternatively, the rotation-preventing means 211 may be provided between the C-ring 209 and the wall member 207a, or it may be provided in both locations.

In the elastic wheel of the present invention, the construction of the rim is not limited to a particular construction: for example, a drop portion 220 may be provided to facilitate rim assembly as shown in FIG. 17. In this regard, it is preferred that the annular stopper be formed by the inner peripheral surface of the drop portion of the rim.

Figure 23:
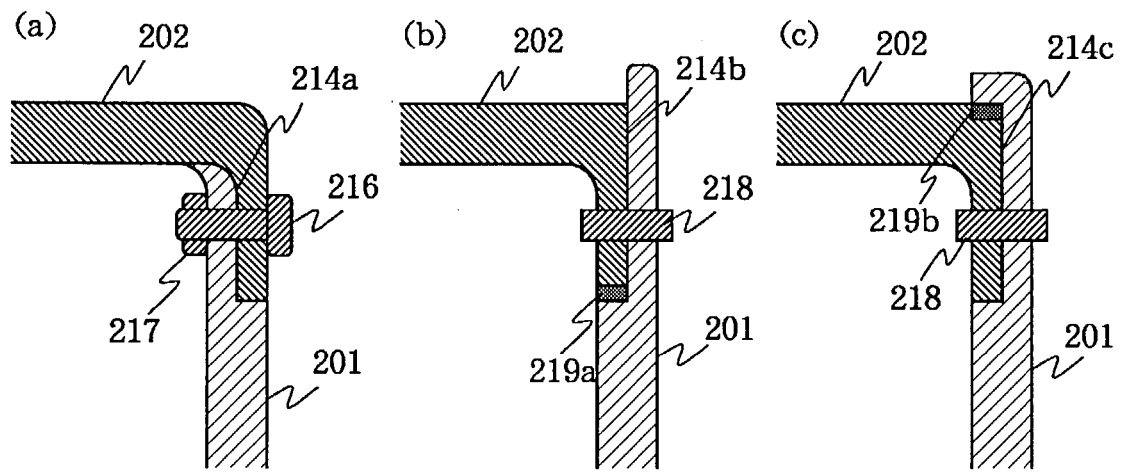
FIG. 23 shows enlarged partial cross-sections each showing a connection between an outer peripheral surface portion and a radial disk portion of a disk.

In the preferred embodiment shown in FIG. 17, the outer peripheral surface portion 202 of the disk includes on its edge a radial joint portion 214. A radial disk portion 201 and the outer peripheral surface portion 202 are secured to one another by placing a peripheral edge of the disk portion 201 over the joint portion 214 from outside and then fastening bolts 215. Aside from the connection shown in FIG. 17, the removable attachment of the outer peripheral surface portion 202 to the disk portion 201 may be achieved through connections as depicted in FIG. 23. In the connection shown in FIG. 23(a), the outer peripheral surface portion 202 of the disk includes on its edge a radial joint portion 214a. The disk portion 201 and the outer peripheral surface portion 202 are secured to one another by placing a peripheral edge of the disk portion 201 over the joint portion 214a from inside and then fastening the bolts 216 and the nuts 217. In the connection shown in FIG. 23(b), the disk portion 201 and the outer peripheral surface portion 202 are connected with each other by bringing the disk portion 201 and a joint portion 214b into screw engagement via an axial joint surface 219a and then inserting rotation-preventing means 218 such as pins and bolts. In the connection shown in FIG. 23(c), the disk portion 201 and the outer peripheral surface portion 202 are first brought into screw engagement via an axial joint surface 219b and then rotation-preventing means 218 are placed through a joint portion 214c as in the connection in FIG. 23(b). The rotation-preventing means 218 are most effective when provided at several different locations.

Figure 24:
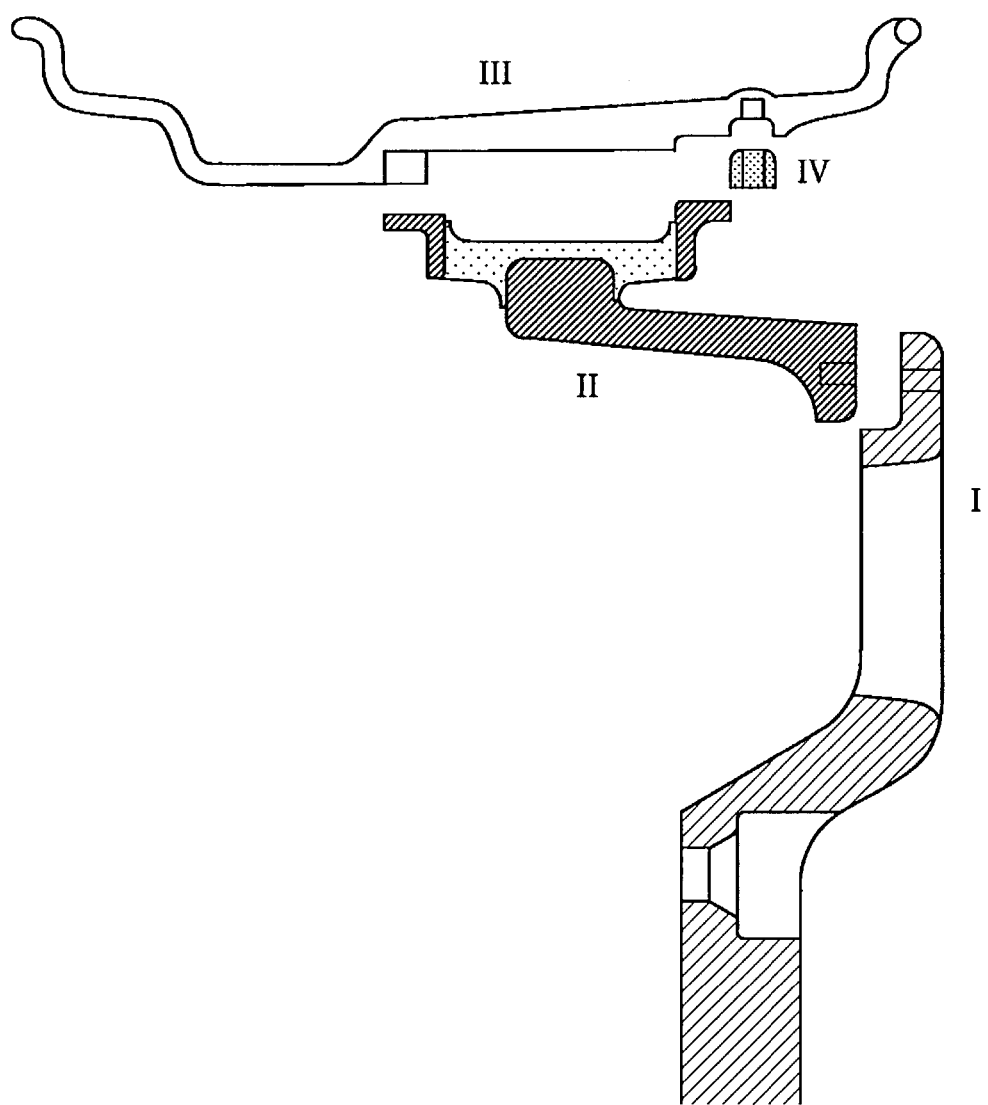
FIG. 24 is an exploded view showing a manner in which the elastic wheel of FIG. 17 is separated.

The elastic wheel according to the preferred embodiment of the present invention as shown in FIG. 17 is divided into four separate units I through IV as shown in an exploded view in FIG. 24. This construction allows replacement of the separate unit II with the attached elastic rubber body 206 in a cartridge-like manner, so that the wheel can have the performance of the elastic rubber body 206 as long as necessary. This construction also allows optimization of characteristics of the wheel to adapt it to a particular application during its use by preparing different separate units II that have different types of elastic members to serve as the elastic rubber body 206 in different arrangements. The construction is also advantageous in that it facilitates rim assembly and core mounting and, when the elastic rubber body 206 is used to serve as the elastic member, vulcanization can be carried out using only the separate unit II but not the integrated rim unit, which makes it possible to reduce the size of vulcanizing apparatus.

While one exemplary construction of the elastic wheel in which the wheel is divided into four separate units has been described, the present invention contemplates other constructions: for example, the separate units I and II may be formed integrally so that the wheel is only separable between the inner peripheral surface 204 of the rim and the elastic body 206.

Figure 25:
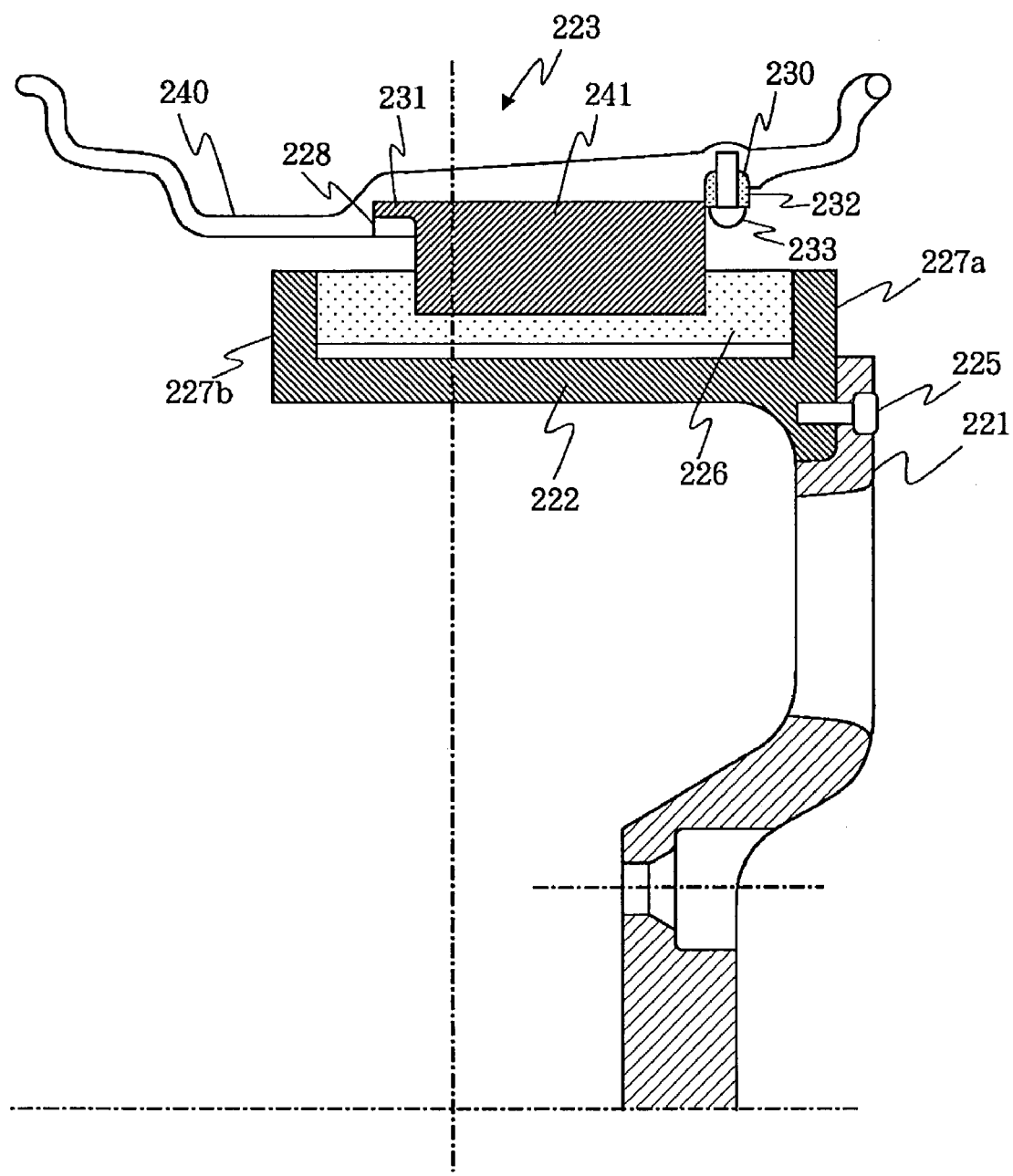
FIG. 25 is an enlarged partial cross-section of another embodiment of the elastic wheel in accordance with the present invention.

Referring to FIG. 25, another embodiment of the elastic wheel of the present invention is shown in which changes have been made to the separate unit II of the above-described preferred embodiment. In this preferred embodiment, an outer peripheral surface portion 222 of the disk includes a pair of annular wall members 227a and 227b, each extending radially outward. An elastic member, for example, an elastic rubber body 226, extends at least axially inward and is attached through, for example, vulcanization to the wall members 227a and 227b. An annular body 241 is secured to the elastic rubber body 226 between ends of the elastic rubber body 226 and is properly spaced apart from the outer peripheral surface portion 222 of the disk. In the embodiment shown, the elastic rubber body 226 extends over the inner peripheral surface of the annular body 241 and is integrated with the annular body 241. The annular body 241 extends radially outward beyond the wall members 227a and 227b so that a proper distance is maintained between outer peripheral ends of the wall members 227a and 227b and the inner peripheral surface of the rim 223. The annular body 241 is then held between an annular stopper 228 and a C-ring as in the above-described preferred embodiment. In this manner, not only can the elastic rubber body 226 function as an elastic member, but also removable joint is achieved between the inner peripheral surface of the rim 223 and the outer peripheral surface of the annular body 241.

Various selections are possible as to the type and the arrangement of the elastic rubber body 226 as are in the above-described embodiment. While in the embodiment shown, the annular body 241 has a substantially square cross-section in axial direction, it may be constructed as a hollow structure or I-shaped structure in order to construct a lightweight wheel. Further, as shown, rotation-preventing means 231 is preferably arranged either between the annular body 241 and the annular stopper 228 or between the annular body and the C-ring (not shown). The location and the arrangement of the rotation-preventing means 231 are properly selected as in the above-described embodiment.

Figure 26:
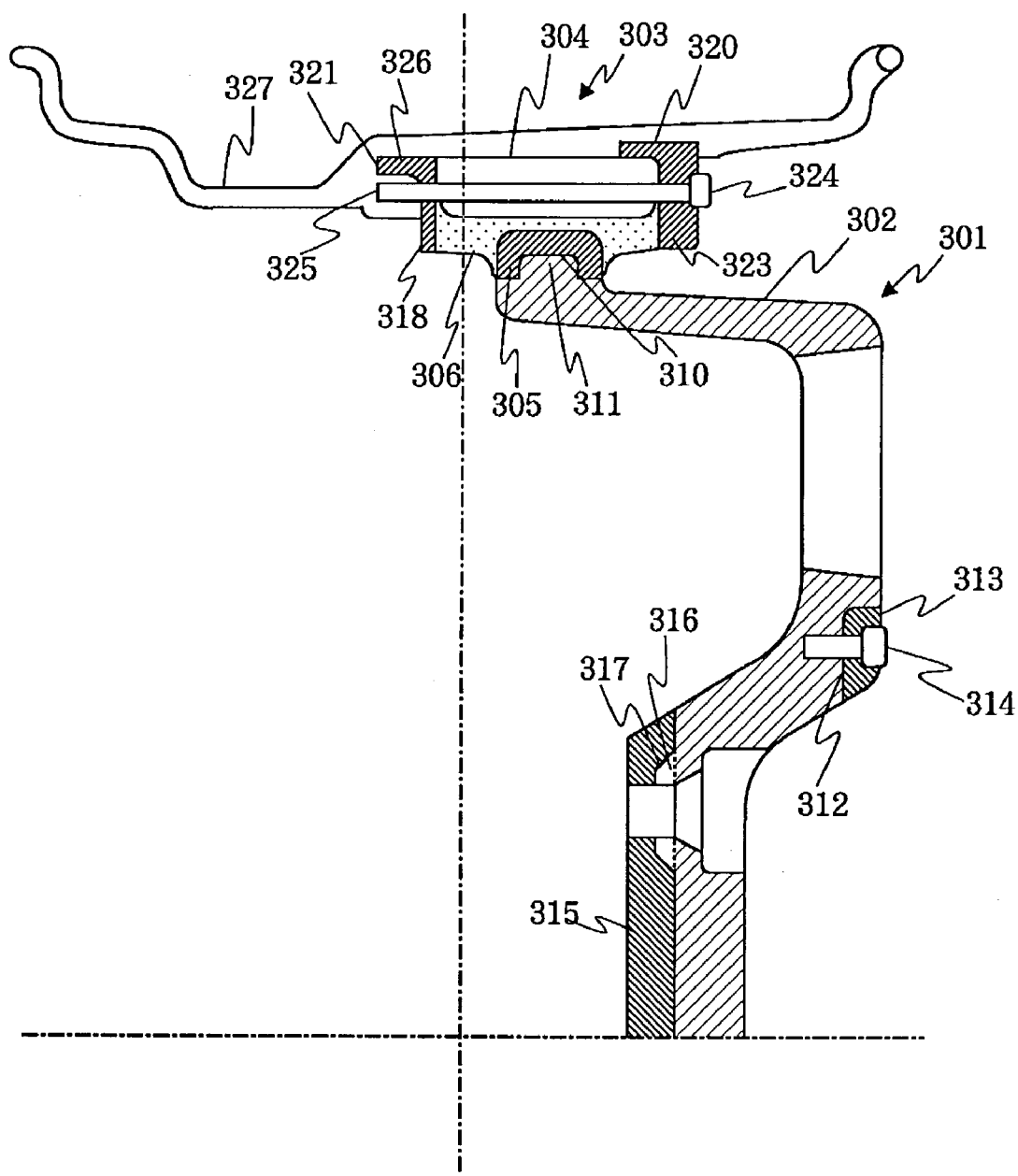
FIG. 26 is an enlarged partial cross-section of another embodiment of the elastic wheel in accordance with the present invention.

Referring to FIG. 26, a further embodiment of the elastic wheel of the present invention is shown. The elastic wheel includes a disk 301 and a rim 303 for mounting a tire. The disk 301 is secured to an axle hub (not shown) and has an outer peripheral surface 302. An elastic rubber body 306 is arranged between an inner peripheral surface 304 of the rim 303 and the outer peripheral surface 302 of the disk to serve as an elastic member.

The disk 301 may also be a spoke wheel or a mesh wheel having supporting members such as spokes, mesh, or the like. While any material can be used to form the disk, including steel, aluminum, magnesium, titanium, plastics or the like, aluminum, titanium or plastics are preferred when it is desired to construct a lightweight wheel.

In the preferred embodiment shown in FIG. 26, an annular projection 305 protrudes radially outward from the outer peripheral surface portion 302 of the disk. An annular elastic rubber body 306, which is an elastic member that extends axially on either side of the projection 305 as well as radially outward from the projection 305, is secured to the projection 305 through, for example, vulcanization. Considering the fact that, in the present invention, the elastic member allows relative displacement between the rim 303 and the disk 301 and thus serves to provide passenger comfort, anti-vibration performance and noise-suppression performance particular to the elastic wheel, the arrangement of the elastic member should not be limited to specific ones, provided that the desired performances are obtained: for example, the annular elastic rubber body 306 may be arranged directly between the inner peripheral surface 304 of the rim and the outer peripheral surface of the projection 305 and secured to the respective surfaces through, for example, vulcanization.

Aside from the elastic rubber body 306, the elastic member may be configured as a plurality of spring members that are circumferentially spaced apart from one another and each axially extends on either side of the projection 305. In this regard, the spring members may be arranged to extend between the outer peripheral surface of the projection 305 and the inner peripheral surface 304 of the rim and are circumferentially spaced apart from one another. The type and location of the elastic member are properly selected depending on their applications.

Formed on the inner peripheral surface of the projection 305 is a circumferential groove 310, with which a raised portion 311 formed on the outer peripheral surface of the disk 301 is removably engaged. The disk 301 in this case is cut along the radius into several pieces.

Figure 27:
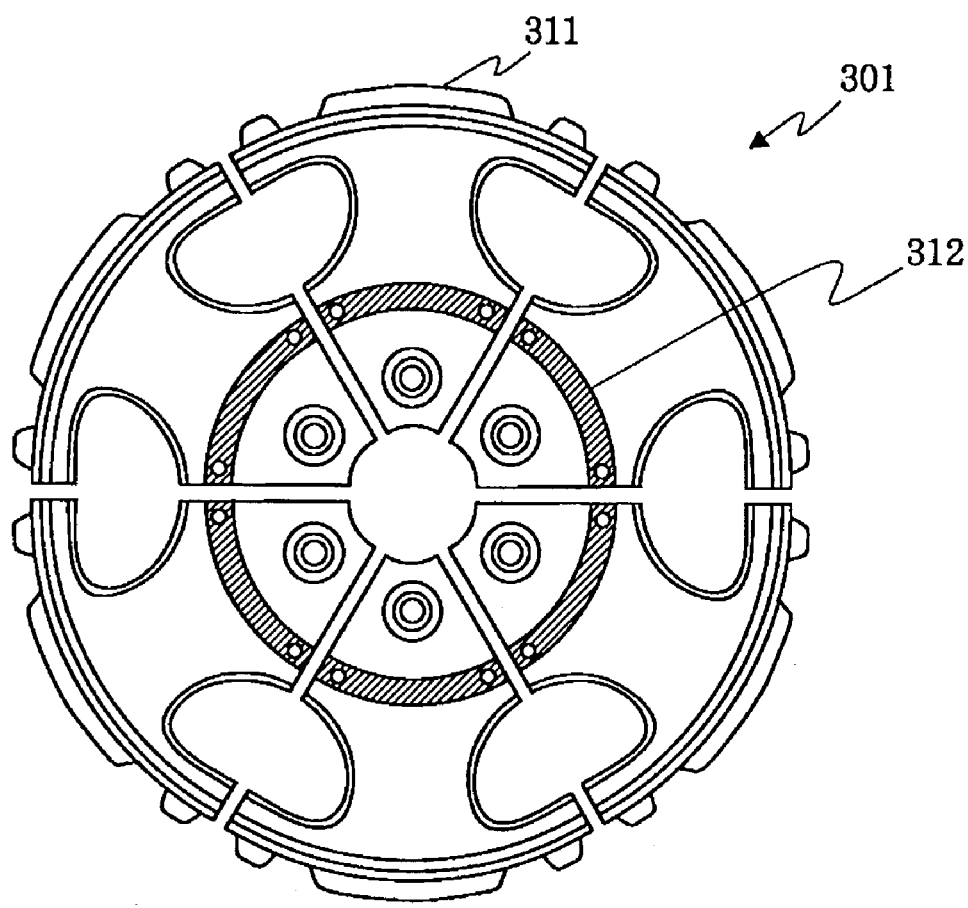
FIG. 27 shows plan views showing a split disk and a hold ring, respectively.
Figure 27:
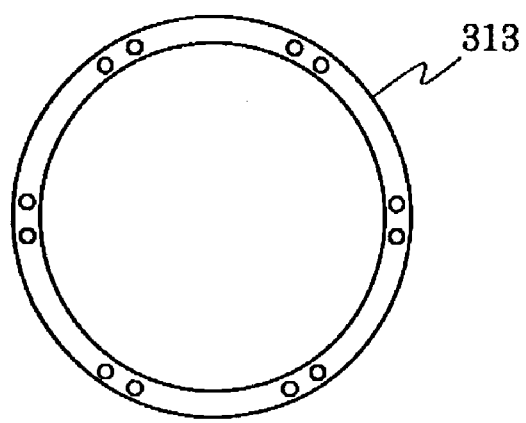

As shown in FIG. 27(a), the disk 301 is equally cut along the radius of the wheel into several pieces. While the disk is split into six pieces in the embodiment shown, it may preferably be split into three to eight pieces. The raised portion 311 formed on the outer peripheral surface of the disk may be of any shape and any number and is selected such that it can engage with the circumferential groove 310 on the inner peripheral surface of the projection 305 to effectively prevent rotation of the disk and provide the wheel with sufficient strength to withstand the axial force.

The pieces of the disk are held together by placing a hold ring 313 in a circular groove 312 formed on an outer surface of the disk and then fastening the ring with, for example, bolts 314. In addition, a circular plate 315 is arranged on the opposite surface of the disk that comes into contact with the axle hub. A periphery 316 of a bolt hole formed in the disk 301 is raised toward the circular plate and a corresponding recess 317 is provided on the circular plate 315 to allow engagement of the disk 301 with the circular plate 315. This construction also strengthens the joint between the pieces of the disk.

While the arrangement of the elastic member is not limited to particular ones, it is advantageous to design the wheel that is also separable between the inner peripheral surface 304 of the rim and the elastic member, so that the projection 305, together with the elastic member, can be separated from the rim 303 and only this part needs to be replaced as a unit. This construction makes it possible to reduce the size of the vulcanizing apparatus when the elastic rubber body 306 is used as the elastic member, since it is no longer necessary to use the whole wheel including the integrated rim 303 in the vulcanization process.

The construction shown in FIG. 26 provides one preferred embodiment of the elastic wheel that is separable between the inner peripheral surface 304 of the rim 303 and the elastic member. In this embodiment, the elastic rubber body 306, serving as the elastic member, is secured to the projection 305 and axially extends at least on either side of the projection 305. Although the sheering strain of the elastic rubber body 306 can provide intended functions of the elastic wheel provided that the rubber body axially extends at least on either side of the projection 305, the wheel can be configured to withstand a large input load by forming the elastic rubber body 306 to also extend between the inner peripheral surface 304 of the rim 303 and the projection 305 as illustrated. That is, a portion of the elastic rubber body 306 that extends radially outward from, and continually over the outer surface of, the projection 305 serves as a stopper to prevent collision between the projection 305 and the inner peripheral surface 304 of the rim 303 upon application of a large input load.

A wall member 318 is attached through, for example, vulcanization, to one end of the elastic rubber body 306, which axially extends on either side of the projection 305 and is properly spaced apart from the outer peripheral surface 302 of the disk. Attached to the other end of the elastic rubber body 306 again through vulcanization is a C-ring 319. The wall member 318 and the C-ring 319 each extend radially outward beyond the projection 305 such that a proper distance is maintained between the projection 305 and the inner peripheral surface 304 of the rim 303. The C-ring 319 is received in an annular groove 320 formed on the inner peripheral surface of the rim, whereas the wall member 318 abuts an annular stopper 321 formed on the inner peripheral surface of the rim and is kept from moving axially. In the embodiment shown, a portion of the wall member 318 that comes into contact with the inner peripheral surface of the rim is bent at a right angle toward the annular stopper 321. The bent portion is received in an annular slot formed in the axial direction on the annular stopper 321. In this manner, not only can the elastic rubber body serve as an elastic member, but also the inner peripheral surface of the rim 303 is removably joined to the elastic rubber body 306.

Figure 29:
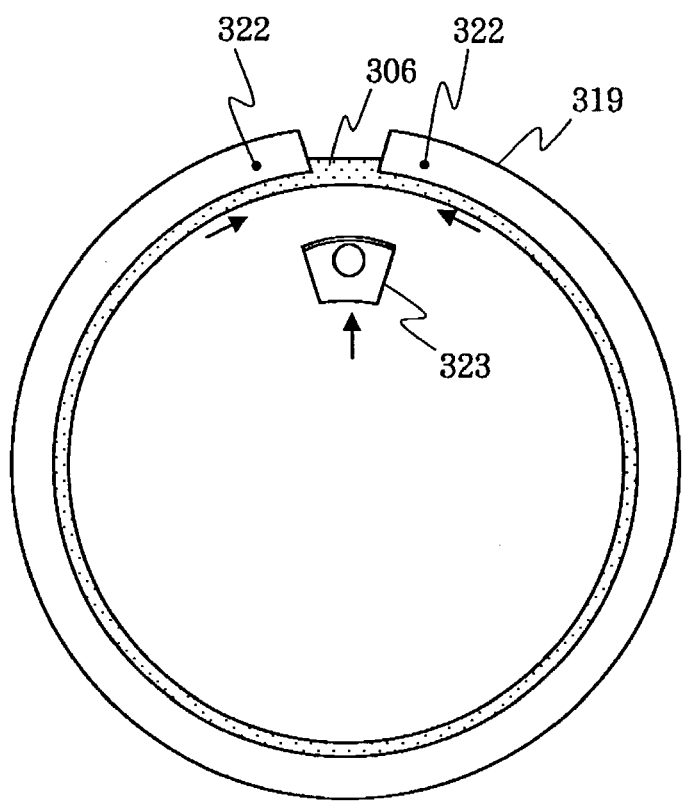
FIG. 29 is a plan view showing a C-ring.
Figure 30:
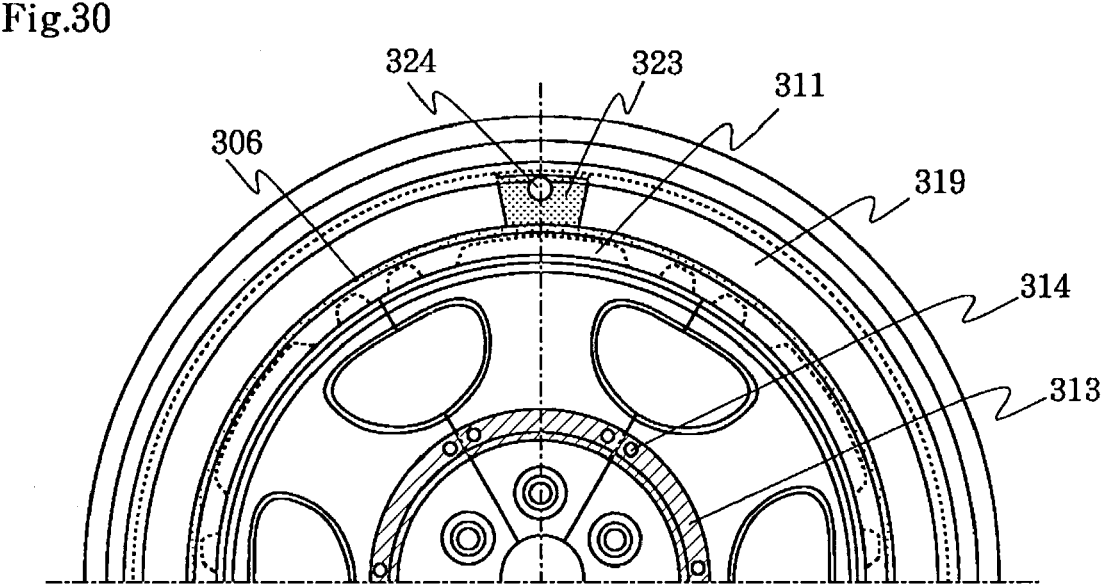
FIG. 30 is an explanatory view showing a manner in which the split disk is fitted into the wheel.

The C-ring 319 is fitted in the annular groove 320 arranged on the inner peripheral surface 304 as follows. First, the C-ring 319 with the elastic rubber body 306 attached thereto is elastically deformed by making use of holes 322 shown in FIG. 29 and is placed into the annular groove 320. It is then allowed to resume unstrained shape to be held in place in the annular groove 320. A head 323, as shown in FIG. 30, is plugged into a gap formed in the C-ring 319 and is secured to the rim 303 by means of a bolt 324. The bolt 324 is screwed into a hole 325 formed in the annular stopper 321 through the wall member 318. This construction also serves to prevent rotation between the disk 301 and the rim 303.

Figure 31:
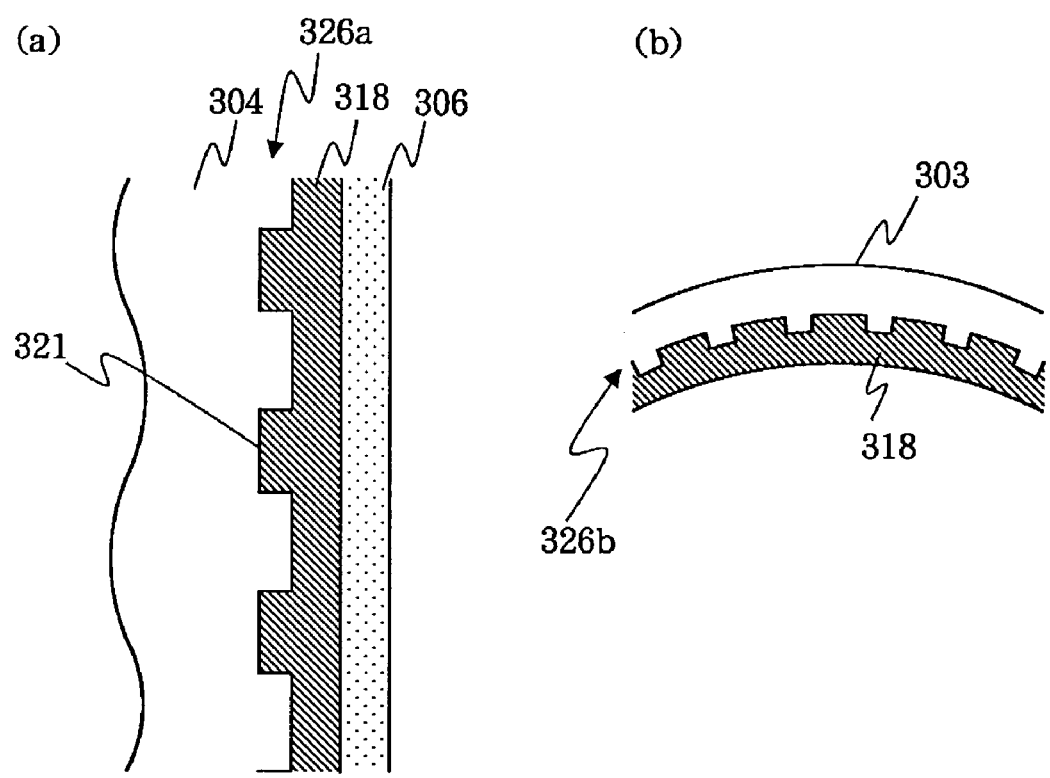
FIG. 31 shows enlarged views each showing rotation-preventing means provided between a rim and a disk.

Preferably, rotation-preventing means 326 is provided between the wall member 318 and the annular stopper 321 to prevent rotation between the disk and the rim 303. For example, as shown in FIG. 31(a), axially projecting projections and corresponding recesses may be provided on the stopper 321 and on the wall member 318, respectively, at several locations along the circumference, so that the projections engage with the respective recesses to serve as rotation-preventing means 326a. Alternatively, as shown in a circumferential cross-section in FIG. 31(b), a plurality of radially projecting projections and corresponding radial recesses may be provided on the inner peripheral surface 304 of the rim 303 adjacent to the stopper 321 and on the wall member 318, respectively, so that the projections engage with the respective recesses to serve as rotation-preventing means 326b. The rotation-preventing means 326 may be provided between the C-ring 319 and the inner peripheral surface 304 of the rim, or it may be provided in both locations.

While in the above-described embodiment, the raised portion 311 and the circumferential groove 310 are formed on the outer peripheral surface 302 of the disk 301 and on the inner peripheral surface 304 of the rim 303, respectively, the same effects can be achieved by forming the circumferential groove and the raised portion on the outer peripheral surface 302 of the disk 301 and on the inner peripheral surface 304 of the rim 303, respectively.

In the elastic wheel of the present invention, the construction of the rim is not limited to a particular construction: for example, a drop portion 327 may be provided to facilitate rim assembly as shown in FIG. 26. In this regard, it is preferred that the annular stopper be formed by the inner peripheral surface of the drop portion of the rim.

Figure 28:
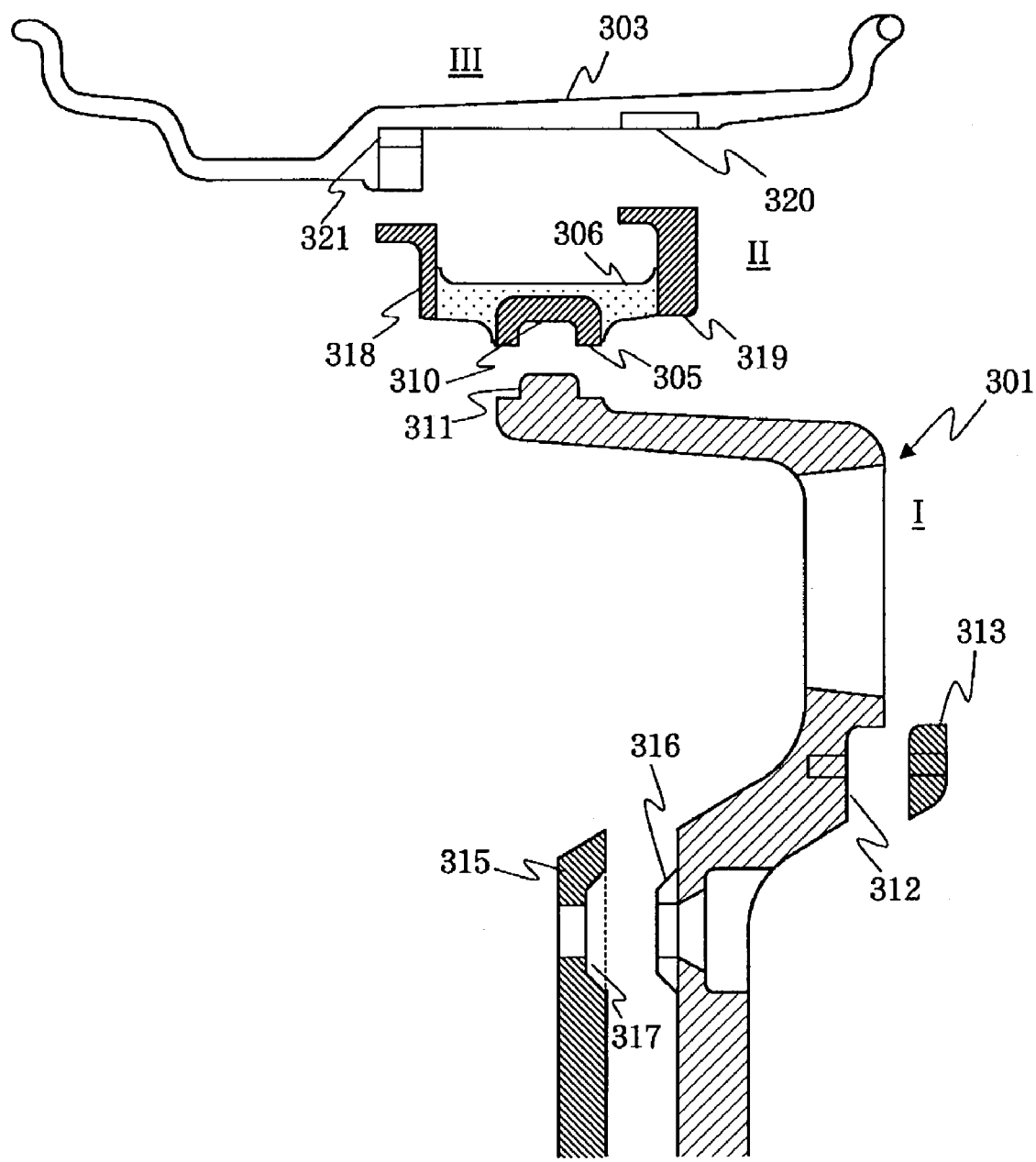
FIG. 28 is an exploded view showing a manner in which the elastic Wheel of FIG. 26 is separated.

The elastic wheel according to the preferred embodiment of the present invention as shown in FIG. 26 is divided into three separate units I through III as shown in an exploded view in FIG. 28. This construction allows replacement of the separate unit II with the attached elastic rubber body 306 in a cartridge-like manner, so that the wheel can have the performance of the elastic rubber body 306 as long as necessary. This construction also allows optimization of characteristics of the wheel to adapt it to a particular application during its use by preparing different separate units II that have different types of elastic members to serve as the elastic rubber body 306 in different arrangements. The construction is also advantageous in that it facilitates rim assembly and core mounting and, when the elastic rubber body 306 is used to serve as the elastic member, vulcanization can be carried out using only the separate unit II but not the integrated rim unit, making it possible to reduce the size of vulcanizing apparatus.

Figure 32:
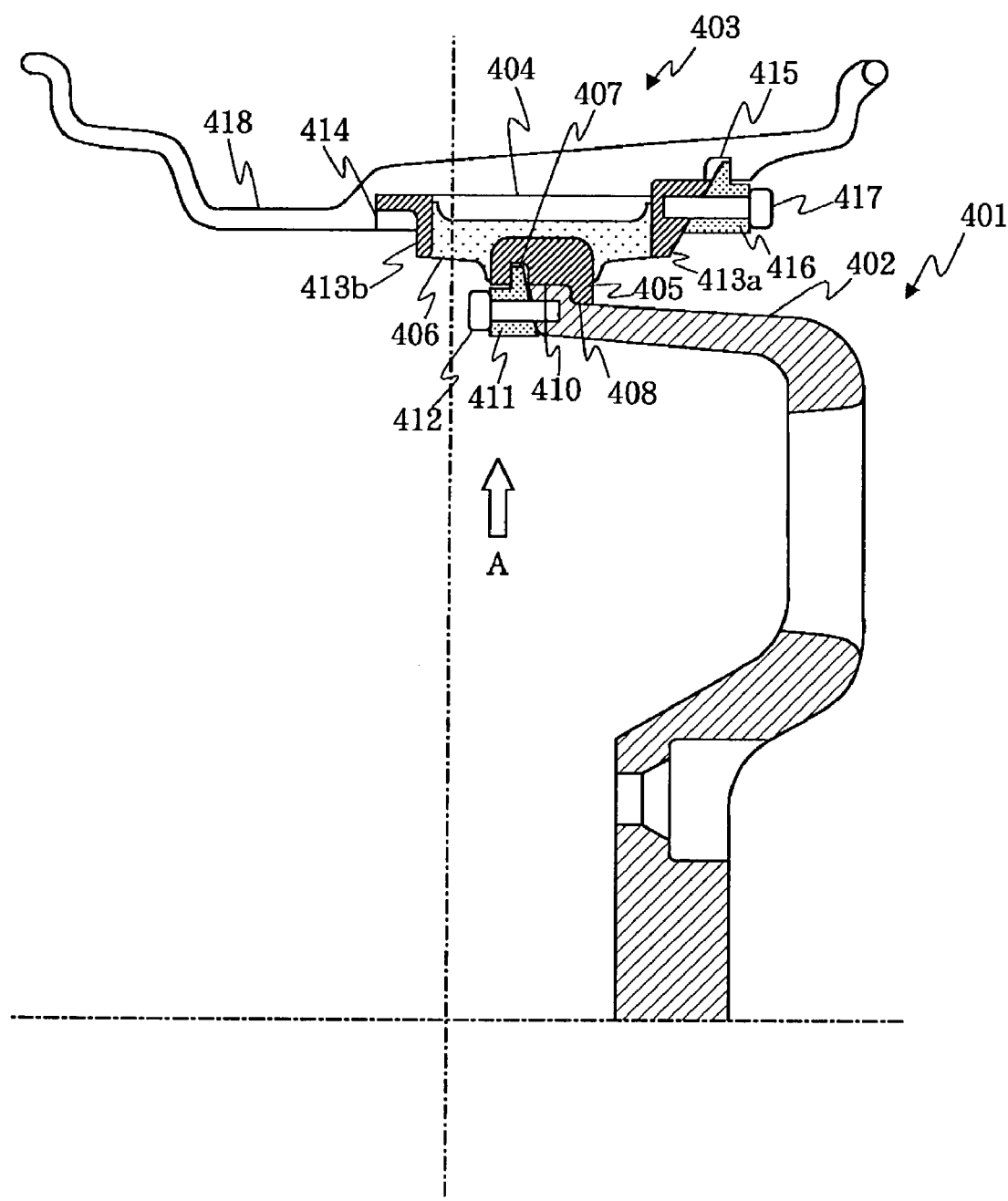
FIG. 32 is an enlarged partial cross-section showing another embodiment of the elastic wheel in accordance with the present invention.

Referring to FIG. 32, a further embodiment of the elastic wheel of the present invention is shown. The elastic wheel includes a disk 401 and a rim 403 for mounting a tire. The disk 401 is secured to an axle hub (not shown) and has an outer peripheral surface portion 402. An elastic rubber body 406 is arranged between an inner peripheral surface 404 of the rim 403 and the outer peripheral surface 402 of the disk to serve as an elastic member.

The disk 401 may also be a spoke wheel or a mesh wheel having supporting members such as spokes, mesh, or the like. While any material can be used to form the disk, including steel, aluminum, magnesium, titanium, plastics or the like, aluminum, titanium or plastics are preferred when it is desired to construct a lightweight wheel.

In the preferred embodiment shown in FIG. 32, an annular projection 405 protrudes radially outward from the outer peripheral surface portion 402 of the disk. An annular elastic rubber body 406, which is an elastic member that extends axially on either side of the projection 405 as well as radially outward from the projection 405, is secured to the projection 405 through, for example, vulcanization. Considering the fact that, in the present invention, the elastic member allows relative displacement between the rim 403 and the disk 401 and serves to provide passenger comfort, anti-vibration performance and noise-suppression performance particular to the elastic wheel, the arrangement of the elastic member is not limited to specific ones, provided that the desired performances are obtained: for example, the annular elastic rubber body 406 may be arranged directly between the inner peripheral surface 404 of the rim and the outer peripheral surface of the projection 405 and secured-to the respective surfaces through, for example, vulcanization.

Aside from the elastic rubber body 406, the elastic member may be configured as a plurality of spring members that are circumferentially spaced apart from one another and each axially extends on either side of the projection 405. In this regard, the spring members may be arranged to extend between the outer peripheral surface of the projection 405 and the inner peripheral surface 404 of the rim and are circumferentially spaced apart from one another. The type and the location of the elastic member are properly selected depending on their applications.

In the present invention, an annular groove 407 and an annular raised portion 408, one parallel to the other, are formed on the inner peripheral surface of the annular projection 405, which projects radially outward from the outer peripheral surface of the disk. The annular raised portion 408 and the C-ring 409, which engages with the annular groove 407, together hold an annular ridge 410, formed on the outer peripheral surface of the disk, from either side thereof in the axial direction. In this manner, the elastic wheel is made separable between the inner peripheral surface of the projection 405 and the outer peripheral surface 402 of the disk 401.

Figure 33:
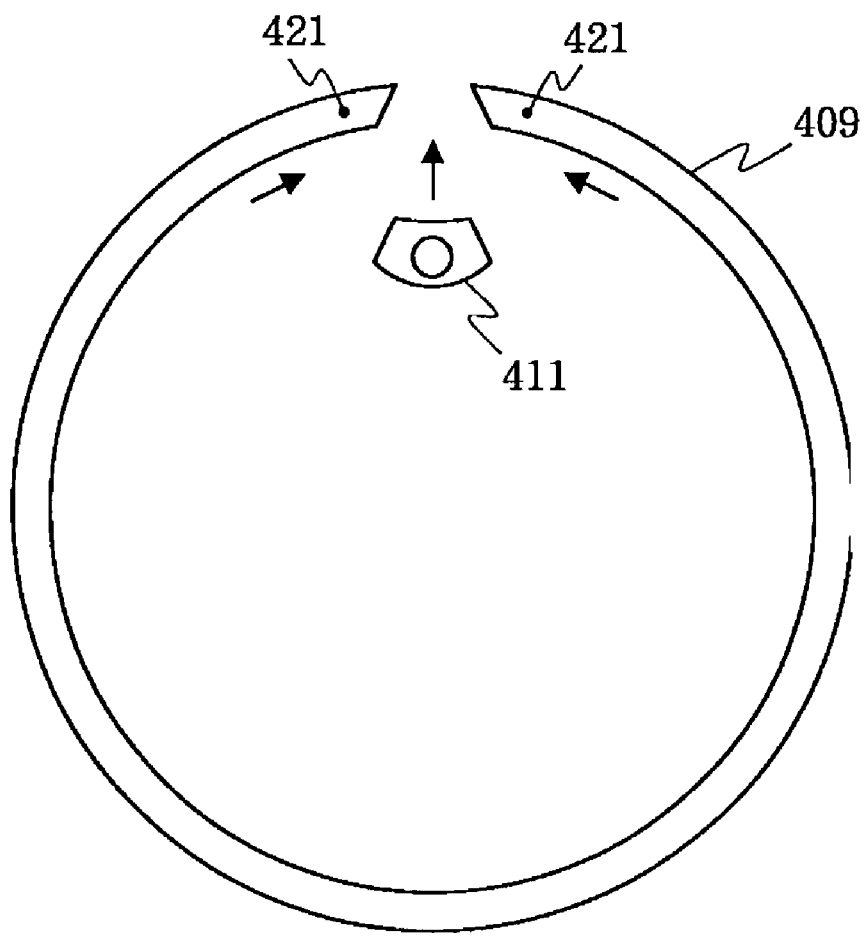
FIG. 33 is a plan view showing a C-ring.

The C-ring 409 is fitted in an annular groove 407 formed on the inner peripheral surface of the projection 405. Specifically, the C-ring 409 is elastically deformed by making use of holes 421 shown in FIG. 33 and is placed in the annular groove 407, where it is allowed to resume unstrained shape to be held in place in the annular groove 407. A head 411 is then plugged into a gap formed in the C-ring 409 and is secured to one end of the outer peripheral surface 402 of the disk by means of a bolt 412. Other fastener means such as a pin or a rivet may be used in place of the bolt.

Figure 34:
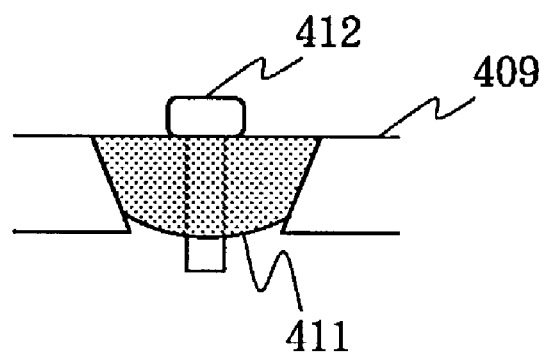
FIG. 34 is a partial enlarged view showing a manner in which a head is plugged into the C-ring.

While the C-ring may be of any construction, it preferably has the construction shown in FIG. 32, wherein the contact surface between the head 411, and the C-ring 409, and the end of the outer peripheral surface 402 of the disk that the head 411 and the C-ring are held in contact with is sloped with respect to the radial direction of the wheel. In such a case, as described above, the C-ring 409 is elastically deformed and placed in the annular groove 407, where it is allowed to resume unstrained shape to be held in place in the annular groove 407. The head 411 is then plugged into the gap formed in the C-ring 409 and is secured to the end of the outer peripheral surface 402 of the disk by means of the bolt 412 screwed thereinto in the axial direction of the wheel. The resulting tapered structure causes the ridge 410 to be fastened from either side in the axial direction, so that the ridge 410 is more firmly secured to the inner peripheral surface of the rim. Also, by constructing the gap of the C-ring 409, which receives the head 411, and the head 411 in the manner shown in FIG. 34, which is viewed from the direction A indicated by an arrow in FIG. 32, the tapered construction of the head 411 causes the C-ring 409 to expand as the bolt 412 is screwed thereinto. As a result, the C-ring 409 is secured within the annular groove 407 more firmly.

Figure 35:
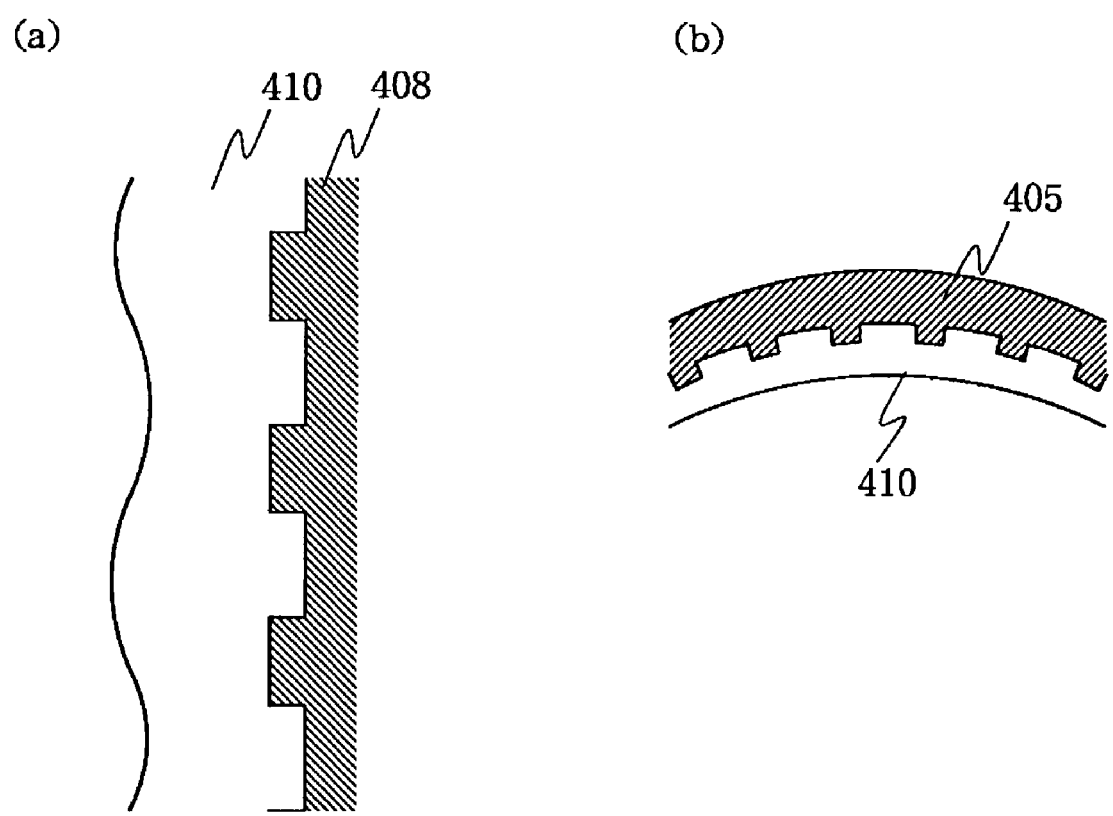
FIG. 35 is an enlarged view showing rotation-preventing means provided between an inner peripheral surface of a projection and an outer peripheral surface of a disk.

In the preferred embodiment above, the annular raised portion 408, which is formed along the inner peripheral surface of the projection 405 and serves as the fixed stopper, and the C-ring 409, which serves as the removable stopper, together hold the ridge 410 from either side thereof in the axial direction. Preferably, means for preventing rotation between the annular raised portion 408 and the C-ring 409 is provided to help the annular raised portion 408 and the C-ring 409 hold the ridge 410. For example, as shown in FIG. 35(a), axially projecting projections and corresponding recesses may be provided on the annular raised portion 408 and on the ridge 410, respectively, at several locations along the circumference, so that the projections engage with the respective recesses to serve as rotation-preventing means. Alternatively, as shown in a circumferential cross-section in FIG. 35(b), a plurality of radially projecting projections and corresponding radial recesses may be provided on the inner peripheral surface of the projection 405 and on the ridge 410, respectively, so that the projections engage with the respective recesses to serve as rotation-preventing means.

While the arrangement of the elastic member should not be limited to particular ones, it is advantageous to design the wheel that is also separable between the inner peripheral surface 404 of the rim and the elastic member, so that the projection 405, together with the elastic member, can be separated from the rim 403 and only this part can be replaced as a unit. This construction makes it possible to reduce the size of the vulcanizing apparatus when the elastic rubber body 406 is used as the elastic member, since it is no longer necessary to use the whole wheel including the integrated rim 403 in the vulcanization process.

The construction shown in FIG. 32 provides one preferred embodiment of the elastic wheel that is separable between the inner peripheral surface 404 of the rim 403 and the elastic member. In this preferred embodiment, an elastic member that axially extends on either side of the projection 405, for example the elastic rubber body 406, is secured to the projection 405 through, for example, vulcanization.

Annular wall members 413a and 413b are properly spaced apart from the outer peripheral surface of the disk and are attached, through, for example, vulcanization, to respective ends of the elastic rubber body 406, which axially extends on either side of the projection 405. The pair of wall members 413a and 413b each extend radially outward beyond the projection 405 such that a proper distance is maintained between the projection 405 and the inner peripheral surface 404 of the rim 403. An annular stopper 414, which is provided on the inner peripheral surface 404 of the rim, and a C-ring (not shown), which is removably received in the annular groove 415 formed on the inner peripheral surface 404 of the rim, together hold the pair of wall members 413a and 413b from either side thereof in the axial direction. In this manner, not only can the elastic rubber body 406 function as an elastic member, but also the inner peripheral surface 404 of the rim 403 is removably joined to the elastic member The C-ring has essentially the same structure as the above-described C-ring 409 (see, FIG. 33). Likewise, a head 416 to be plugged into a gap formed in the C-ring 409 and a bolt 417 for securing the head 416 have the same structure as those described in FIG. 33. It should be appreciated that, while the bolt 417 is secured to the wall member 413a in the example shown, it may be secured to the inner peripheral surface 404 of the rim 403.

In the preferred embodiment above, the annular stopper 414, which is arranged on the inner peripheral surface of the rim 403 and serves as the fixed stopper, and the C-ring, which serves as the removable stopper, together hold the pair of wall members 413a and 413b from either side thereof in the axial direction. Preferably, means for preventing rotation between the annular stopper 414 and the C-ring is provided to help the annular stopper 414 and the C-ring hold the pair of wall members 413a and 413b. Such means has essentially the same construction as the above-described rotation-preventing means provided between the inner peripheral surface of the projection and the outer peripheral surface 402 of the disk: axially projecting projections and corresponding recesses are provided on the annular stopper 414 and on the wall member 413b, respectively, at several locations along the circumference, so that the projections engage with the recesses. Or, radial projections and corresponding radial recesses are provided on the inner peripheral surface 404 of the rim adjacent to the stopper 414 and on the wall member 413b, respectively, so that the projections engage with the recesses. Such rotation-preventing means may be provided between the C-ring and the wall member 413a or it may be provided in both locations.

Although the sheering strain of the elastic rubber body 406 can provide intended functions of the elastic wheel provided that the rubber body axially extends at least on either side of the projection 405, the wheel can be configured to withstand a large input load by forming the elastic rubber body 406 to also extend between the inner peripheral surface 404 of the rim 403 and the projection 405 as illustrated. That is, a portion of the elastic rubber body 406 that extends radially outward from, and continually over the outer surface of, the projection 405 serves as a stopper to prevent collision between the projection 405 and the inner peripheral surface 404 of the rim 403 upon application of a large input load. Aside from the elastic rubber body 406, the elastic member may be configured as a plurality of spring members that are circumferentially spaced apart from one another and each axially extends on either side of the projection 405. In this regard, the spring members may be arranged to extend between the projection 405 and the inner peripheral surface 404 of the rim and are circumferentially spaced apart from one another. The type and the location of the elastic member are properly selected depending on their applications. Also, more than one elastic member may be prepared for a single elastic wheel.

The projection 405 may be formed as an annular member that has an inverted U-shaped cross-section in the axial direction (not shown) and is secured to, and extends radially outward from, a base rim (not shown) arranged on the outer peripheral surface 402 of the disk. Alternatively, the projection 405 may be formed to have an annular space extending therethrough. Each of these constructions helps reduce the weight of the wheel.

In the elastic wheel of the present invention, the construction of the rim is not limited to a particular construction: for example, a drop portion 418 may be provided to facilitate rim assembly as shown in FIG. 32. In this regard, it is preferred that the annular stopper be formed by the inner peripheral surface of the drop portion of the rim.

Figure 36:
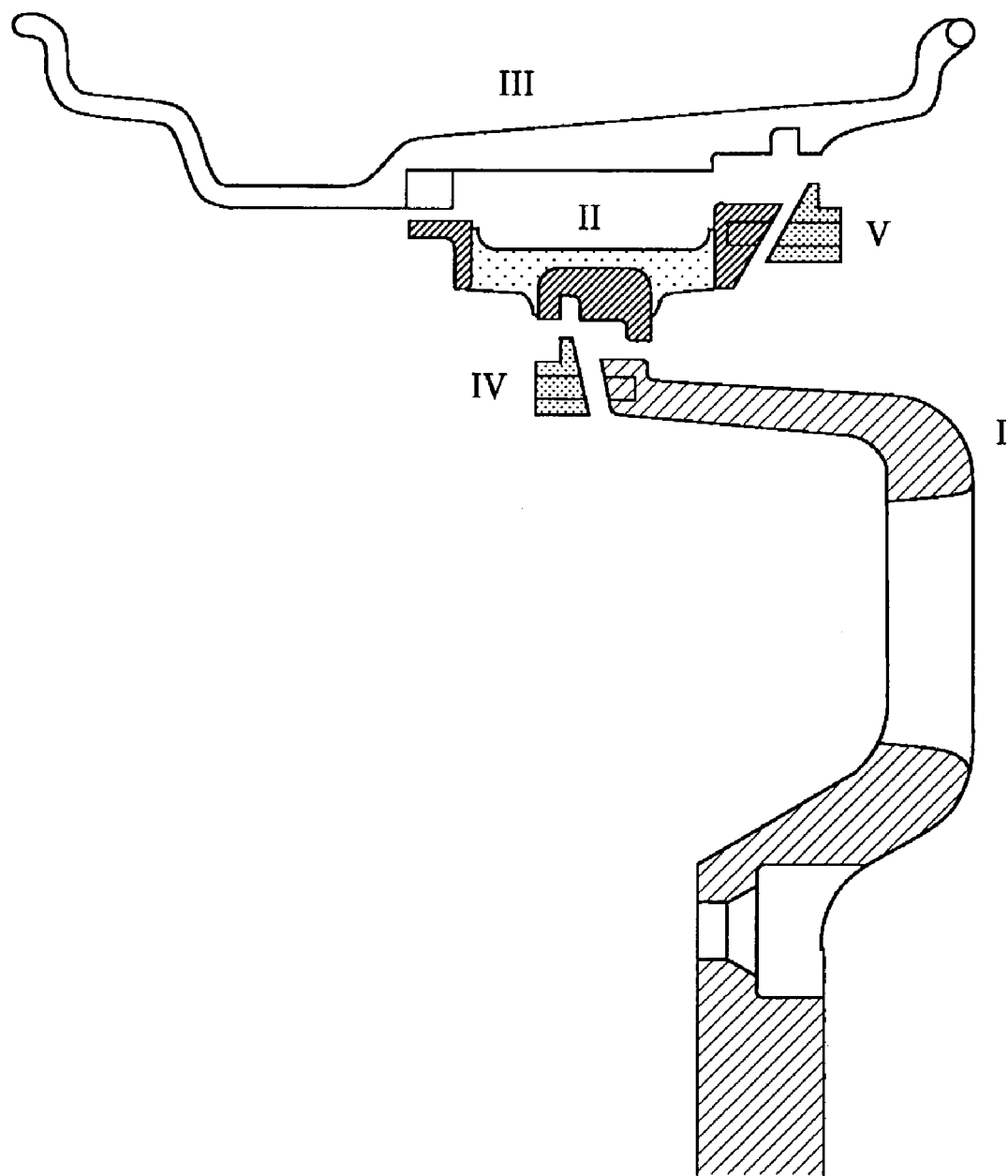
FIG. 36 is an exploded view showing a manner in which the elastic wheel of FIG. 32 is separated.

The elastic wheel according to the preferred embodiment of the present invention as shown in FIG. 32 are divided into five separate units I through V as shown in an exploded view in FIG. 36. This construction allows replacement of the separate unit II with the attached elastic rubber body 406 in a cartridge-like manner, so that the wheel can have the performance of the elastic rubber body 406 as long as necessary. This construction also allows optimization of characteristics of the wheel to adapt it to a particular application during its use by preparing different separate units II that have different types of elastic members to serve as the elastic rubber body 406 in different arrangements. The construction is also advantageous in that it facilitates rim assembly and core mounting and, when the elastic rubber body 406 is used to serve as the elastic member, vulcanization can be carried out using only the separate unit II but not the integrated rim unit, making it possible to reduce the size of vulcanizing apparatus.

While one exemplary construction of the elastic wheel in which the wheel is divided into five separate units has been described, the present invention contemplates other constructions: for example, the separate units II, III and V may be formed integrally so that the wheel is only separable between the inner peripheral surface of the projection 405 and the outer peripheral surface 402 of the disk.

Figure 37:
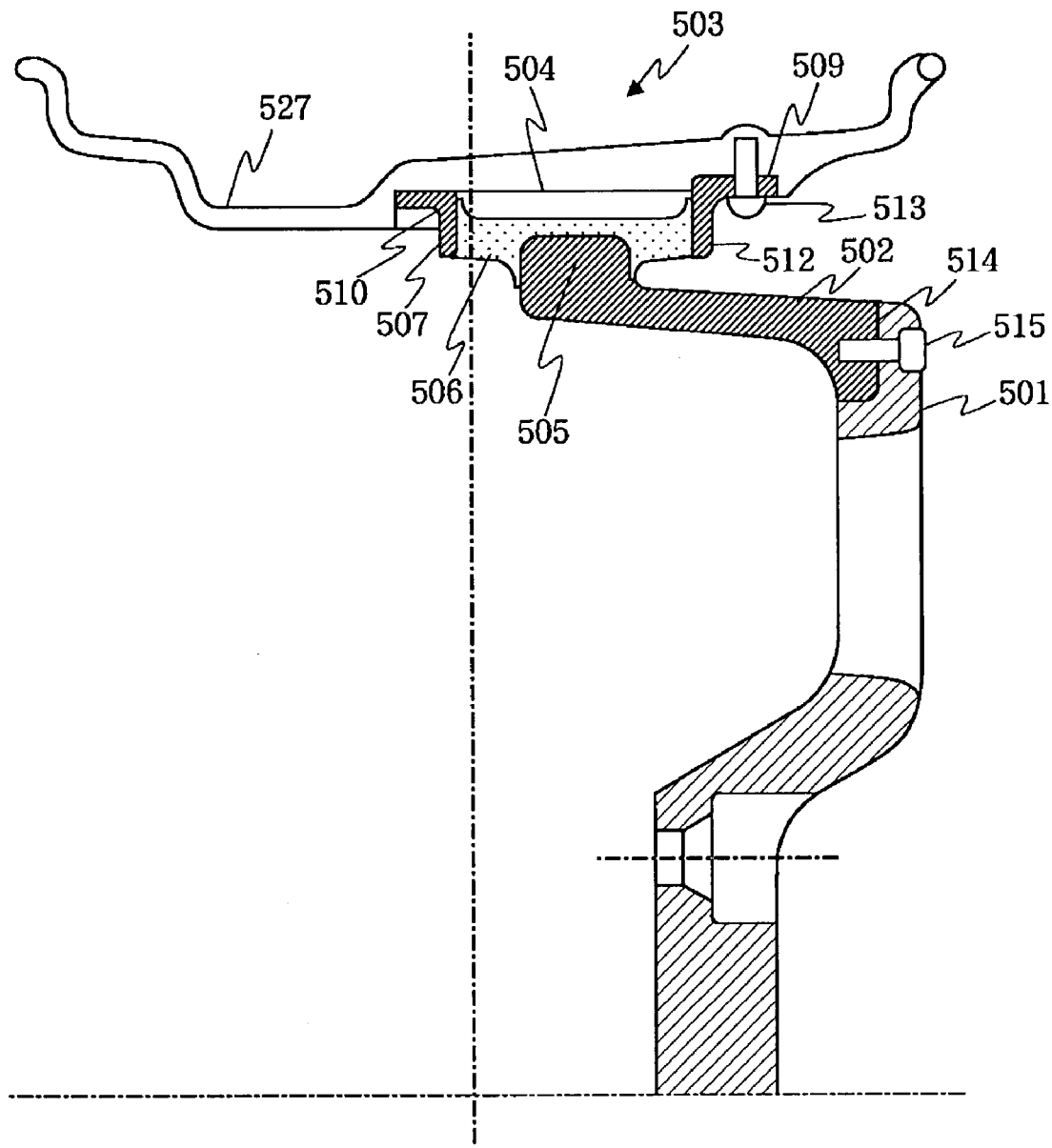
FIG. 37 is an enlarged partial cross-section showing another embodiment of the elastic wheel in accordance with the present invention.

Referring to FIG. 37, a further embodiment of the elastic wheel of the present invention is shown. The elastic wheel includes a disk 501 and a rim 503 for mounting a tire. The disk 501 is secured to an axle hub (not shown) and has an outer peripheral surface portion 502. An elastic rubber body 506 is arranged between an inner peripheral surface 504 of the rim 503 and the outer peripheral surface portion 502 of the disk to serve as an elastic member.

The disk 501 may also be a spoke wheel or a mesh wheel having supporting members such as spokes, mesh, or the like. While any material can be used to form the disk, including steel, aluminum, magnesium, titanium, plastics or the like, aluminum, titanium or plastics are preferred when it is desired to construct a lightweight wheel.

In the preferred embodiment shown in FIG. 37, an annular projection 505 protrudes radially outward from the outer peripheral surface portion 502 of the disk. An annular elastic rubber body 506, which is an elastic member that extends axially on either side of the projection 505 as well as radially outward from the projection 505, is secured to the projection 505 through, for example, vulcanization.

Aside from the elastic rubber body 506, the elastic member may be configured as a plurality of spring members that are circumferentially spaced apart from one another and each axially extends on either side of the projection 505. In this regard, the spring members may be arranged to extend between the outer peripheral surface of the projection 505 and the inner peripheral surface 504 of the rim and are circumferentially spaced apart from one another. The type and the location of the elastic member are properly selected depending on their applications.

Although the sheering strain of the elastic rubber body 506 can provide intended functions of the elastic wheel provided that the rubber body axially extends at least on either side of the projection 505, the wheel can be configured to withstand a large input load by forming the elastic rubber body 506 to also extend between the inner peripheral surface 504 of the rim 503 and the projection 505 as illustrated. That is, a portion of the elastic rubber body 506 that extends radially outward from, and continually over the outer surface of, the projection 505 serves as a stopper to prevent collision between the projection 505 and the inner peripheral surface 504 of the rim 503 upon application of a large input load.

A wall member 507 is attached through, for example, vulcanization, to one end of the elastic rubber body 506, which axially extends on either side of the projection 505 and properly spaced apart from the outer peripheral surface 502 of the disk. Attached to the other end of the elastic rubber body 506 again through vulcanization is a C-ring 508. The wall member 507 and the C-ring 508 each extend radially outward beyond the projection 505 such that a proper distance is maintained between the projection 505 and the inner peripheral surface 504 of the rim 503. The C-ring 508 is received in an annular groove 509 formed on the inner peripheral surface of the rim, whereas the wall member 507 abuts an annular stopper 510 formed on the inner peripheral surface of the rim and is kept from moving axially. In the embodiment shown, a portion of the wall member 507 that comes into contact with the inner peripheral surface of the rim is bent at a right angle toward the annular stopper 510. The bent portion is placed in an annular slot formed in the axial direction on the annular stopper 510. By constructing the wall member 507 and the C-ring 508 in this manner, not only can the elastic rubber body 506 serve as an elastic member but also a removable joint is achieved between the inner peripheral surface of the rim 503 and the elastic rubber body 506.

Figure 38:
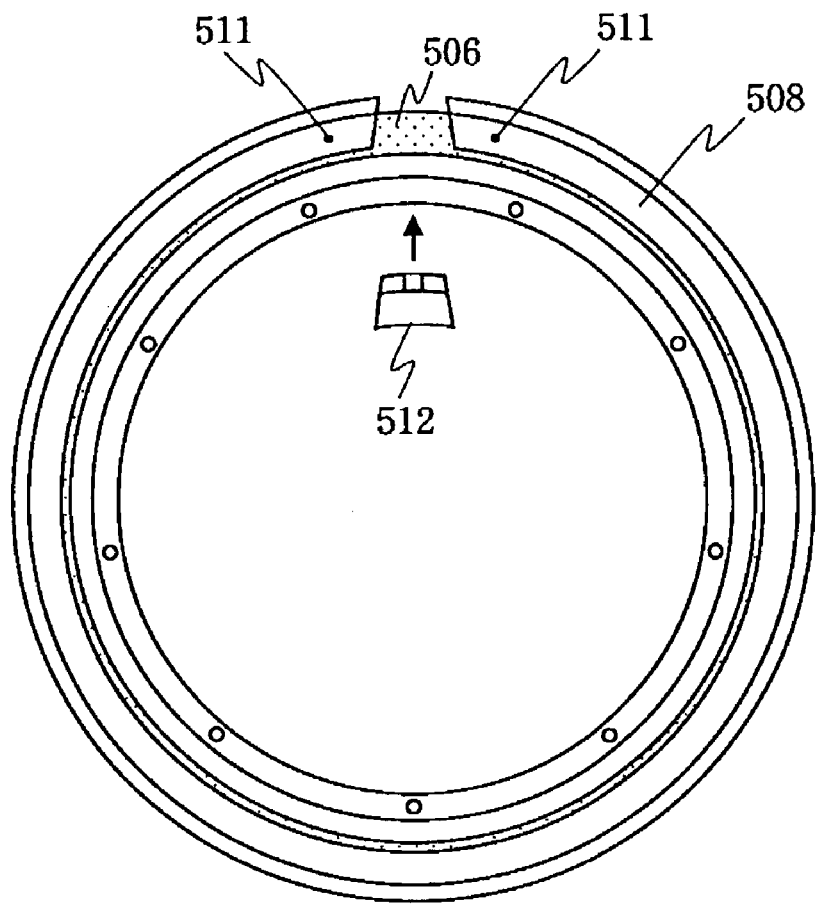
FIG. 38 is a plan view showing a C-ring.
Figure 39:
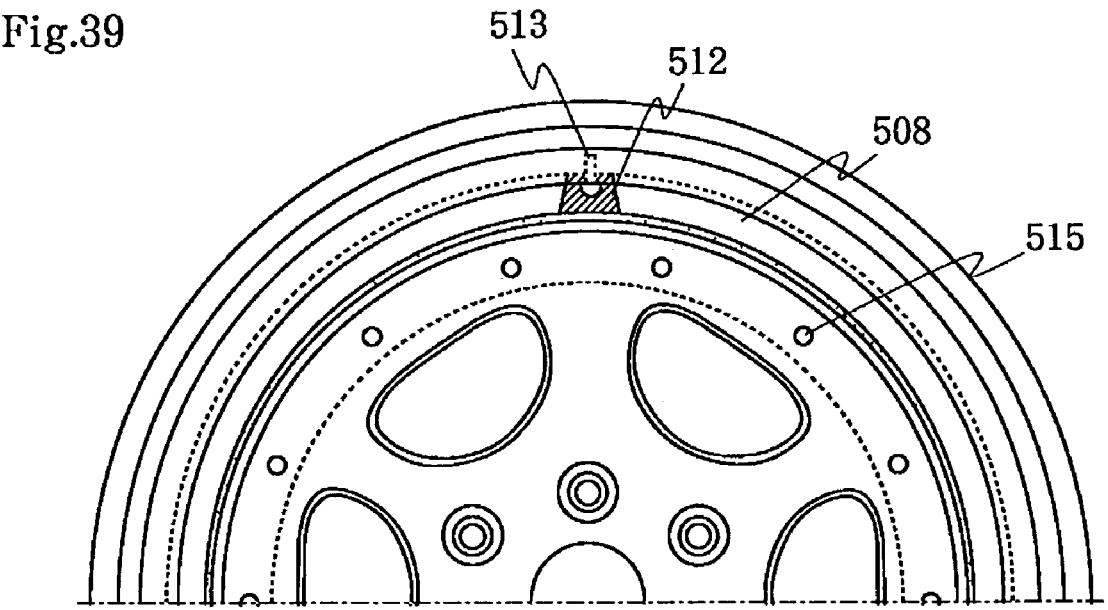
FIG. 39 is an explanatory view showing a manner in which the C-ring is fitted into the wheel.
Figure 40:
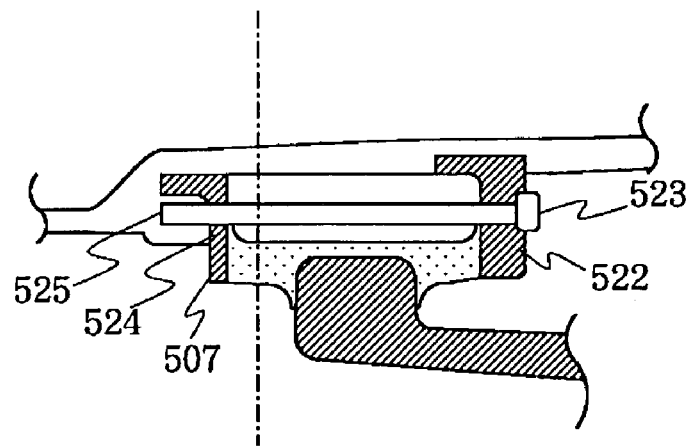
FIG. 40 is an enlarged partial cross-section showing another head.

The C-ring 508 is fitted in the annular groove 509 formed on the inner peripheral surface 504 of the rim as follows. First, the C-ring 508 with the elastic rubber body 506 attached thereto is elastically deformed by making use of hole 511 shown in FIG. 38 and is placed in the annular groove 509. It is then allowed to resume unstrained shape to be held in place in the annular groove 509. Ahead 512, as shown in FIG. 39, is plugged into a gap formed in the C-ring 508 and is secured to the rim 503 by means of a bolt 513. The construction of the head is not limited to the one depicted here and may be configured as shown in FIG. 40 in which a bolt 523 is placed through a head 522 and the wall member 507 and screwed into a hole 525 formed in the annular stopper 524. In this manner, rotation between the disk 501 and the rim 503 can also be prevented.

Figure 41:
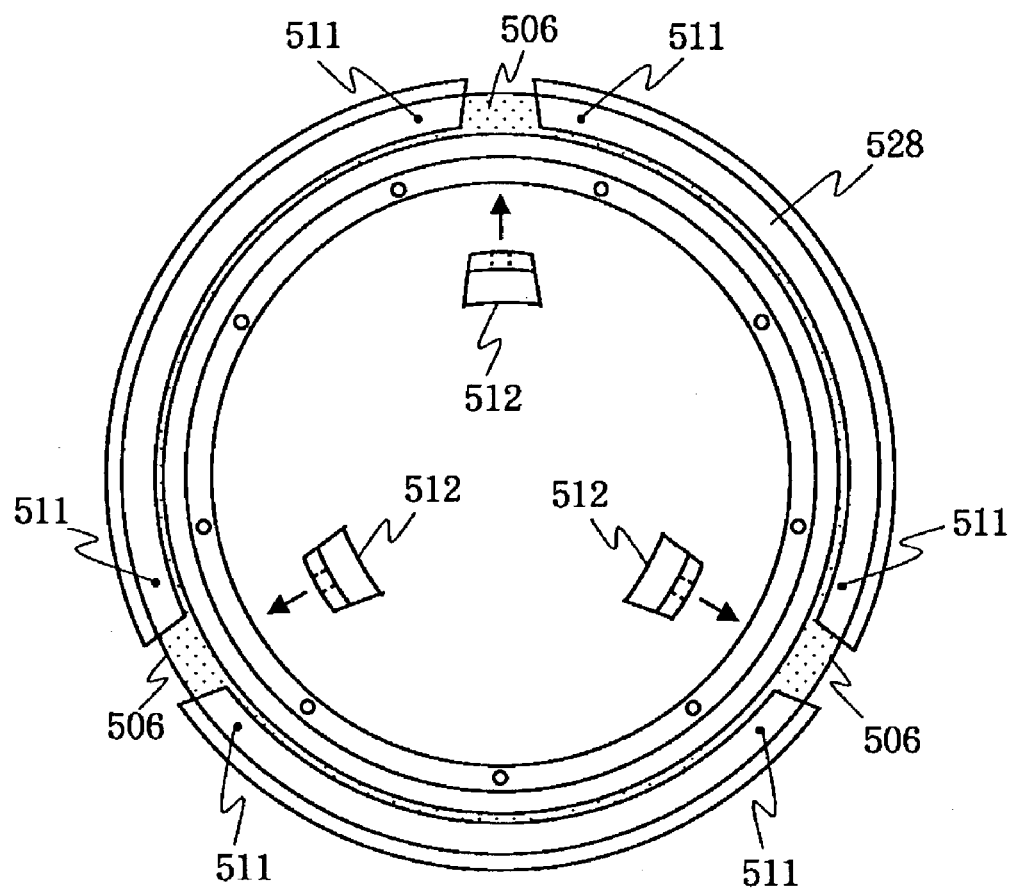
FIG. 41 is a plan view showing a split ring split into three pieces.

Aside from the C-ring, a split ring 528 that is split at three or more locations as shown in FIG. 41 may be used along with the corresponding number of heads in the present invention. Attached to the elastic rubber body 506 through vulcanization, the split ring 528 serves in the same manner as the above-described C-ring.

Figure 42:
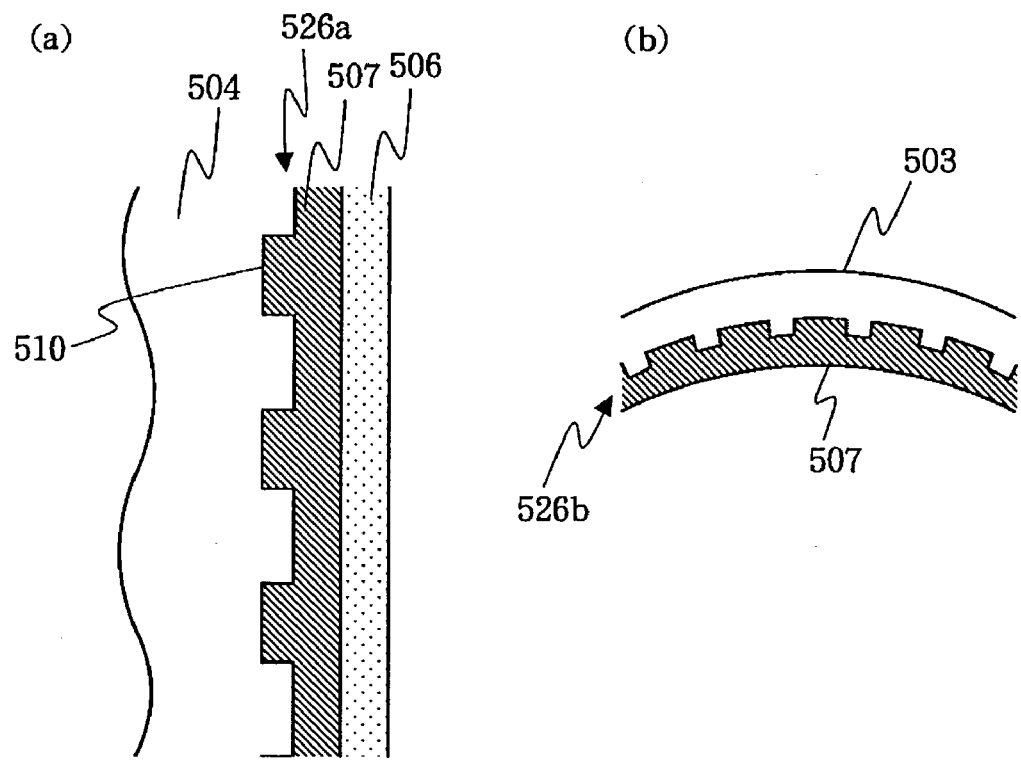
FIG. 42 is an enlarged view showing rotation-preventing means provided between a rim and a disk.

Preferably, rotation-preventing means 526 is provided between the wall member 507 and the annular stopper 510 to ensure that the rotation between the disk and the rim 503 is prevented. For example, as shown in FIG. 42(a), axially projecting projections and corresponding recesses may be provided on the stopper 510 and on the wall member 507, respectively, at several locations along the circumference, so that the projections engage with the respective recesses to serve as rotation-preventing means 526a. Alternatively, as shown in a circumferential cross-section in FIG. 42(b), a plurality of radially projecting projections and corresponding radial recesses may be provided on the inner peripheral surface 504 of the rim adjacent to the stopper 510 and on the wall member 507, respectively, so that the projections engage with the respective recesses to serve as rotation-preventing means 526b. The rotation-preventing means 526 may be provided between the split ring or the C-ring 508 and the inner peripheral surface 504 of the rim, or it may be provided in both locations.

Figure 43:
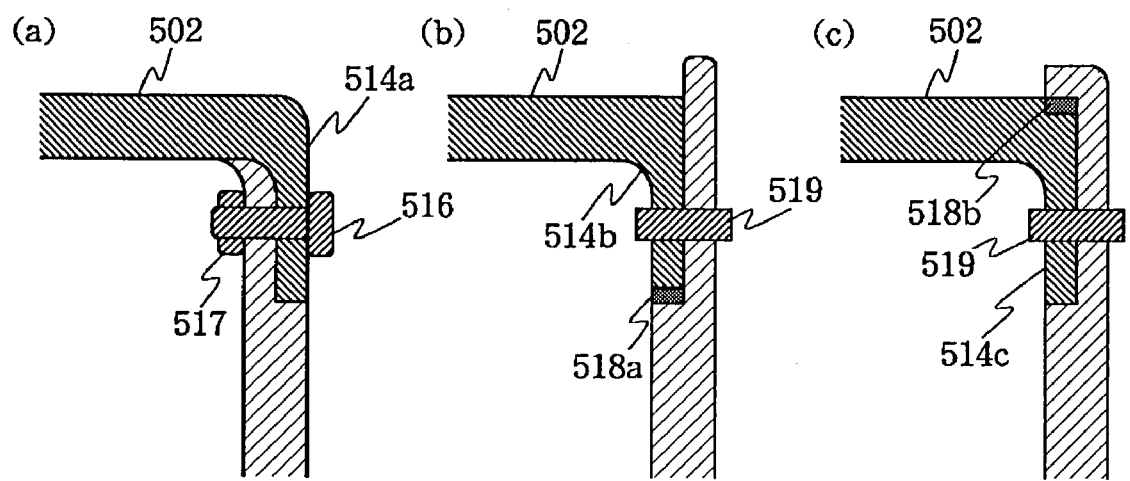
FIG. 43 shows enlarged partial cross-sections each showing a connection between an outer peripheral surface portion and a radial disk portion of the disk.

In the preferred embodiment shown in FIG. 37, the outer peripheral surface portion 502 of the disk includes on its edge a radial joint portion 514. The radial disk portion 501 and the outer peripheral surface portion 502 are secured to one another by placing a peripheral edge of the disk portion 501 over the joint portion 514 from outside and then fastening a plurality of bolts 515. Aside from the connection shown in FIG. 37, the removable attachment of the outer peripheral surface portion 502 to the disk portion 501 may be achieved through connections as depicted in FIG. 43. In the connection shown in FIG. 43(*a*), the outer peripheral surface portion 502 of the disk includes on its edge a radial joint portion 514*a*. The disk portion 501 and the outer peripheral surface portion 502 are secured to one another by placing a peripheral edge of the disk portion 501 over the joint portion 514*a* from inside and then fastening the bolts 516 and the nuts 517. In the connection shown in FIG. 43(*b*), the disk portion 501 and the outer peripheral surface portion 502 are connected with each other by bringing the disk portion 501 and a joint portion 514*b* into screw engagement via an axial joint surface 518*a* and then inserting rotation-preventing means 519 such as pins or bolts. In the connection shown in FIG. 43(*c*), the disk portion 501 and the outer peripheral surface portion 502 are first brought into screw engagement via an axial joint surface 518*b* and then rotation-preventing means 519 are placed through a joint portion 514*c* as in the connection in FIG. 43(*b*). The rotation-preventing means 519 are most effective when provided at several different locations.

In the elastic wheel of the present invention, the construction of the rim is not limited to a particular construction: for example, a drop portion 527 may be provided to facilitate rim assembly as shown in FIG. 37. In this regard, it is preferred that the annular stopper be formed by the inner peripheral surface of the drop portion of the rim.

Figure 44:
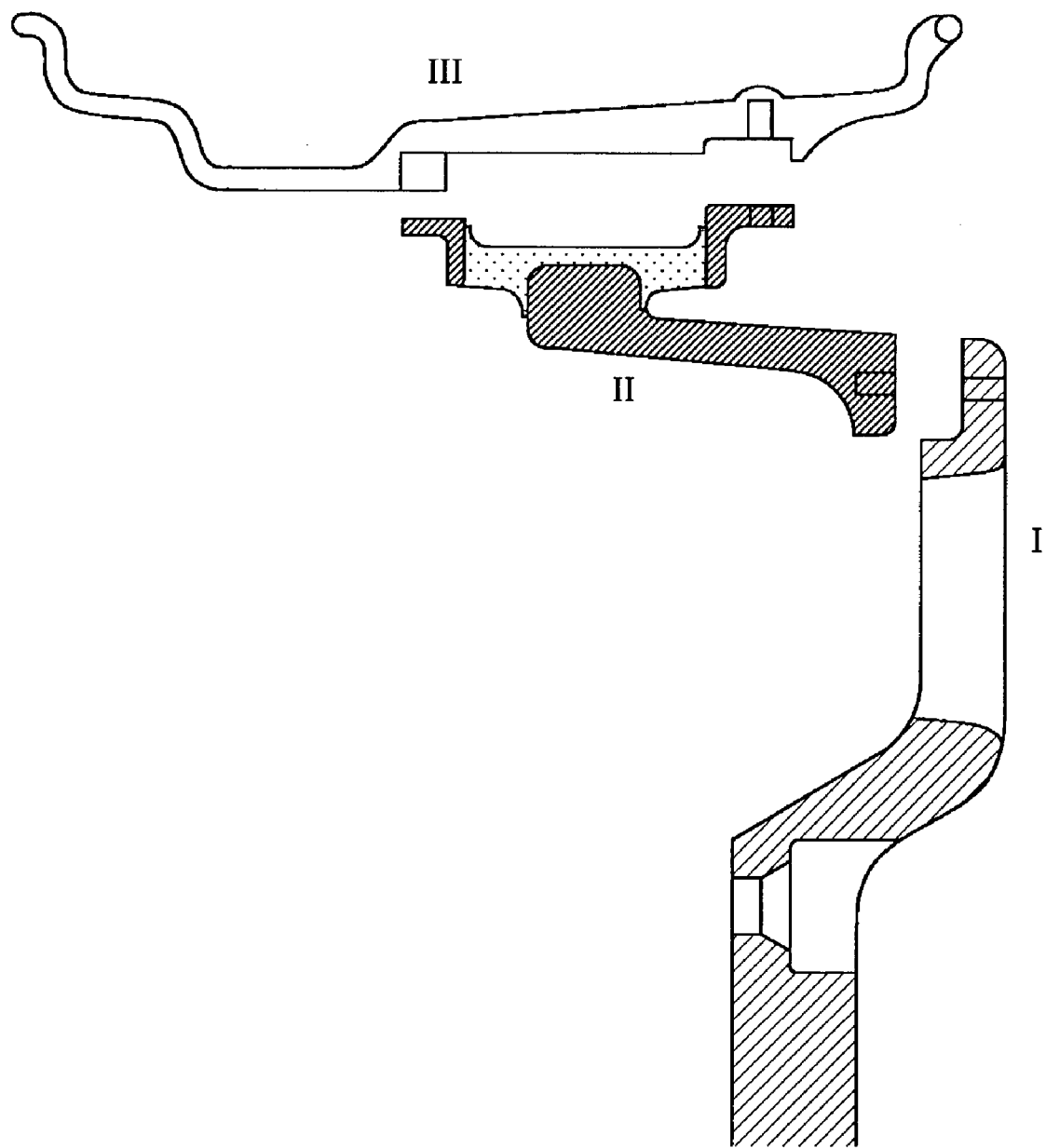
FIG. 44 is an exploded view showing a manner in which the elastic wheel of FIG. 37 is separated.

The elastic wheel according to the preferred embodiment of the present invention as shown in FIG. 37 are divided into three separate units I through III as shown in an exploded view in FIG. 44. This construction allows replacement of the separate unit II with the attached elastic rubber body 506 in a cartridge-like manner, so that the wheel can have the performance of the elastic rubber body 506 as long as necessary. This construction also allows optimization of characteristics of the wheel to adapt it to a particular application during its use by preparing different units II that have different types of elastic members to serve as the elastic rubber body 506 in different arrangements. The construction is also advantageous in that it facilitates rim assembly and core mounting and, when the elastic rubber body 506 is used to serve as the elastic member, vulcanization can be carried out using only the separate unit II but not the integrated rim unit, making it possible to reduce the size of vulcanizing apparatus.

Figure 45:
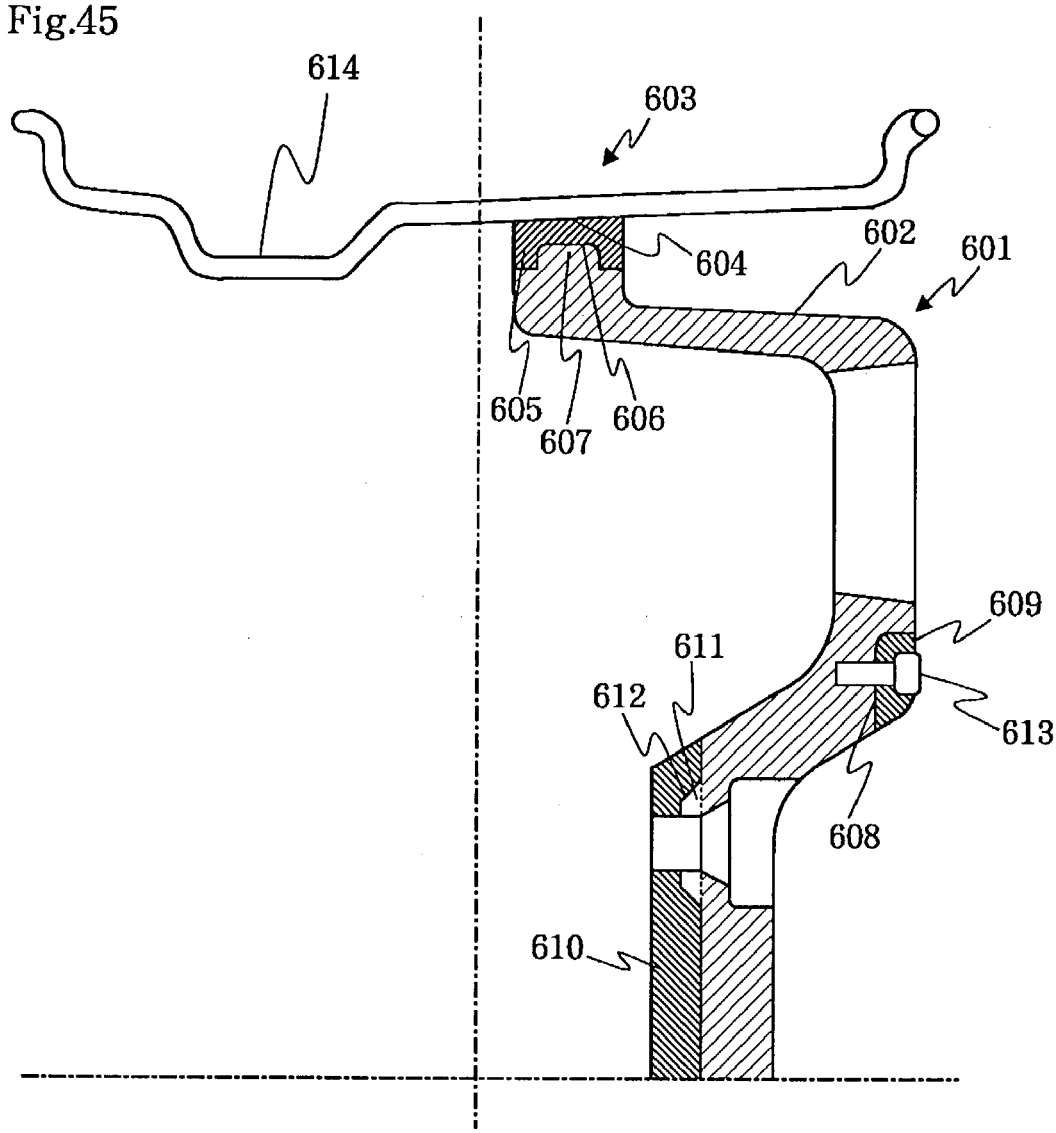
FIG. 45 is an enlarged partial cross-section showing another embodiment of the wheel for use with a vehicle in accordance with the present invention.

Referring to FIG. 45, another embodiment of the wheel of the present invention for use with a vehicle is shown. The wheel includes a disk 601 secured to an axle hub (not shown) and a rim 603 for mounting a tire.

The disk 601 may also be a spoke wheel or a mesh wheel having supporting members such as spokes, mesh, or the like. While any material can be used to form the disk, including steel, aluminum, magnesium, titanium, plastics or the like, aluminum, titanium or plastics are preferred when it is desired to construct a lightweight wheel.

In the preferred embodiment shown in FIG. 45, an annular body 605 is joined to an inner peripheral surface 604 of the rim 603. The outer peripheral surface of the annular body 605 and the inner peripheral surface 604 of the rim 603 may be joined to one another by various joint means including, but not limited to, soldering, bolts and screws.

Circumferential grooves 606 are formed on the inner peripheral surface of the annular body 605 and are spaced apart from one another. Raised portions 607, formed on the outer peripheral surfaces 602 of respective pieces of the disk that the disk 601 is cut into along the radius of the wheel, engage with the respective grooves 606.

Figure 46:
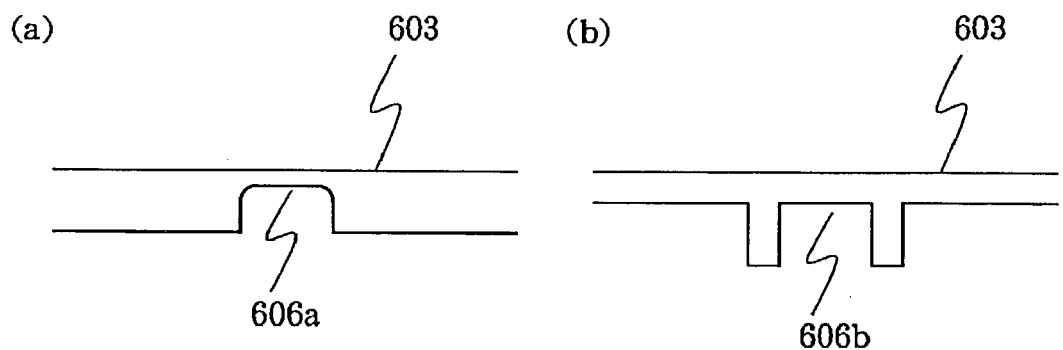
FIG. 46 shows enlarged partial cross-sections showing other configurations of the circumferential groove.

In the present invention, the circumferential grooves 606 may be formed directly on the inner peripheral surface of the rim 603 as shown in FIG. 46(*a*) rather than on the annular body 605 by jointing the annular body 605 as in the above-describe example. Alternatively, a raised portion may be formed integrally with the rim on the inner peripheral surface thereof and circumferential grooves 606*b* may be provided in the raised portion to ensure engagement of the raised portion 607.

Figure 47:
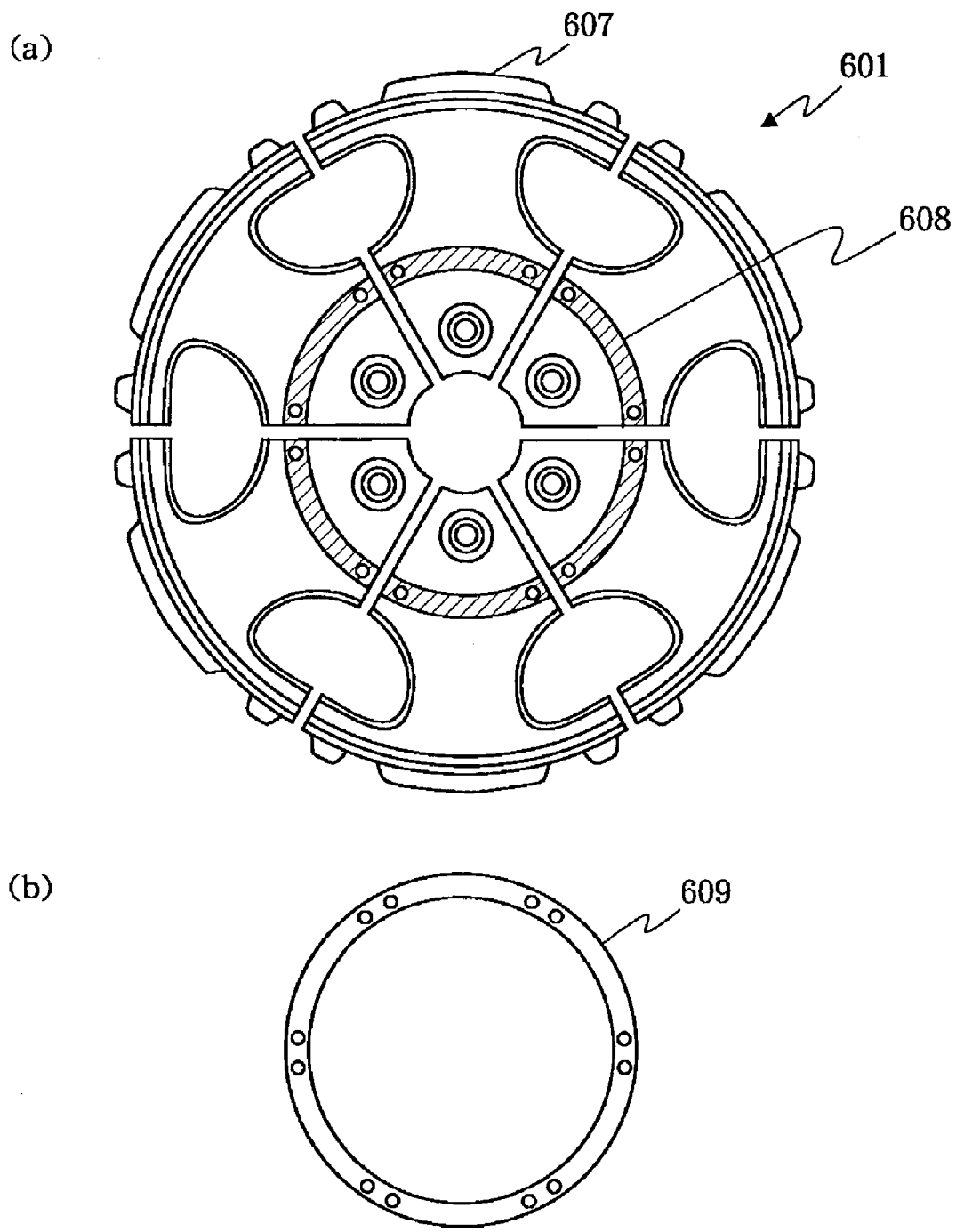
FIG. 47 shows plan views showing a split disk and a hold ring, respectively.
Figure 48:
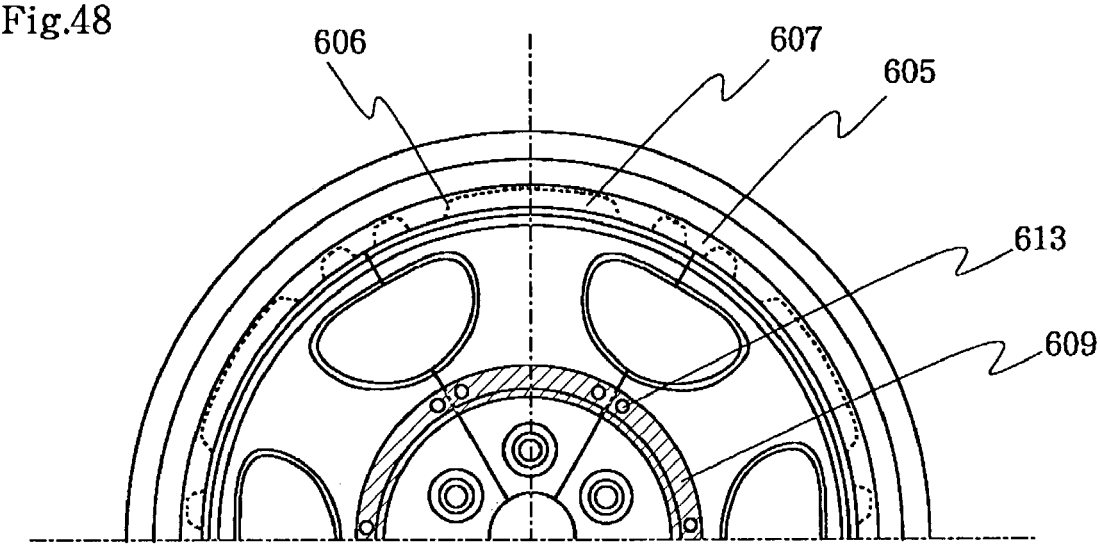
FIG. 48 is an explanatory view showing a manner in which the split disk is fitted into the wheel.

As shown in FIG. 47(*a*), the disk 601 is equally cut along the radius of the wheel into several pieces. While the disk is cut into six pieces in the embodiment shown, it may preferably be split into 3 to 12 pieces. The raised portion 607 formed on the outer peripheral surface 602 of the disk may be of any shape and any number and is selected such that it can engage with the circumferential groove 606 on the inner peripheral surface of the annular body 605 to effectively prevent rotation of the disk and provide sufficient strength to withstand the axial force. The manner in which the raised portions 607 are received in the circumferential grooves 606 of the annular body 605 is shown in FIG. 48.

Figure 49:
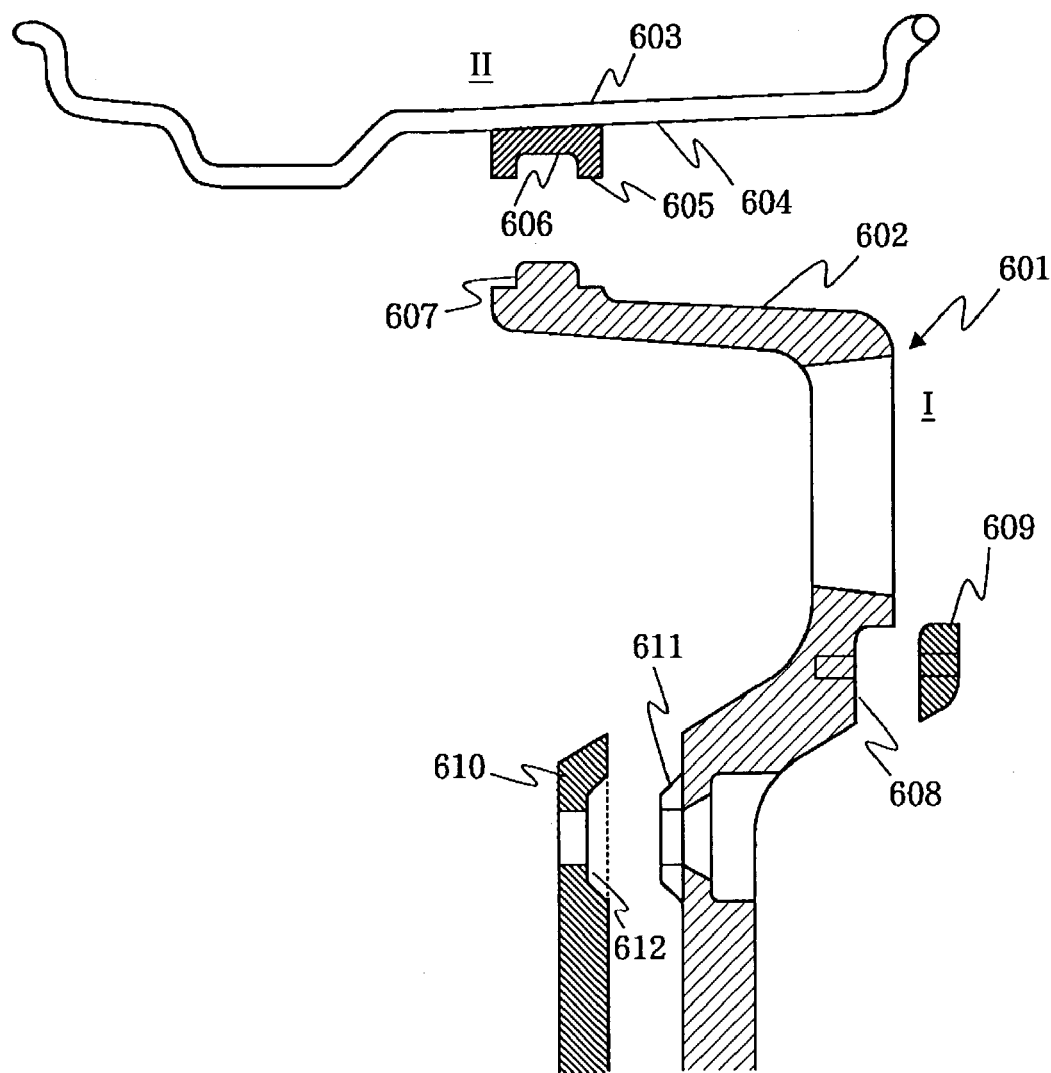
FIG. 49 is an exploded view showing a manner in which the wheel of FIG. 45 for use with a vehicle is separated.

The pieces of the divided disk are held together by placing a hold ring 609 in a circular groove 608 formed on an outer surface of the disk (FIG. 47 (*b*)) and then fastening the ring with, for example, bolts 613. In addition, as shown in FIG. 49, a circular plate 610 is arranged on the opposite surface of the disk that comes into contact with the axle hub. For instance, a periphery 611 of a bolt hole formed in the disk 601 is raised toward the circular plate and a corresponding recess 612 is provided on the circular plate 610 to allow engagement of the disk 601 and the circular plate 610. This construction also strengthens the joint between the pieces of the divided disk.

The wheel for use with a vehicle in accordance with the preferred embodiment of the present invention as shown in FIG. 45 is divided into two separate units I and II as shown in an exploded view in FIG. 49. Not only does this construction make it possible to readily replace the disk with a tire mounted on the rim, but it also facilitates rim assembly and core mounting.

While in the above-described embodiment, the raised portion 607 and the circumferential groove 606 are formed on the outer peripheral surface 602 of the disk 601 and on the inner peripheral surface 604 of the rim 603, respectively, the same effects can be achieved by forming the circumferential groove and the raised portion on the outer peripheral surface 602 of the disk 601 and on the inner peripheral surface 604 of the rim 603, respectively.

In the wheel of the present invention for use with a vehicle, the construction of the rim is not limited to a particular construction: for example, a drop portion 614 may be provided to facilitate rim assembly as shown in FIG. 45.

Figure 50:
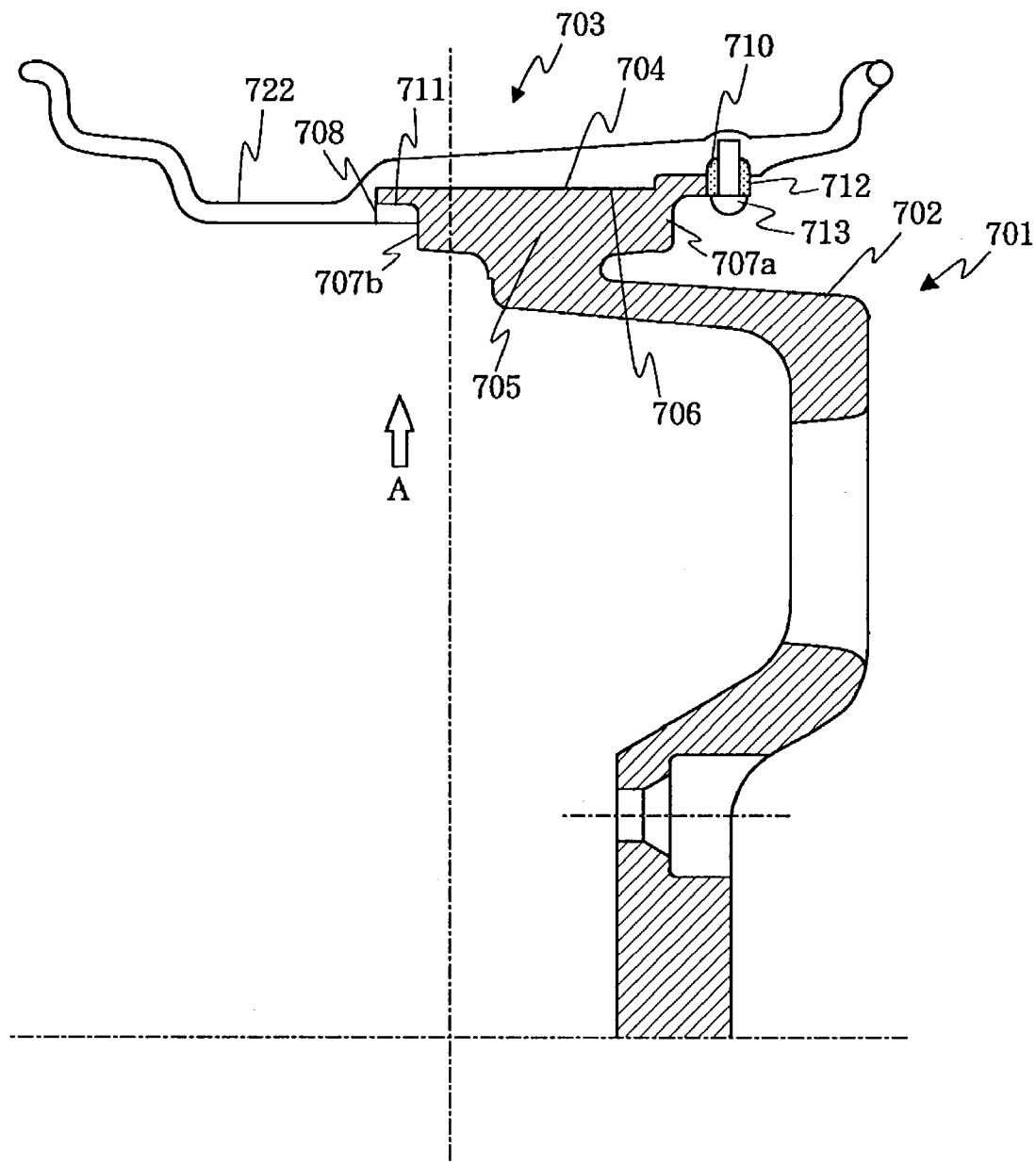
FIG. 50 is an enlarged partial cross-section showing another embodiment of the wheel for use with a vehicle in accordance with the present invention.

Referring to FIG. 50, another embodiment of the wheel of the present invention for use in a vehicle is shown. The wheel includes a disk 701 secured to an axle hub (not shown) and a rim 703 for mounting a tire.

The disk may also be a spoke wheel or a mesh wheel having supporting members such as spokes, mesh, or the like. While any material can be used to form the disk, including steel, aluminum, magnesium, titanium, plastics or the like, aluminum, titanium or plastics are preferred when it is desired to construct a lightweight wheel.

In the embodiment shown in FIG. 50, an annular projection 705 projects radially outward from the outer peripheral surface 702 of the disk 701.

An annular stopper 708 and a C-ring 709 (FIG. 51), each provided on the inner peripheral surface 704 of the rim, together hold the projection 705 on both of its radial side surfaces in the axial direction, such that the inner peripheral surface 704 of the rim 703 is removably joined to the outer peripheral surface 706 of the projection 705.

It should be appreciated that the axial cross-section of the projection 705 is not limited to the one depicted here and may be of any shape that can be held by the annular stopper 708 and the C-ring 709 from either side thereof in the axial direction. The projection 705 may also include an annular cavity (not shown) extending therethrough in order to reduce the weight of the wheel.

The C-ring 709 is fitted into an annular groove 710 formed on the inner peripheral surface 704 of the rim. Specifically, the C-ring 709 is elastically deformed by making use of holes 721 shown in FIG. 51 and is placed in the annular groove 710, where it is allowed to resume unstrained shape to be held in place in the annular groove 710. A head 712 is then plugged into a gap formed in the C-ring 709 and is secured to the rim 703 by means of a bolt 713 (the C-ring 709 is shown shaded in FIG. 52). Other fastener means such as a pin and a rivet may be used in place of the bolt.

Figure 51:
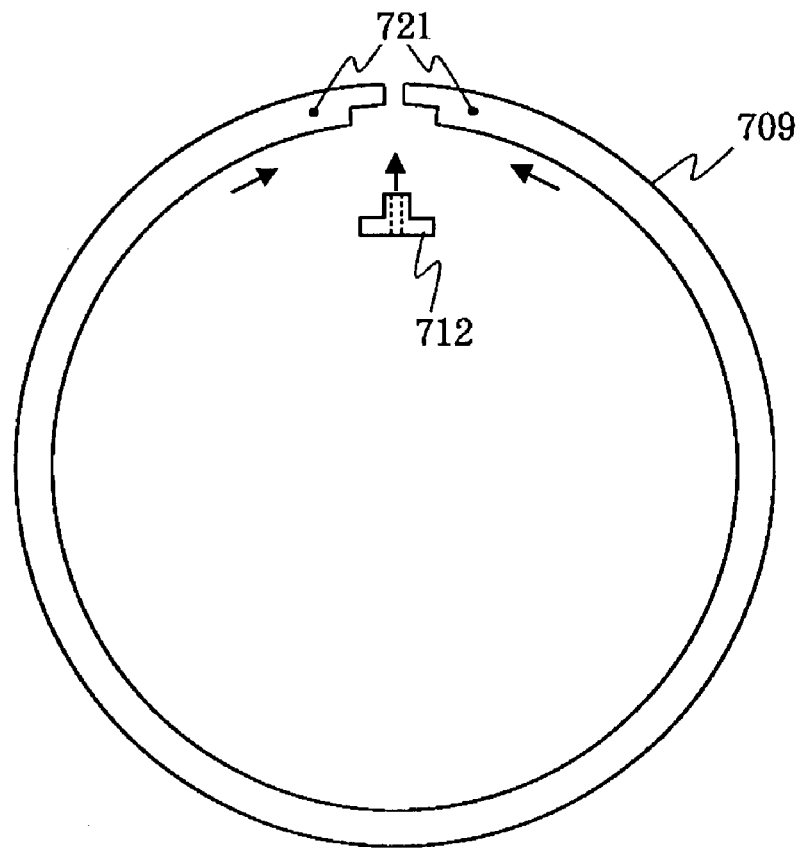
FIG. 51 is a plan view showing a C-ring.
Figure 52:
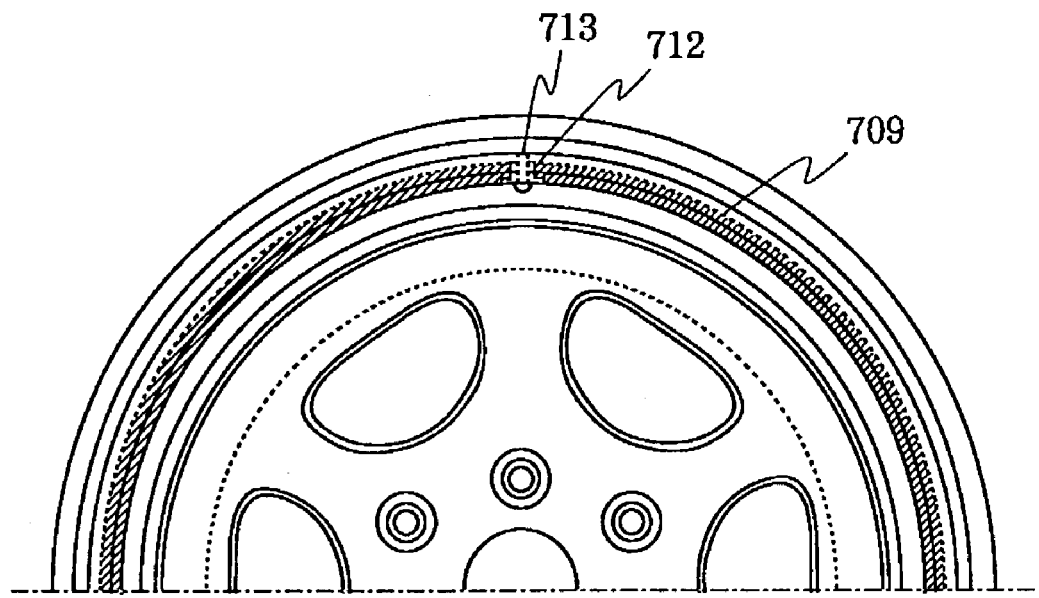
FIG. 52 is an explanatory view showing a manner in which the C-ring is fitted into the wheel.
Figure 53:
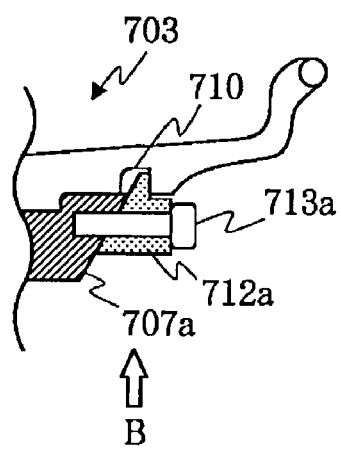
FIG. 53 is a partial cross-section showing a manner in which a head is connected to a side surface of a projection.
Figure 54:
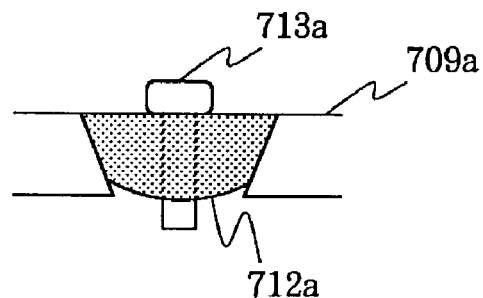
FIG. 54 is a partial enlarged view showing a manner in which a head is plugged into the C-ring.

While one exemplary construction of the C-ring has been described with reference to FIG. 51, other construction of the C-ring may also be conceived of, such as that shown in FIG. 53, wherein the contact surface between the C-ring and a side surface 707a of the projection that the C-ring is held in contact with is sloped with respect to the radial direction of the wheel. In such a case, in the manner described above, the C-ring is elastically deformed and placed in the annular groove 710, where it is allowed to resume unstrained shape to be held in place. The head 712a is then plugged into the gap formed in the C-ring and is secured to the side surface 707a of the projection by means of the bolt 713a inserted in the axial direction of the wheel. In the C-ring and the head 712a constructed in this manner, the tapered structure causes the side surfaces of the projections 707a and 707b to be fastened in the axial direction from either side by screwing the bolt 713a thereinto, so that the side surfaces of the projections 707a and 707b are more firmly secured to the inner peripheral surface of the rim. Aside from the bolt 713a, a screw may also be used. Alternatively, the bolt may be arranged to project from the side surface 707a of the projection and secured with a nut. Also, by constructing the head 712a and the gap of the C-ring 709 for receiving the head 712a in the manner shown in FIG. 54, which is viewed from the direction B indicated by an arrow in FIG. 53, the tapered construction of the head 712a causes the C-ring 709a to expand as the bolt 713a is screwed thereinto. As a result, the C-ring 709a is secured within the annular groove 710 more firmly.

Figure 55:
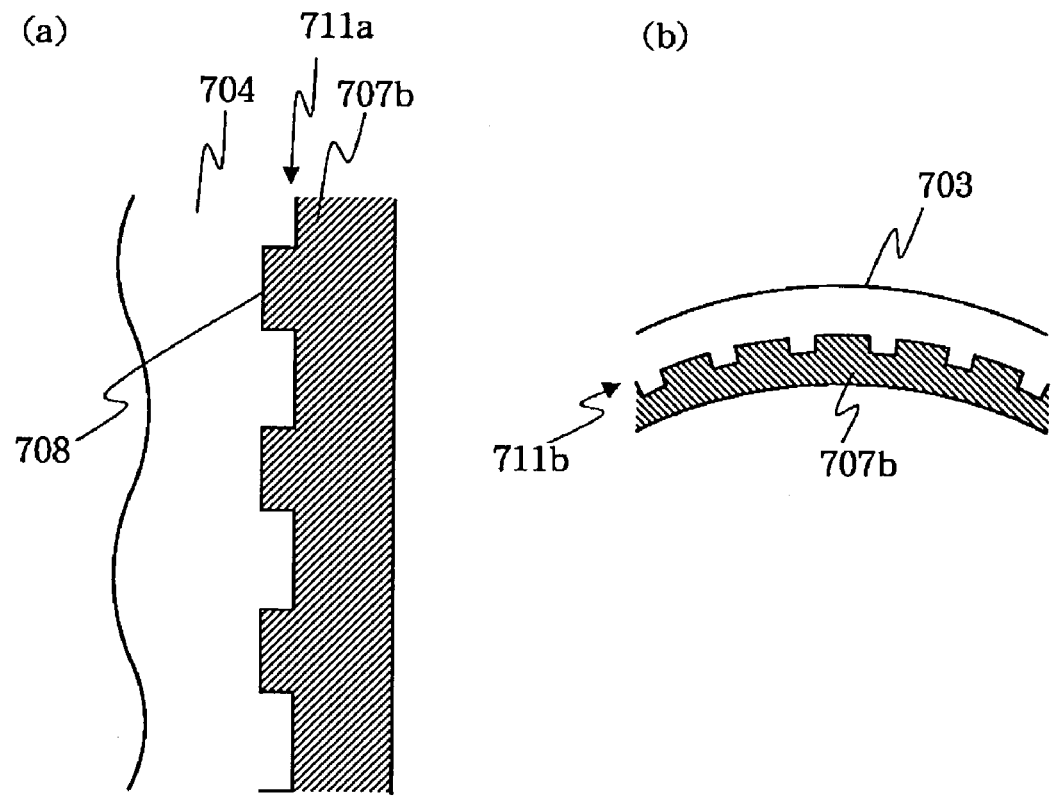
FIG. 55 is an enlarged view showing rotation-prevention means provided between a rim and a disk.

In the preferred embodiment above, the annular stopper 708, which is formed along the inner peripheral surface of the rim 703 and serves as the fixed stopper, and the C-ring 709, which serves as the removable stopper, together hold the side surfaces 707a and 707b of the projection from either side thereof in the axial direction. Preferably, means 711 for preventing rotation between the annular stopper 708 and the C-ring 709 is provided to help the annular stopper 708 and the C-ring 709 hold the side surfaces 707a and 707b of the projection. For example, as shown in FIG. 55(a), which is viewed from the direction A as indicated by an arrow in FIG. 50, axially projecting protrusions and corresponding recesses may be provided on the annular stopper 708 and on the side surface 707b of the projection, respectively, at several locations along the circumference, so that the protrusions engage with the respective recesses to serve as rotation-preventing means 711a. Alternatively, as shown in a circumferential cross-section in FIG. 55(b), a plurality of radially projecting protrusions and corresponding radial recesses may be provided on the inner peripheral surface 704 of the rim adjacent to the annular stopper 708 and on the side surface 707b of the projection, respectively, so that the protrusions engage with the respective recesses to serve as rotation-preventing means 711b. Alternatively, the rotation-preventing means 711 may be provided between the C-ring 709 and the side surface 707a of the projection, or it may be provided in both locations.

In the wheel of the present invention for use with a vehicle, the construction of the rim is not limited to a particular construction: for example, a drop portion 722 may be provided to facilitate rim assembly as shown in FIG. 50.

Figure 56:
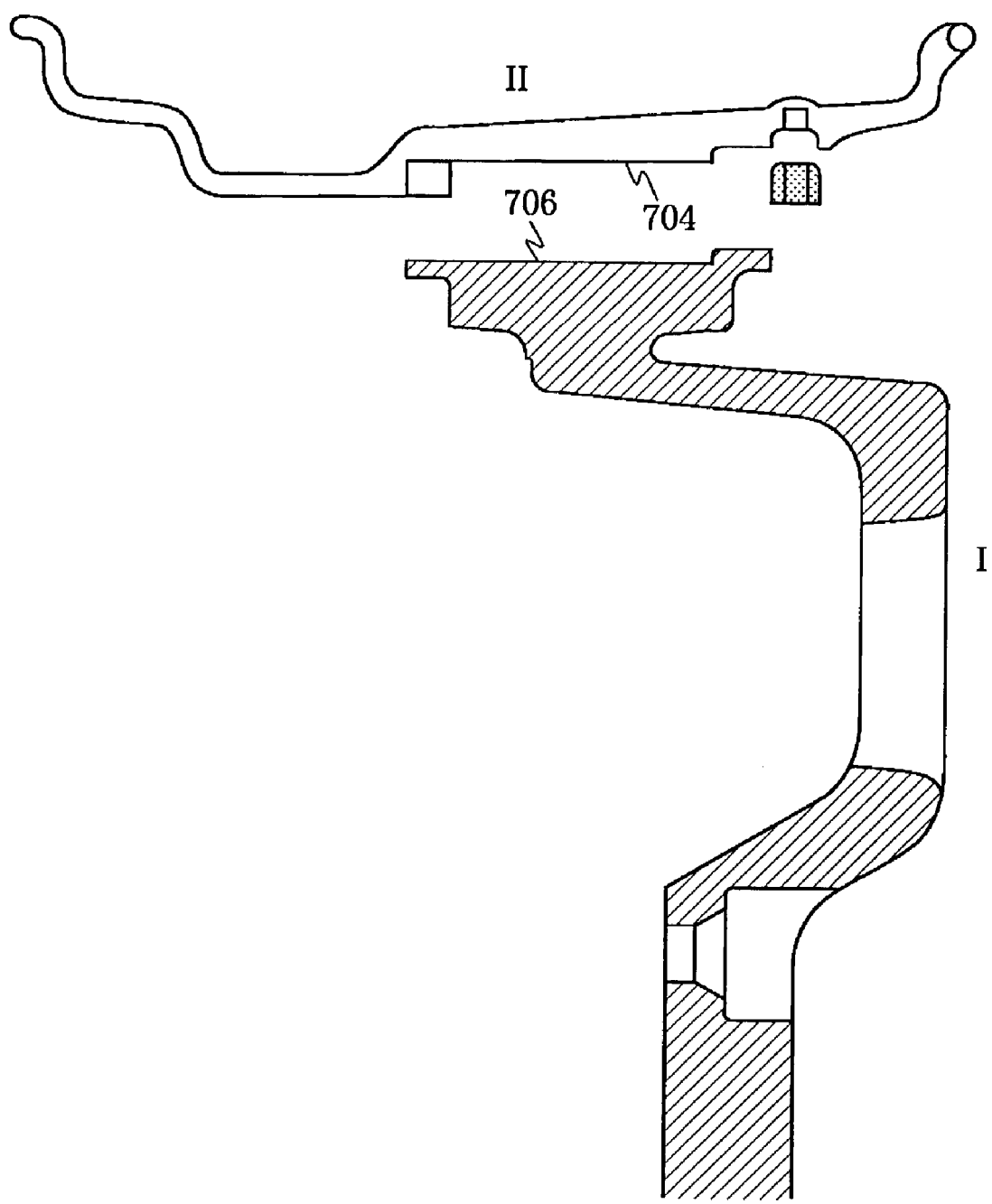
FIG. 56 is an exploded view showing a manner in which the wheel of FIG. 50 for use with a vehicle is separated.

The wheel for use with a vehicle according to the preferred embodiment of the present invention as shown in FIG. 50 is divided into two separate units I and II as shown in an exploded view in FIG. 56.

Figure 57:
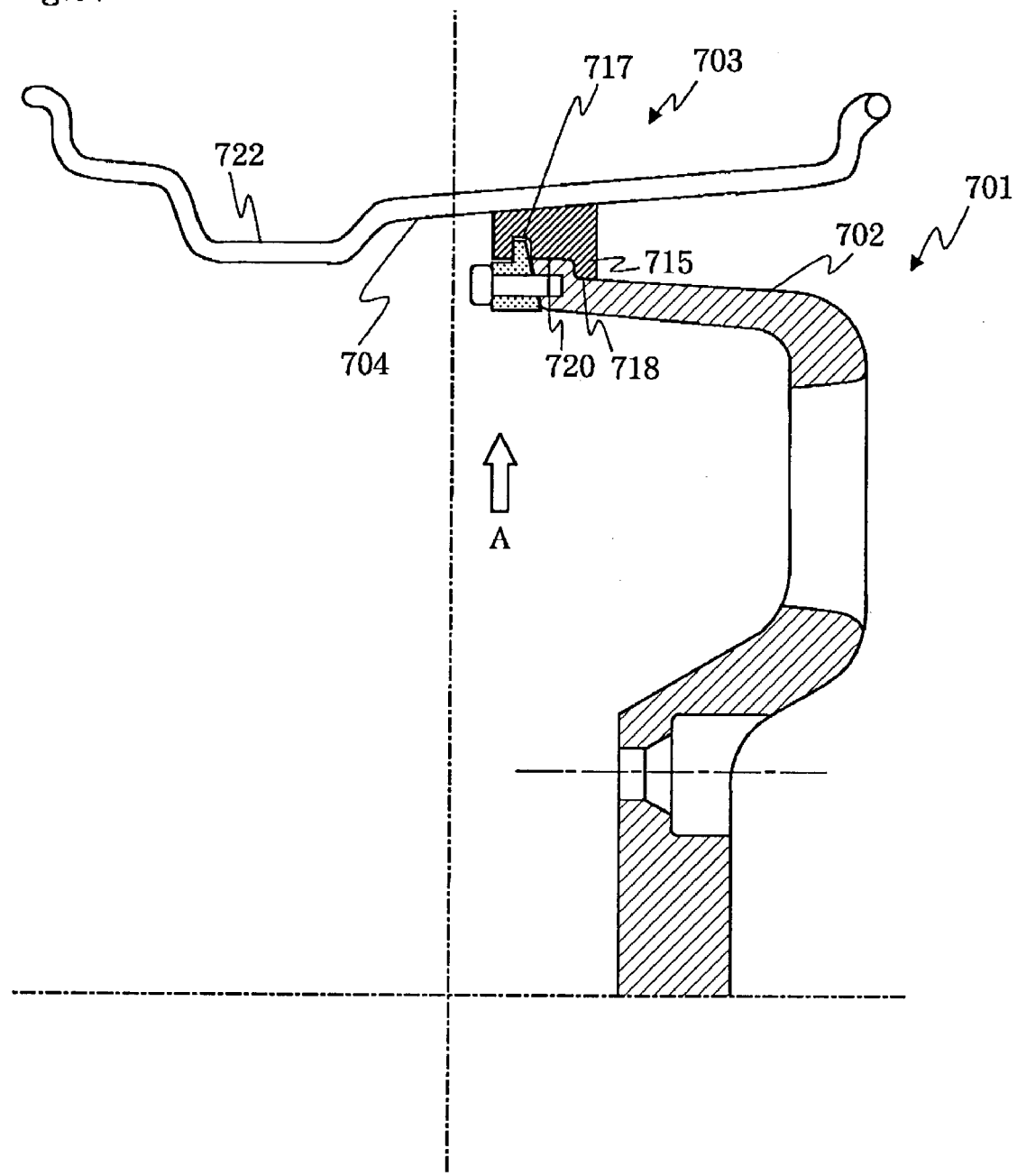
FIG. 57 is an enlarged partial cross-section of another embodiment of the wheel for use with a vehicle in accordance with the present invention.

Referring to FIG. 57, another embodiment of the present invention is shown, in which an annular groove 717 and an annular raised portion 718 are formed on the inner peripheral surface of the annular projection 715, which projects radially inward from the inner peripheral surface 704 of the rim 703. The annular raised portion 718 and the C-ring, which engages with the annular groove 717, together hold an annular ridge 720, formed on the outer peripheral surface 702 of the disk 701, from either side thereof in the axial direction. In this manner, the wheel is made separable between the inner peripheral surface of the projection 715 and the outer peripheral surface 702 of the disk 701. The annular projection 715 may be integrally formed with the rim 703. It should be noted that the C-ring has essentially the same structure as that described above. In the preferred embodiment, means for preventing rotation between the annular raised portion 718 and the C-ring is preferably provided to help the annular raised portion 718 and the C-ring hold the ridge 720. For example, axially projecting projections and corresponding recesses may be provided on the annular raised portion 718 and on the ridge 720, respectively, at several locations along the circumference, so that the projections engage with the respective recesses to serve as rotation-preventing means. Alternatively, a plurality of radially projecting projections and corresponding radial recesses may be provided on the inner peripheral surface of the projection 715 and on the ridge 720, respectively, so that the projections engage with the respective recesses to serve as rotation-preventing means.

INDUSTRIAL APPLICABILITY

As has been described thus far, the elastic wheels of the present invention can ensure long-lasting passenger comfort, anti-vibration performance and noise-suppression performance particular to the elastic wheel and allow optimization of these performances depending on their applications even during use. The elastic wheels of the present invention also facilitate rim assembly and core mounting and, when a rubber-made elastic member is used, makes it possible to carry out vulcanization without using the integrated rim unit, allowing size reduction of vulcanizing apparatus.

The invention claimed is:

1. An elastic wheel including a disk secured to an axle hub, a rim for mounting a tire, and an elastic member arranged between an inner peripheral surface of the rim and an outer peripheral surface of the disk, wherein the wheel is separable between the inner peripheral surface of the rim and the elastic member; and wherein the disk includes on its outer peripheral surface an annular projection projecting radially outward therefrom, the elastic member being secured to, and extending axially at least on either side of, the projection, wherein a pair of annular wall members are secured to either end of the axially extending elastic member to extend radially outward beyond the projection and are spaced apart from the outer peripheral surface of the disk, wherein a pair of annular stoppers, one being removable and the other being fixed, are provided on the inner peripheral surface of the rim and hold the pair of wall members from either side thereof in the axial direction.

2. The elastic wheel according to claim 1, further including rotation-prevention means between the wall member and the fixed stopper.

3. The elastic wheel according to claim 1, wherein the rim is separated into two rims along the circumference and the removable stopper is formed by an annular separation surface of one of two rims.

4. The elastic wheel according to claim 3, wherein one of the rims that forms the stopper includes a drop portion.

5. An elastic wheel including a disk secured to an axle hub, a rim for mounting a tire, and an elastic member arranged between an inner peripheral surface of the rim and an outer peripheral surface of the disk, wherein the wheel is separable both between an outer peripheral surface portion and a radial disk portion of the disk and between the inner peripheral surface of the rim and the elastic member; and wherein the disk includes on its outer peripheral surface an annular projection projecting radially outward therefrom, the elastic member being secured to, and extending axially at least on either side of, the projection, wherein a pair of annular wall members are secured to either end of the axially extending elastic member to extend radially outward beyond the projection and are spaced apart from the outer peripheral surface of the disk, wherein a pair of annular stoppers, one being removable and the other being fixed, are provided on the inner peripheral surface of the rim and hold the pair of wall members from either side thereof in the axial direction.

* * * * *